US006218035B1

(12) United States Patent
Fuglevand et al.

(10) Patent No.: US 6,218,035 B1
(45) Date of Patent: Apr. 17, 2001

(54) PROTON EXCHANGE MEMBRANE FUEL CELL POWER SYSTEM

(75) Inventors: William A. Fuglevand; Shiblihanna I. Bayyuk; Greg Alden Lloyd; Peter David DeVries; David R. Lott; John P. Scartozzi, all of Spokane; Gregory M. Somers; Ronald G. Stokes, both of Newman Lake, all of WA (US)

(73) Assignee: Avista Laboratories, Inc., Spokane, WA (US)

( * ) Notice: Subject to any disclaimer, the term of this patent is extended or adjusted under 35 U.S.C. 154(b) by 0 days.

(21) Appl. No.: 09/470,321

(22) Filed: Dec. 21, 1999

Related U.S. Application Data

(63) Continuation of application No. 08/979,853, filed on Nov. 20, 1997, now Pat. No. 6,030,718.

(51) Int. Cl.[7] .................................................. H01M 4/94
(52) U.S. Cl. ................... 429/30; 429/42; 429/44
(58) Field of Search ......................... 429/30, 33, 41, 429/42, 44

(56) References Cited

U.S. PATENT DOCUMENTS

| 2,852,554 | 9/1958 | England ............................ 260/481 |
| 3,498,844 | 3/1970 | Sanderson . | |

(List continued on next page.)

FOREIGN PATENT DOCUMENTS

| 25 51936 | 11/1975 | (DE) . |
| 57-60670 | 4/1982 | (JP) . |
| 57-80675 | 5/1982 | (JP) . |
| 57-107570 | 7/1982 | (JP) . |
| WO 94/15377 | 7/1994 | (WO) . |

OTHER PUBLICATIONS

Tager et al; Polymer Science vol. 33, 1991 pp. 282–287 (Month Unknown).
Wilson et al., Private Paper 1996, 8 pages (Month Unknown).
Lam–Leung et al; Journal of Applied Polymer Science, vol. 57, 1995, pp. 1373–1379 (Month Unknown).
Dowling et al; Macromolecules 1991, pp. 4131–4237 (Month N/A).

(List continued on next page.)

Primary Examiner—Stephen Kalafut
(74) Attorney, Agent, or Firm—Wells, St. John, Roberts, Gregory & Matkin P.S.

(57) ABSTRACT

A proton exchange membrane fuel cell power system for producing electrical power is described and which includes a plurality of discrete fuel cell modules having at least two membrane electrode diffusion assemblies, each of the membrane electrode diffusion assemblies having opposite anode and cathode sides; a pair of current collectors are individually disposed in juxtaposed ohmic electrical contact with opposite anode and cathode sides of each of the membrane electrode diffusion assemblies; and individual force application assemblies apply a given force to the pair current collectors and the individual membrane electrode diffusion assemblies. The proton exchange membrane fuel cell power system also includes an enclosure mounting a plurality of subracks which receive the discrete fuel cell modules. Additionally, a control system is disclosed which optimizes the performance parameters of the discrete proton exchange membrane fuel cell modules.

29 Claims, 27 Drawing Sheets

U.S. PATENT DOCUMENTS

| | | | |
|---|---|---|---|
| 3,507,702 | 4/1970 | Sanderson . | |
| 3,528,858 | 9/1970 | Hodgdon et al. . | |
| 3,623,913 | 11/1971 | Adlhart et al. . | |
| 3,808,534 | 4/1974 | Summers et al. | 340/249 |
| 3,823,358 | 7/1974 | Rey | 320/3 |
| 3,964,930 | 6/1976 | Reiser . | |
| 3,969,145 | 7/1976 | Greystad et al. . | |
| 3,975,913 | 8/1976 | Erickson | 60/645 |
| 4,024,036 | 5/1977 | Nakamura et al. | 204/129 |
| 4,035,557 | 7/1977 | Grevstad | 429/44 |
| 4,130,693 | 12/1978 | Van den Berghe et al. | 429/41 |
| 4,142,024 | 2/1979 | Van den Berghe et al. | 429/41 |
| 4,178,418 | 12/1979 | Croset et al. | 429/27 |
| 4,185,131 | 1/1980 | Goller et al. | 427/113 |
| 4,192,906 | 3/1980 | Maru | 429/13 |
| 4,215,183 * | 7/1980 | Macleod | 429/30 |
| 4,219,443 | 8/1980 | Klinedinst et al. | 252/425 |
| 4,276,355 | 6/1981 | Kothmann et al. | 429/26 |
| 4,287,232 | 9/1981 | Goller et al. | 427/113 |
| 4,435,252 | 3/1984 | Kadija | 429/44 X |
| 4,463,065 | 7/1984 | Hegedus et al. | 429/33 |
| 4,469,579 | 9/1984 | Covitch et al. | 204/283 |
| 4,476,198 | 10/1984 | Ackerman et al. | 429/32 |
| 4,478,917 | 10/1984 | Fujita et al. | 429/33 |
| 4,500,612 | 2/1985 | Fujii et al. | 429/26 |
| 4,510,211 | 4/1985 | Struthers | 429/18 |
| 4,562,124 | 12/1985 | Ruka | 429/30 |
| 4,598,026 | 7/1986 | Rossing et al. | 429/30 |
| 4,629,537 | 12/1986 | Hsu | 204/15 |
| 4,647,359 | 3/1987 | Lindstrom | 204/294 |
| 4,661,411 | 4/1987 | Martin et al. | 428/421 |
| 4,670,702 | 6/1987 | Yamada et al. | 320/21 |
| 4,686,158 | 8/1987 | Nishi et al. | 429/26 |
| 4,702,971 | 10/1987 | Isenberg | 429/31 |
| 4,724,191 | 2/1988 | Kuriakose et al. | 429/193 |
| 4,728,584 | 3/1988 | Isenberg | 429/31 |
| 4,749,632 | 6/1988 | Flandermeyer et al. | 429/12 |
| 4,755,376 | 7/1988 | Marianowski | 429/16 |
| 4,767,518 | 8/1988 | Maskalick | 204/242 |
| 4,769,297 | 9/1988 | Reiser et al. | 429/17 |
| 4,770,955 | 9/1988 | Ruhl | 429/33 |
| 4,795,536 | 1/1989 | Young et al. | 204/129 |
| 4,797,185 | 1/1989 | Polak et al. | 204/129 |
| 4,797,190 | 1/1989 | Peck | 204/296 |
| 4,804,592 | 2/1989 | Vanderborgh et al. | 429/33 |
| 4,816,036 | 3/1989 | Kotchick | 29/623 |
| 4,818,637 | 4/1989 | Molter et al. | 429/15 |
| 4,818,735 | 4/1989 | Fujiki et al. | 501/134 |
| 4,824,741 | 4/1989 | Kunz | 429/26 |
| 4,826,741 | 5/1989 | Aldhart et al. | 429/19 |
| 4,826,742 | 5/1989 | Reiser | 429/33 |
| 4,847,172 | 7/1989 | Maskalick et al. | 429/30 |
| 4,849,253 | 7/1989 | Maricle et al. | 427/115 |
| 4,851,303 | 7/1989 | Madou et al. | 429/13 |
| 4,855,194 * | 8/1989 | Wright | 429/44 X |
| 4,863,813 | 9/1989 | Dyer | 429/33 |
| 4,865,930 * | 9/1989 | Kinder et al. | 429/41 X |
| 4,876,115 | 10/1989 | Raistrick | 427/115 |
| 4,883,497 | 11/1989 | Claar et al. | 29/623 |
| 4,894,355 | 1/1990 | Takeuchi et al. | 502/101 |
| 4,927,793 | 5/1990 | Hori et al. | 501/134 |
| 4,943,494 | 7/1990 | Riley | 429/30 |
| 4,948,680 | 8/1990 | Madou et al. | 429/13 |
| 4,973,531 | 11/1990 | Zaima et al. | 429/37 |
| 4,985,315 | 1/1991 | Lemoine | 429/33 |
| 4,994,331 | 2/1991 | Cohen | 429/17 |
| 5,035,961 | 7/1991 | Jensen | 429/30 |
| 5,035,962 | 7/1991 | Jensen | 429/40 |
| 5,037,525 | 8/1991 | Badwal | 204/421 |
| 5,047,298 | 9/1991 | Perry, Jr. et al. | 429/17 |
| 5,049,459 | 9/1991 | Akagi | 429/33 |
| 5,059,497 | 10/1991 | Prince et al. | 429/193 |
| 5,069,987 | 12/1991 | Gordon | 429/31 |
| 5,084,144 | 1/1992 | Reddy et al. | 205/104 |
| 5,106,706 | 4/1992 | Singh et al. | 429/31 |
| 5,114,803 | 5/1992 | Ishihara et al. | 429/30 |
| 5,122,425 | 6/1992 | Yoshida et al. | 429/33 |
| 5,130,210 | 7/1992 | Iwasaki et al. | 429/33 |
| 5,132,193 | 7/1992 | Reddy et al. | 429/13 |
| 5,143,801 | 9/1992 | Bates | 429/33 |
| 5,149,601 | 9/1992 | Shiratori et al. | 429/30 |
| 5,154,987 | 10/1992 | Hash et al. | 429/33 |
| 5,162,167 | 11/1992 | Minh et al. | 429/30 |
| 5,164,060 | 11/1992 | Eisman et al. | 204/282 |
| 5,169,731 | 12/1992 | Yoshimura et al. | 29/30 |
| 5,176,967 | 1/1993 | Ishihara et al. | 429/31 |
| 5,186,806 | 2/1993 | Clark et al. | 204/265 |
| 5,187,025 | 2/1993 | Kelland | 429/33 |
| 5,188,910 | 2/1993 | Ishihara et al. | 429/31 |
| 5,190,834 | 3/1993 | Kendall | 429/31 |
| 5,192,627 | 3/1993 | Perry, Jr. et al. | 429/17 |
| 5,200,278 | 4/1993 | Watkins et al. | 429/24 |
| 5,200,279 | 4/1993 | Draper et al. | 429/30 |
| 5,213,911 | 5/1993 | Bloom et al. | 429/33 |
| 5,217,822 | 6/1993 | Yoshida et al. | 429/33 |
| 5,219,673 | 6/1993 | Kaun | 429/32 |
| 5,223,353 | 6/1993 | Oshawa et al. | 429/192 |
| 5,232,794 | 8/1993 | Krumpelt et al. | 429/30 |
| 5,234,722 | 8/1993 | Ito et al. | 427/453 |
| 5,234,777 | 8/1993 | Wilson | 429/33 |
| 5,242,764 | 9/1993 | Dhar | 429/30 |
| 5,244,753 | 9/1993 | Taniguchi et al. | 429/33 |
| 5,246,792 | 9/1993 | Watanabe | 429/33 |
| 5,248,566 | 9/1993 | Kumar et al. | 429/33 |
| 5,252,410 | 10/1993 | Wilkinson et al. | 429/33 |
| 5,256,499 | 10/1993 | Minh et al. | 429/33 |
| 5,262,249 | 11/1993 | Beal et al. | 429/26 |
| 5,264,299 | 11/1993 | Krasij et al. | 429/30 |
| 5,266,419 | 11/1993 | Yamada | 429/30 |
| 5,266,421 | 11/1993 | Townsend et al. | 429/192 |
| 5,270,131 | 12/1993 | Diethelm et al. | 429/34 |
| 5,272,017 | 12/1993 | Swathirajan et al. | 429/33 |
| 5,273,838 | 12/1993 | Draper et al. | 429/31 |
| 5,279,906 | 1/1994 | Yoshimura et al. | 429/30 |
| 5,281,490 | 1/1994 | Nishioka et al. | 429/33 |
| 5,286,579 | 2/1994 | Akagi | 429/33 |
| 5,290,323 | 3/1994 | Okuyama et al. | 29/623 |
| 5,290,642 | 3/1994 | Minh et al. | 429/33 |
| 5,292,599 | 3/1994 | Soma et al. | 429/30 |
| 5,292,600 | 3/1994 | Kaufman | 429/39 |
| 5,298,235 | 3/1994 | Worrell et al. | 429/33 |
| 5,302,269 | 4/1994 | Eisman et al. | 204/252 |
| 5,304,430 | 4/1994 | Ludwig et al. | 429/17 |
| 5,306,574 | 4/1994 | Singh | 429/13 |
| 5,308,712 | 5/1994 | Seike et al. | 429/30 |
| 5,312,700 | 5/1994 | Ishida | 429/30 |
| 5,316,869 | 5/1994 | Perry, Jr. et al. | 429/19 |
| 5,316,871 | 5/1994 | Swathirajan et al. | 429/19 |
| 5,330,859 | 7/1994 | McPheeters et al. | 429/33 |
| 5,330,860 | 7/1994 | Grot et al. | 429/42 |
| 5,336,570 | 8/1994 | Dodge | 429/31 |
| 5,338,622 | 8/1994 | Hsu et al. | 429/26 |
| 5,342,704 | 8/1994 | Vasilow et al. | 429/31 |
| 5,342,705 | 8/1994 | Minh et al. | 429/32 |
| 5,344,721 | 9/1994 | Sonai et al. | 429/20 |
| 5,346,780 | 9/1994 | Suzuki | 429/42 |
| 5,350,641 | 9/1994 | Mogensen et al. | 429/30 |
| 5,350,643 | 9/1994 | Imahashi et al. | 429/33 |
| 5,354,626 | 10/1994 | Kobayashi et al. | 429/30 |
| 5,356,728 | 10/1994 | Balachandran et al. | 429/8 |
| 5,356,730 | 10/1994 | Minh et al. | 429/32 |

| | | | |
|---|---|---|---|
| 5,358,620 | 10/1994 | Goloyin et al. | 204/421 |
| 5,358,735 | 10/1994 | Kawaskai et al. | 427/115 |
| 5,358,799 | 10/1994 | Gardner | 429/26 |
| 5,364,711 | 11/1994 | Yamada et al. | 429/15 |
| 5,366,818 | 11/1994 | Wilkinson et al. | 429/13 |
| 5,368,951 | 11/1994 | Shiratori et al. | 429/30 |
| 5,372,895 | 12/1994 | Sato et al. | 429/30 |
| 5,372,896 | 12/1994 | Binder et al. | 429/33 |
| 5,385,792 | 1/1995 | Shiratori et al. | 429/32 |
| 5,395,704 | 3/1995 | Barnett et al. | 429/30 |
| 5,395,705 | 3/1995 | Door et al. | 429/42 |
| 5,403,461 | 4/1995 | Tuller et al. | 204/252 |
| 5,403,695 | 4/1995 | Ogata et al. | 429/33 |
| 5,407,758 | 4/1995 | Greiner et al. | 429/33 |
| 5,449,697 | 9/1995 | Noaki et al. | 521/27 |
| 5,470,671 | 11/1995 | Fletcher et al. | 429/26 |
| 5,500,292 | 3/1996 | Muranaka et al. | 429/209 |
| 5,523,175 | 6/1996 | Beal et al. | 429/30 |
| 5,523,177 | 6/1996 | Kosek et al. | 429/40 |
| 5,525,436 | 6/1996 | Savinell et al. | 429/30 |
| 5,532,072 | 7/1996 | Spaeh et al. | 429/34 |
| 5,534,362 | 7/1996 | Okamato et al. | 429/32 |
| 5,547,777 | 8/1996 | Richards | 429/32 |
| 5,561,202 | 10/1996 | Helmer-Metzmann et al. | 525/471 |
| 5,607,785 * | 3/1997 | Tozawa et al. | 429/44 X |
| 5,620,807 * | 4/1997 | Mussell et al. | 429/33 |
| 5,624,769 | 4/1997 | Li et al. | 429/32 |
| 5,639,516 | 6/1997 | Dirven et al. | 427/421 |
| 5,641,586 * | 6/1997 | Wilson | 429/30 |
| 5,654,109 | 8/1997 | Plowman et al. | 429/13 |
| 5,707,755 | 1/1998 | Grot | 429/41 X |
| 5,728,485 * | 3/1998 | Watanabe et al. | 429/41 |
| 5,795,496 * | 8/1998 | Yen et al. | 429/33 X |
| 5,952,119 * | 9/1999 | Wilson | 429/42 X |
| 6,010,798 * | 1/2000 | Hammerschmidt | 429/30 |

OTHER PUBLICATIONS

Thedoropoulouse et al; Journal of Applied Polymer Science, vol. 46, 1992, pp. 1461–1465 (Month Unknown).

Chainey et al; Journal of Polymer Science, 1989, vol. 27, pp. 3187–3199 (Month Unknown).

Tovbin et al; Russian Journal of Physical Chemistry, vol. 67, 1993, pp. 471–474 (Month Unknown).

Kreuer et al; Chemical Material 1996, vol. 8, pp. 610–641 (Month Unknown).

Wieczorek et al; Electrochimica Acta, vol. 40 (1995), pp. 2327–2330 (Month Unknown).

Poinsignon et al; Materials Science and Engineering (1989), pp. 31–37 (Month Unknown).

Solomin; Polymer Science USSR vol. 34, 1992, pp. 274–275 (Month Unknown).

Zawodzinski et al; Solid State Ionics, vol. 60 (1993), pp. 199–211 (Month Unknown).

Ticianelli et al; Journal of Applied Electro–Chemistry, vol. 21 (1991), pp. 597–605 (Month Unknown).

Savodogo et al; Journal of the Electro Chemical Society, vol. 141, No. 8, 1994, pp. L92–L95 (Month Unknown).

Stati et al; Journal of Applied Electrochemistry; vol. 22 (1992), pp. 663–667. (Month Unknown).

Gaod et al; Electrochimica Acta; vol. 37, No. 8, pp. 1327–1332 (1991) (Month Unknown).

Mosdale et al; Solid State Ionics; vol. 61 (1993), pp. 251–255 (Month Unknown).

Uchida et al; Journal of the Electrochemical Society; No. 142 (1995), pp. 463–468 (Feb.).

Shukla et al; Journal of Applied Electrochemistry; vol. 19 (1989), pp. 383–386 (Month Unknown).

Hamnett et al; Journal of Applied Electrochemistry, vol. 21, (1991), pp. 982–985 (Month Unknown).

Ticianelli et al; Journal of Electro Chemical Society; vol. 135, (1988), pp. 2209–2214 (Month Unknown).

Prater et al; Journal of Power Sources; vol. 37 (1992), pp. 181–188 (Month Unknown).

Prater et al; Journal of Power Sources; vol. 29, (1990), pp. 239–250 (Month Unknown).

Svinivasan et al; Journal of Power Sources; vol. 22 (1988), pp. 359–375 (Month Unknown).

Ticianelli et al; Journal of Electroanalytical Chemistry; vol. 251 (1988), pp. 275–295 (Month Unknown).

Moore et al; Macromolecules; vol. 22 (1984), 3594–3599 (Month Unknown).

U.S. Dept. of Energy; Fuel Cells A Handbook (Revision 3); Jan. 1994, pp. 1–1—9–14.

Fuel Cell Systems; American Chemical Society Symposia, Apr. 6–7, 1964, pp. 18–201.

Fuel Cell Systems II; American Chemical Society Symposia, Sep. 12–14, 1967, pp. 1–80.

* cited by examiner

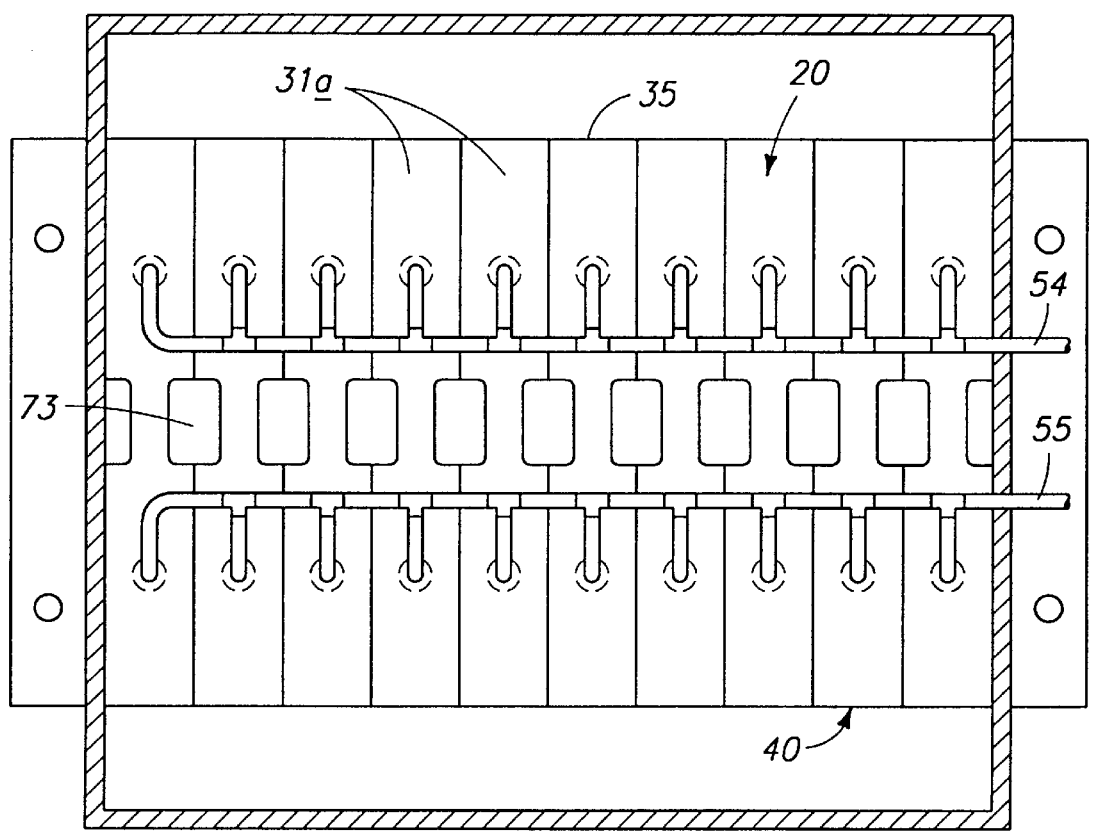

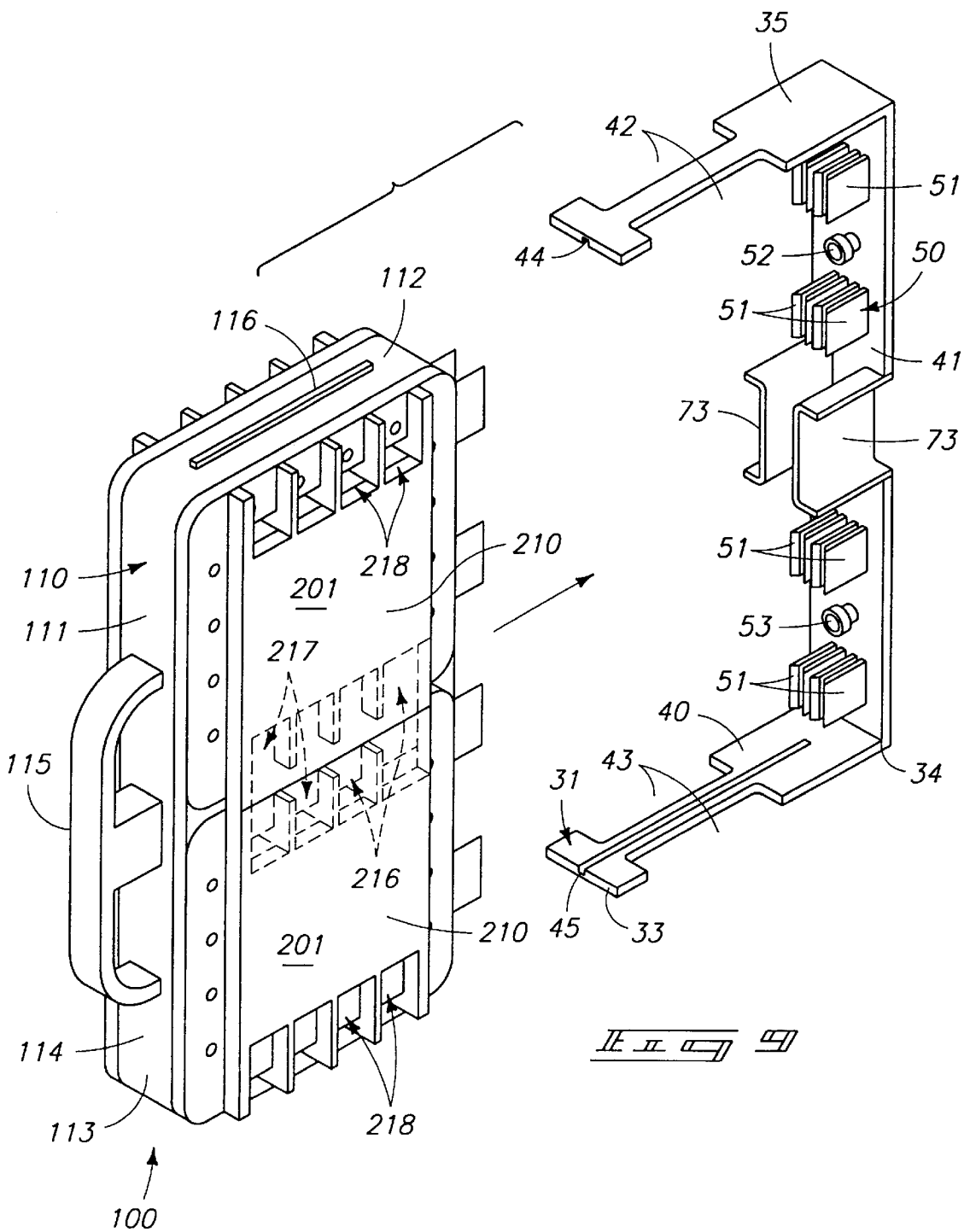

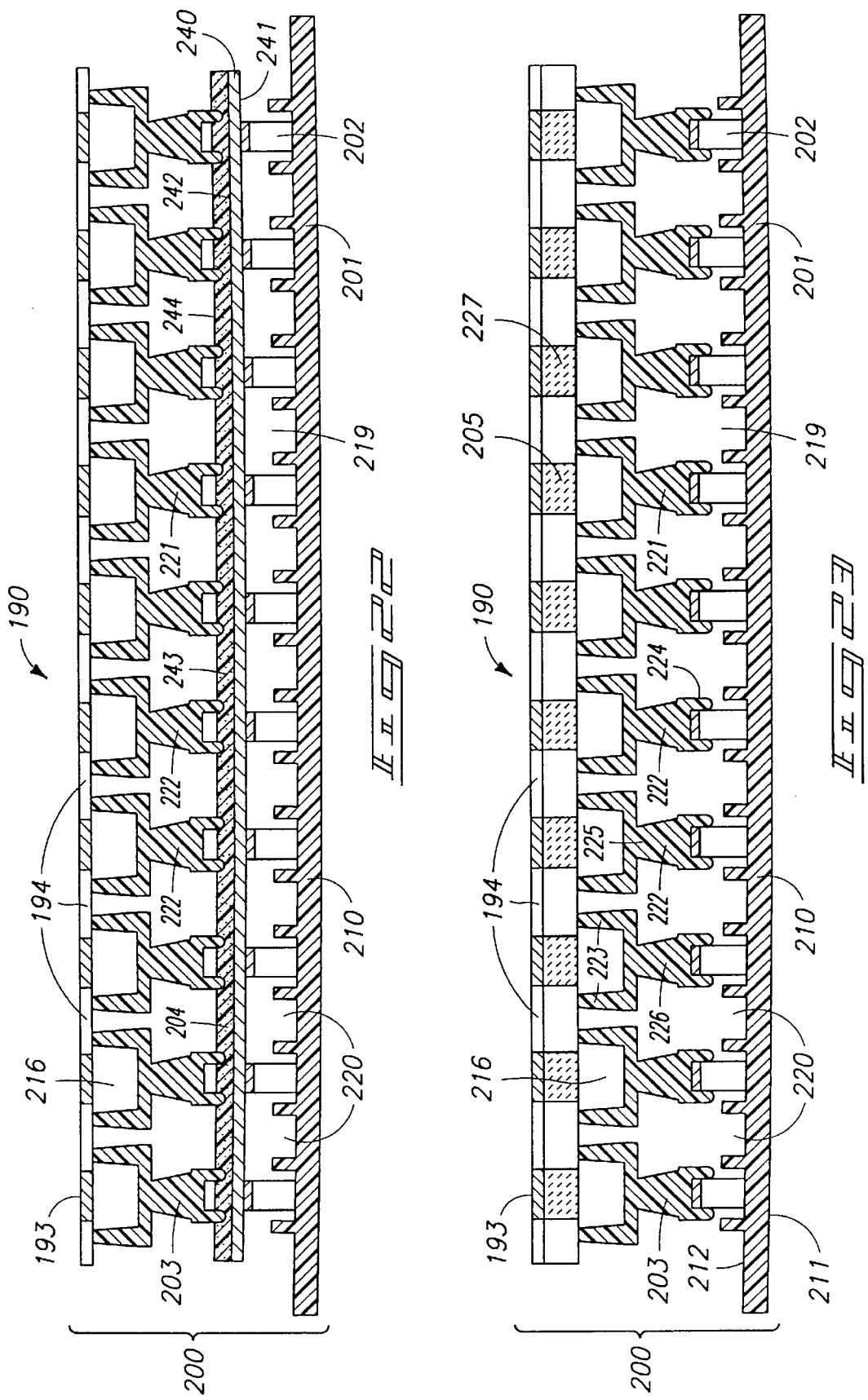

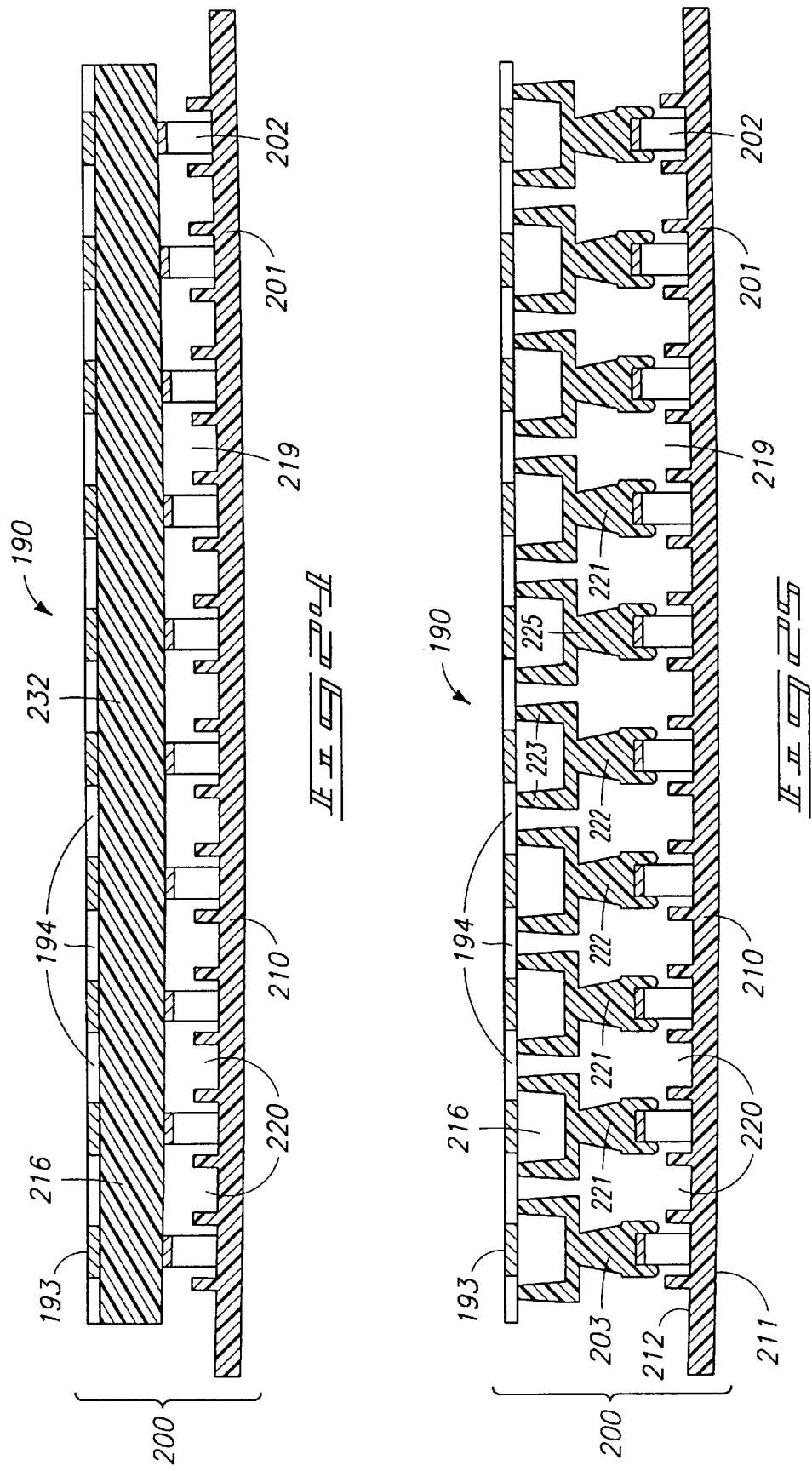

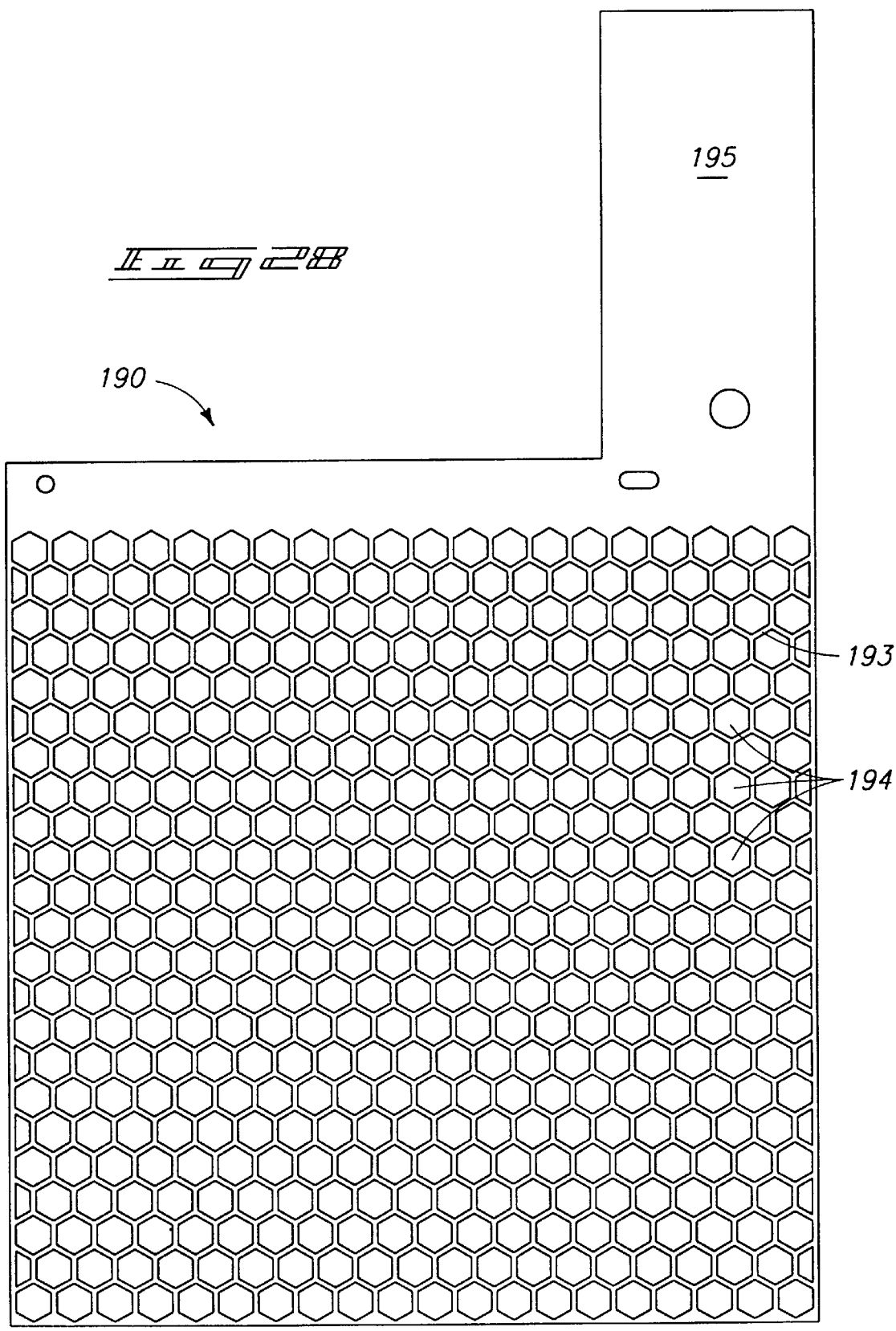

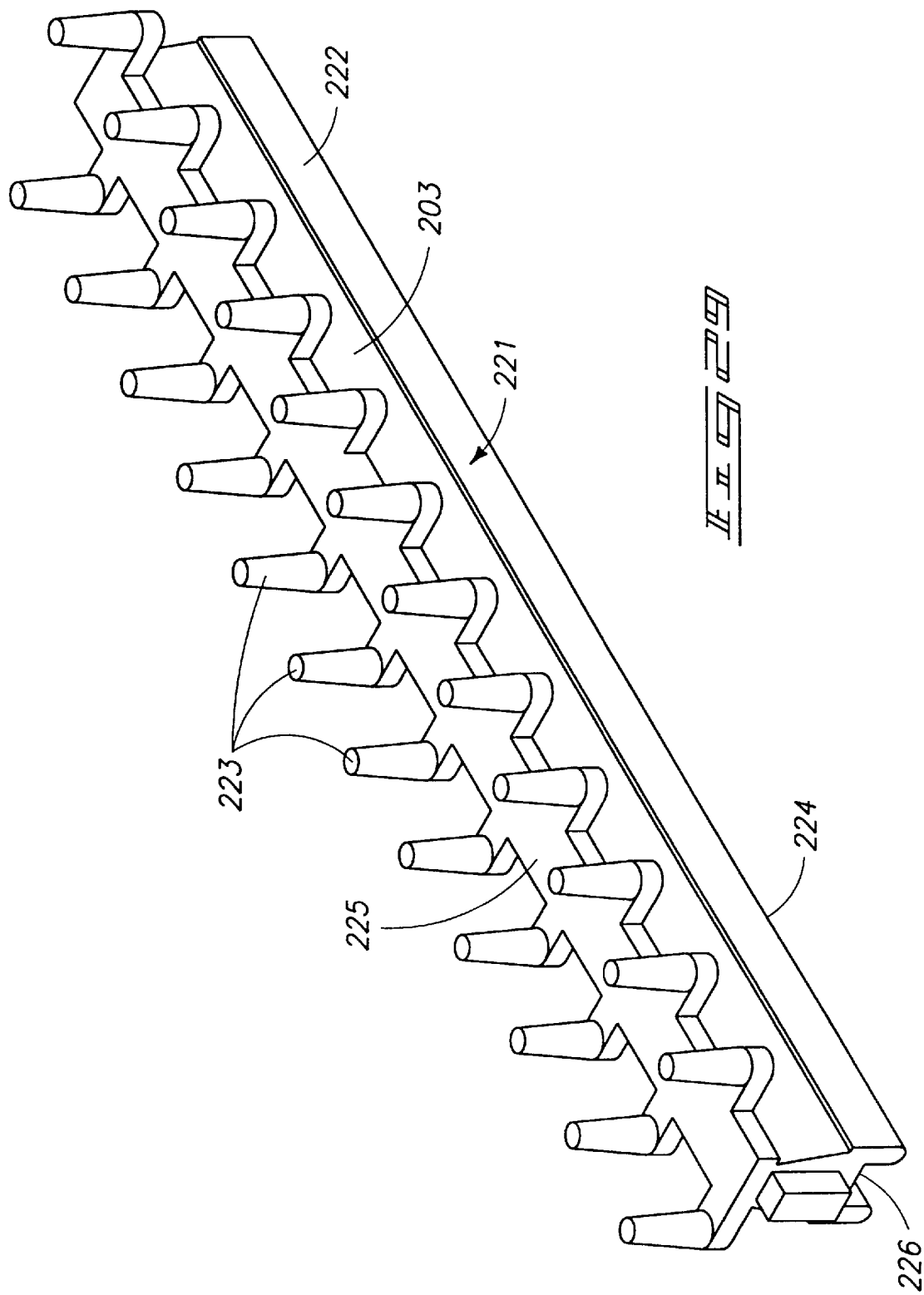

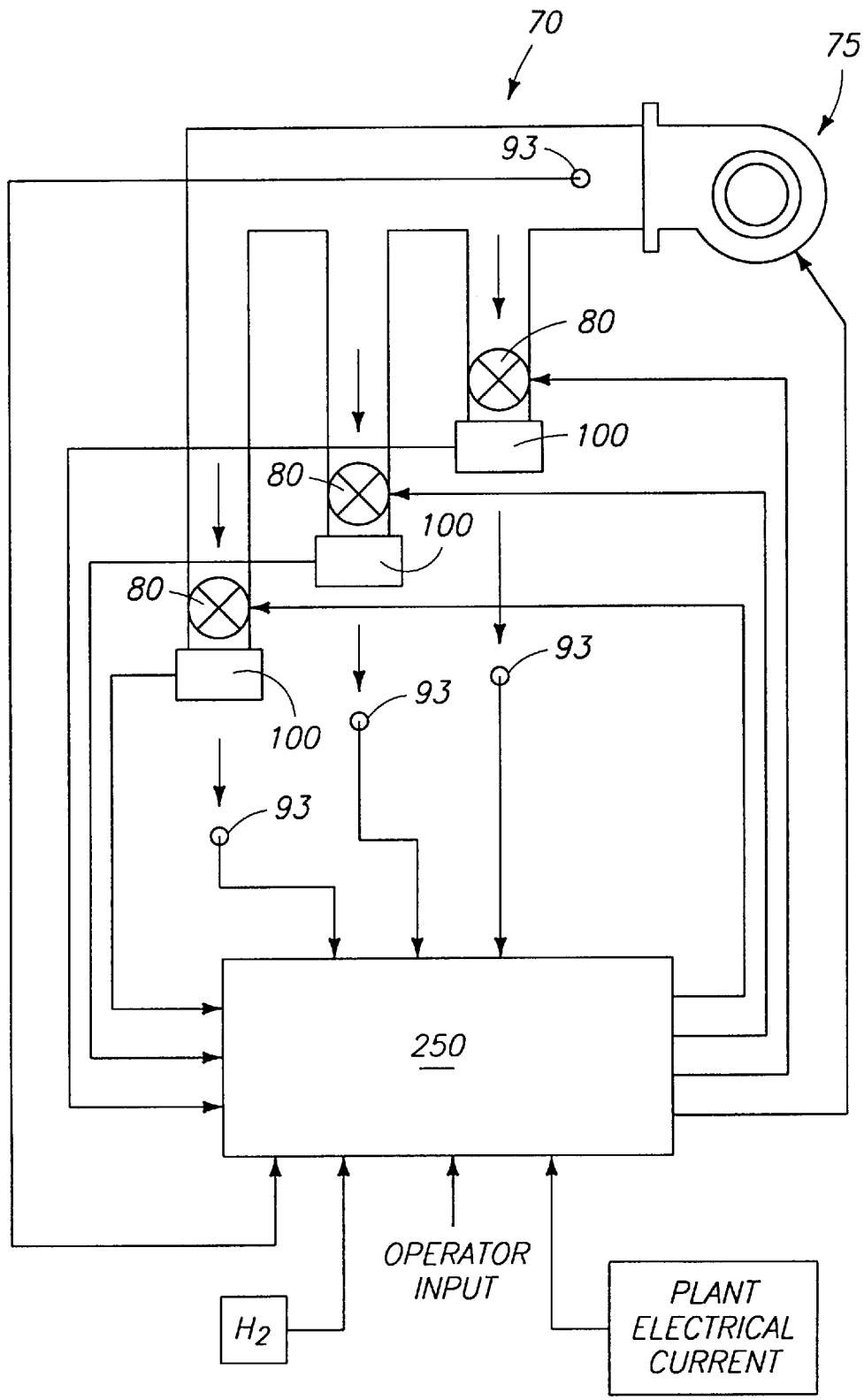

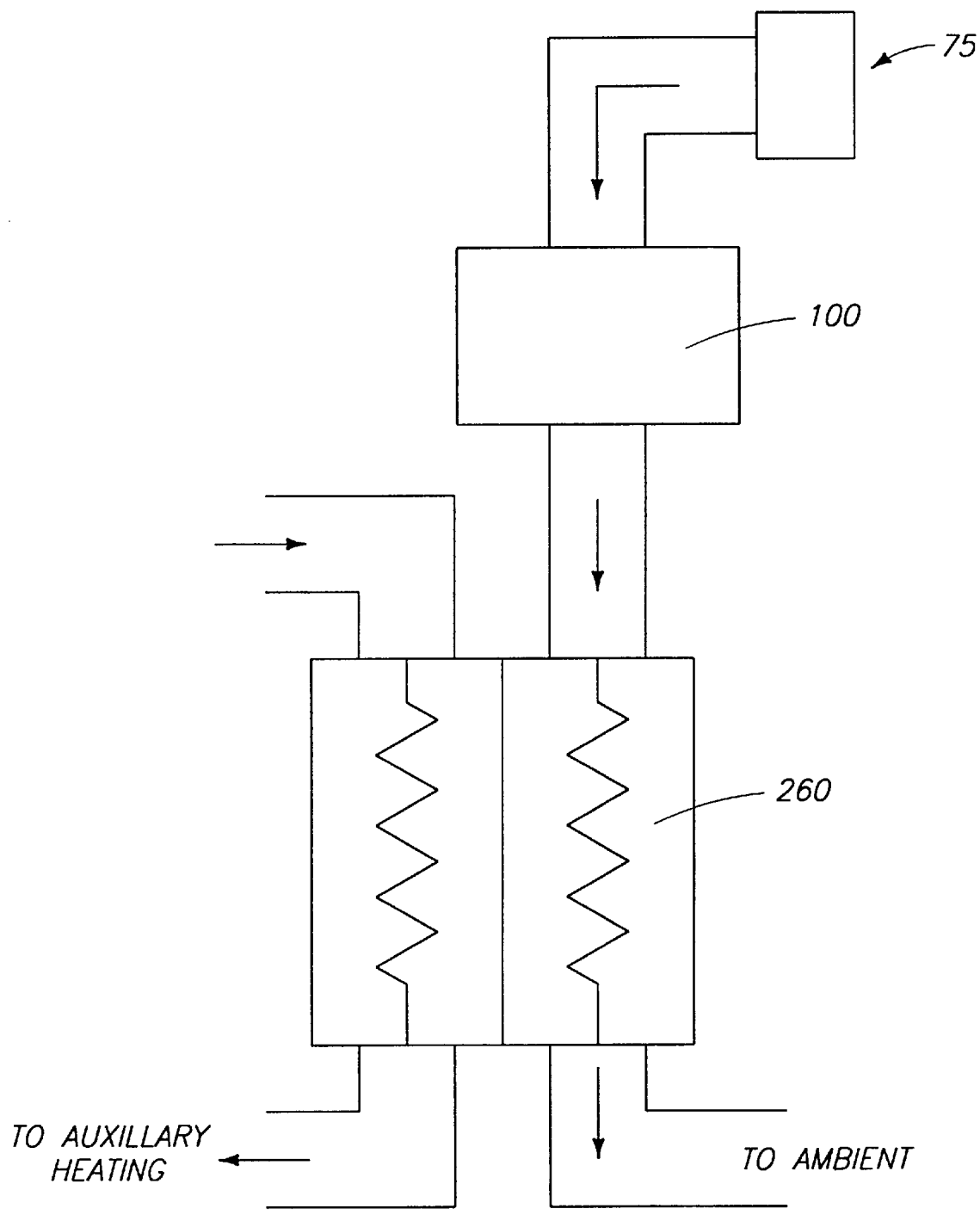

PROTON EXCHANGE MEMBRANE FUEL CELL POWER SYSTEM

RELATED PATENT DATA

This application is a Continuation of U.S. patent application Ser. No. 08/979,853, filed Nov. 20, 1997, and titled "A Proton Exchange Membrane Fuel Cell Power System," and which is now U.S. Pat. No. 6,030,718, the disclosure of which is incorporated by reference herein.

BACKGROUND OF THE INVENTION

1. Field of the Invention

The present invention relates to a proton exchange membrane (PEM) fuel cell power system, and more specifically to a power system which includes a plurality of discrete fuel cell modules producing respective voltages, and wherein the discrete fuel cell modules are self humidifying, have an electrical efficiency of at least about 40%, and offer plant reliability, ease-of-maintenance, and reduced capital costs not possible heretofore.

2. Description of the Prior Art

The fuel cell was developed in England more than 150 years ago by Sir William Grove in 1839. The inventor called it a "gaseous battery" at the time to distinguish the fuel cell from another invention of his, the electric storage battery. The fuel cell is an electrochemical device which reacts hydrogen and oxygen which is usually supplied from the air, to produce electricity and water. With prior processing, a wide range of fuels, including natural gas and coal-derived synthetic fuels can be converted to electric power. The basic process is highly efficient, and for those fuel cells fueled directly by hydrogen, pollution free. Further, since fuel cells can be assembled into stacks, of varying sizes, power systems have been developed to produce a wide range of output levels and thus satisfy numerous kinds of end-use applications.

Heretofore, fuel cells have been used as alternative power sources in earth and space applications. Examples of this use are unattended communications repeaters, navigational aids, space vehicles, and weather and oceanographic stations, to name but a few.

Although the basic process is highly efficient and pollution free, a commercially feasible power system utilizing this same technology has remained elusive. For example, hydrogen-fueled fuel cell power plants based on Proton Exchange Membrane (PEM) Fuel Cells are pollution free, clean, quiet on site, and have few moving parts. Further, they have a theoretical efficiency of up to about 80%. This contrasts sharply with conventional combustion technologies such as combustion turbines, which convert at most 50% of the energy from combusting fuel into electricity and in smaller generation capacities, are uneconomical and significantly less efficient.

Although the fundamental electrochemical processes involved in all fuel cells are well understood, engineering solutions have proved elusive for making certain fuel cell types reliable and for other types, economical. In the case of PEM fuel cells, reliability has not been the driving concern to date, but rather the installed cost per watt of generation capacity has. In order to lower the PEM fuel cost per watt, much attention has been placed on increasing power output. Historically this has resulted in additional, sophisticated balance-of-plant systems necessary to optimize and maintain high PEM fuel cell power outputs. A consequence of highly complex balance-of-plant systems is they do not readily scale down to low (single residence) generation capacity plants. Consequently installed cost, efficiency, reliability and maintenance expenses all are adversely effected in low generation applications.

As earlier noted, a fuel cell produces an electromotive force by reacting fuel and oxygen at respective electrode interfaces which share a common electrolyte. In the case of a PEM fuel cell, hydrogen gas is introduced at a first electrode where it reacts electrochemically in the presence of a catalyst to produce electrons and protons. The electrons are circulated from the first electrode to a second electrode through an electrical circuit connected between the electrodes. Further, the protons pass through a membrane of solid, polymerized electrolyte (a proton exchange membrane or PEM) to the second electrode. Simultaneously, an oxidant, such as oxygen gas, (or air), is introduced to the second electrode where the oxidant reacts electrochemically in the presence of the catalyst and is combined with the electrons from the electrical circuit and the protons (having come across the proton exchange membrane) thus forming water and completing the electrical circuit. The fuel-side electrode is designated the anode and the oxygen-side electrode is identified as the cathode. The external electric circuit conveys electrical current and can thus extract electrical power from the cell. The overall PEM fuel cell reaction produces electrical energy which is the sum of the separate half cell reactions occurring in the fuel cell less its internal losses.

Since a single PEM fuel cell produces a useful voltage of only about 0.45 to about 0.7 volts D.C. under a load, practical PEM fuel cell plants have been built from multiple cells stacked together such that they are electrically connected in series. In order to reduce the number of parts and to minimize costs, rigid supporting/conducting separator plates often fabricated from graphite or special metals have been utilized. This is often described as bipolar construction. More specifically, in these bipolar plates one side of the plate services the anode, and the other the cathode. Such an assembly of electrodes, membranes, and the bipolar plates are referred to as a stack. Practical stacks have heretofore consisted of twenty or more cells in order to produce the direct current voltages necessary for efficient inverting to alternating current.

The economic advantages of designs based on stacks which utilize bipolar plates are compelling. However, this design has various disadvantages which have detracted from its usefulness. For example, if the voltage of a single cell in a stack declines significantly or fails, the entire stack, which is held together in compression with tie bolts, must be taken out of service, disassembled, and repaired. In traditional fuel cell stack designs, the fuel and oxidant are directed by means of internal manifolds to the electrodes. Cooling for the stack is provided either by the reactants, natural convection, radiation, and possibly supplemental cooling channels and/or cooling plates. Also included in the prior art stack designs are current collectors, cell-to-cell seals, insulation, piping, and various instrumentation for use in monitoring cell performance. The fuel cell stack, housing, and associated hardware make up the operational fuel cell plant. As will be apparent, such prior art designs are unduly large, cumbersome, and quite heavy. Certainly, any commercially useful PEM fuel cell designed in accordance with the prior art could not be manipulated by hand because of these characteristics.

It is well known that PEM fuel cells can operate at higher power output levels when supplemental humidification is made available to the proton exchange membrane (electrolyte). Humidification lowers the resistance of proton exchange membranes to proton flow. Supplemental water can be introduced into the hydrogen or oxygen streams or more directly to the proton exchange membrane by means of the physical phenomena of wicking. The focus of investigation in recent years has been to develop Membrane/Electrode Assemblies (MEAs) with increasingly improved power output when running without supplemental humidification (self-humidified). Being able to run an MEA when it is self-humidified is advantageous because it decreases the complexity of the balance-of-plant and its attendant costs. However, self-humidification heretofore has resulted in fuel cells running at lower current densities, and thus, in turn, has resulted in more of these assemblies being required in order to generate a given amount of power. This places added importance on reducing the cost of the supporting structures, such as the bipolar plates, in conventional designs.

Accordingly, a proton exchange membrane fuel cell power system which achieves the benefits to be derived from the aforementioned technology but which avoids the detriments individually associated therewith, is the subject matter of the present invention.

SUMMARY OF THE INVENTION

One aspect of the present invention is to provide a proton exchange membrane fuel cell power system having a plurality of discrete PEM fuel cell modules with individual membrane electrode diffusion assemblies, the PEM fuel cell modules further having individual force application assemblies for applying a given force to the membrane electrode diffusion assemblies. Further, the PEM fuel cell modules of the present invention can be easily manipulated by hand.

Another aspect of the present invention is to provide a PEM fuel cell module which, in operation, produces a given amount of heat energy, and wherein the same PEM fuel cell module has a cathode air flow which removes a preponderance of the heat energy generated by the PEM fuel cell module.

Another aspect of the present invention is to provide a proton exchange membrane fuel cell power system wherein each of the discrete PEM fuel cell modules has opposing membrane electrode diffusion assemblies having a cumulative active area of at least about 60 square centimeters, and wherein each of the discrete fuel cell modules produce a current density of at least about 350 mA per square centimeter of active area at a nominal voltage of about 0.5 volts D.C.; and a power output of at least about 10.5 watts.

Still a further aspect of the present invention relates to a proton exchange membrane fuel cell power system which includes an enclosure defining a cavity; and a subrack mounted in the cavity and supporting the plurality of discrete proton exchange membrane fuel cell modules.

Another aspect of the present invention relates to a proton exchange membrane fuel cell power system which comprises:
  a hydrogen distribution frame defining discrete cavities, and wherein individual membrane electrode diffusion assemblies are sealably mounted in each of the cavities, the membrane electrode diffusion assemblies each having opposite anode and cathode sides; and
  a pair of current collectors received in each of the cavities, the individual current collectors positioned in ohmic electrical contact with the respective anode and cathode sides of each of the membrane electrode diffusion assemblies.

A further aspect of the present invention relates to a proton exchange membrane fuel cell power system comprising:

a cathode cover which partially occludes the respective cavities of the hydrogen distribution frame, the respective cathode covers individually releasably cooperating with each other, and with the hydrogen distribution frame; and
  a pressure transfer assembly received in each of the cavities and applying a given force to the current collectors and the membrane electrode diffusion assembly, and wherein the cathode cover is disposed in force transmitting relation relative to the pressure transfer assembly.

A further aspect of the present invention relates to a proton exchange membrane fuel cell power system which includes a membrane electrode diffusion assembly comprising:
  a solid proton conducting electrolyte membrane which has opposite anode and cathode sides;
  individual catalytic anode and cathode electrodes disposed in ionic contact with the anode and cathode sides of the electrolyte membrane; and
  a diffusion layer borne on each of the anode and cathode electrodes and which is electrically conductive and has a given porosity.

Still another aspect of the present invention is to provide a proton exchange membrane fuel cell power system having a solid electrolyte membrane which comprises crosslinked polymeric chains having sulfonic acid groups, and wherein the crosslinked polymeric chains comprise methacrylates.

Moreover, another aspect of the present invention relates to a proton exchange membrane fuel cell power system which includes current collectors which have at least about 70% open area.

These and other aspects of the present invention will be discussed in further detail hereinafter.

DETAILED DESCRIPTION OF THE DRAWINGS

The accompanying drawings serve to explain the principles of the present invention.

FIG. 8 is a longitudinal, horizontal, sectional view taken from a position along line 8—8 of FIG. 2.

FIG. 9 is a perspective, exploded, side elevation view of a proton exchange membrane fuel cell module utilized with the present invention, and the accompanying portion of the subrack which mates with same.

FIG. 22 is a fragmentary, transverse, vertical sectional view taken through a cathode cover of the present invention and showing one form thereof.

FIG. 23 is a fragmentary, transverse, vertical sectional view taken through a cathode cover of the present invention and showing an alternative form thereof.

FIG. 24 is a fragmentary, transverse, vertical sectional view taken through a cathode cover of the present invention and showing an alternative form thereof.

FIG. 25 is a fragmentary, transverse, vertical sectional view taken through a cathode cover of the present invention and showing an alternative form thereof.

FIG. 28 is a top plan view of a current collector employed in the PEM fuel cell module of the present invention.

FIG. 29 is a greatly enlarged perspective view of a pressure transfer assembly which is utilized with the present invention.

FIG. 30 is a greatly simplified, schematic view of the control assembly of the present invention.

FIG. 31 is a greatly simplified schematic view of a heat exchanger which is employed with the present invention.

DETAILED DESCRIPTION OF THE PREFERRED EMBODIMENTS

Figure 1:
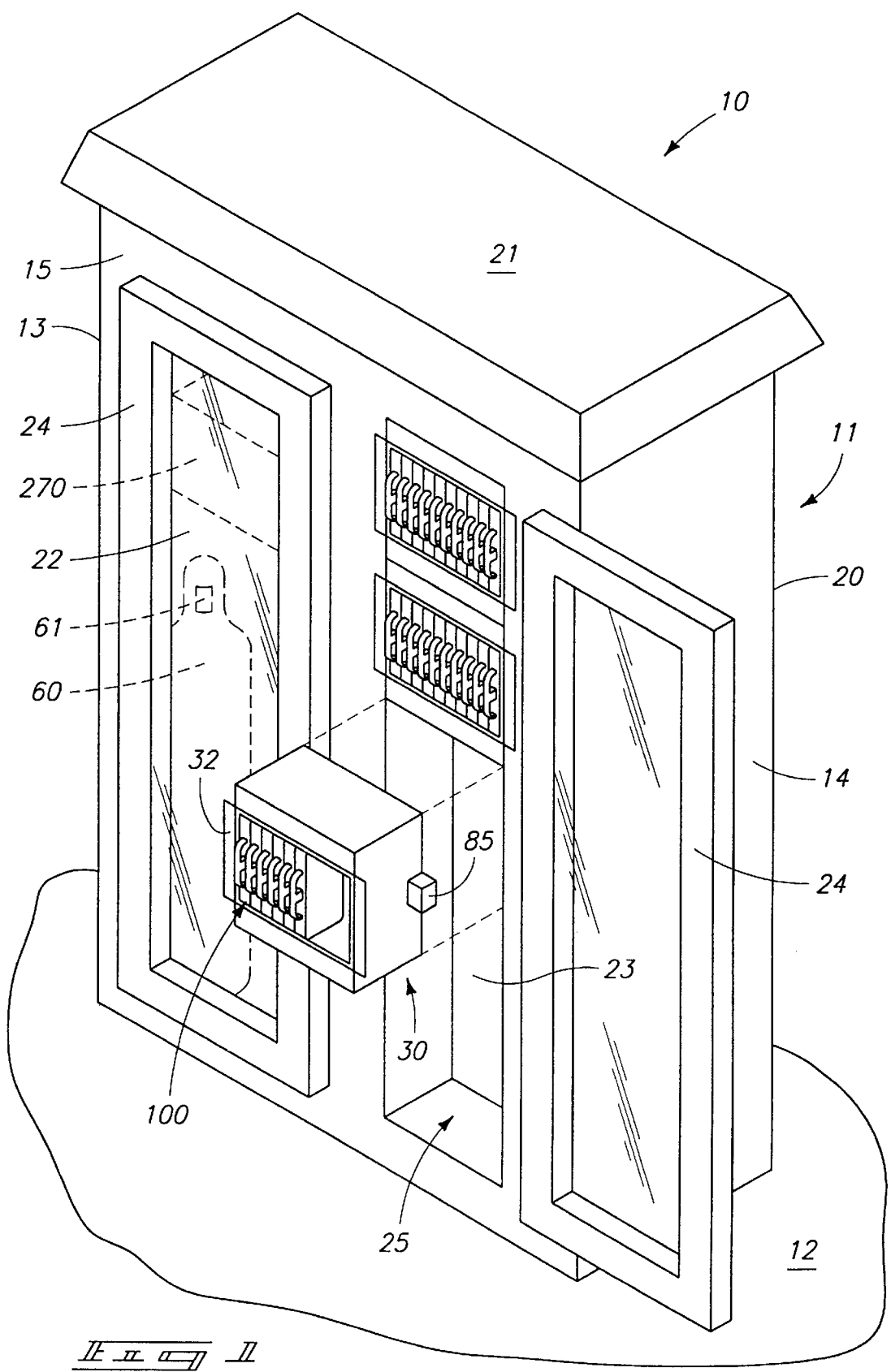
FIG. 1 is a perspective, front elevation view of a proton exchange membrane fuel cell power system of the present invention and showing some underlying structures in phantom lines.

The proton exchange membrane (PEM) fuel cell power system of the present invention is generally indicated by the numeral 10 in FIG. 1. As shown therein, the PEM fuel cell power system includes an enclosure which is generally indicated by the numeral 11, and which sits on the surface of the earth or other supporting surface 12. Enclosure 11 has left and right sidewalls 13 and 14, respectively, and front and rear surfaces 15 and 20, respectively. The enclosure has a top surface 21 which is joined to the left and right sidewalls; and front and rear surfaces respectively. First and second apertures 22 and 23 respectively are formed in the front surface 15. Further, a pair of doors which are generally designated by the numeral 24, are hingedly mounted on the front surface 15 and are operable to occlude the respective apertures 22 and 23. The enclosure 11, described above, defines a cavity 25 of given dimensions.

Figure 2:
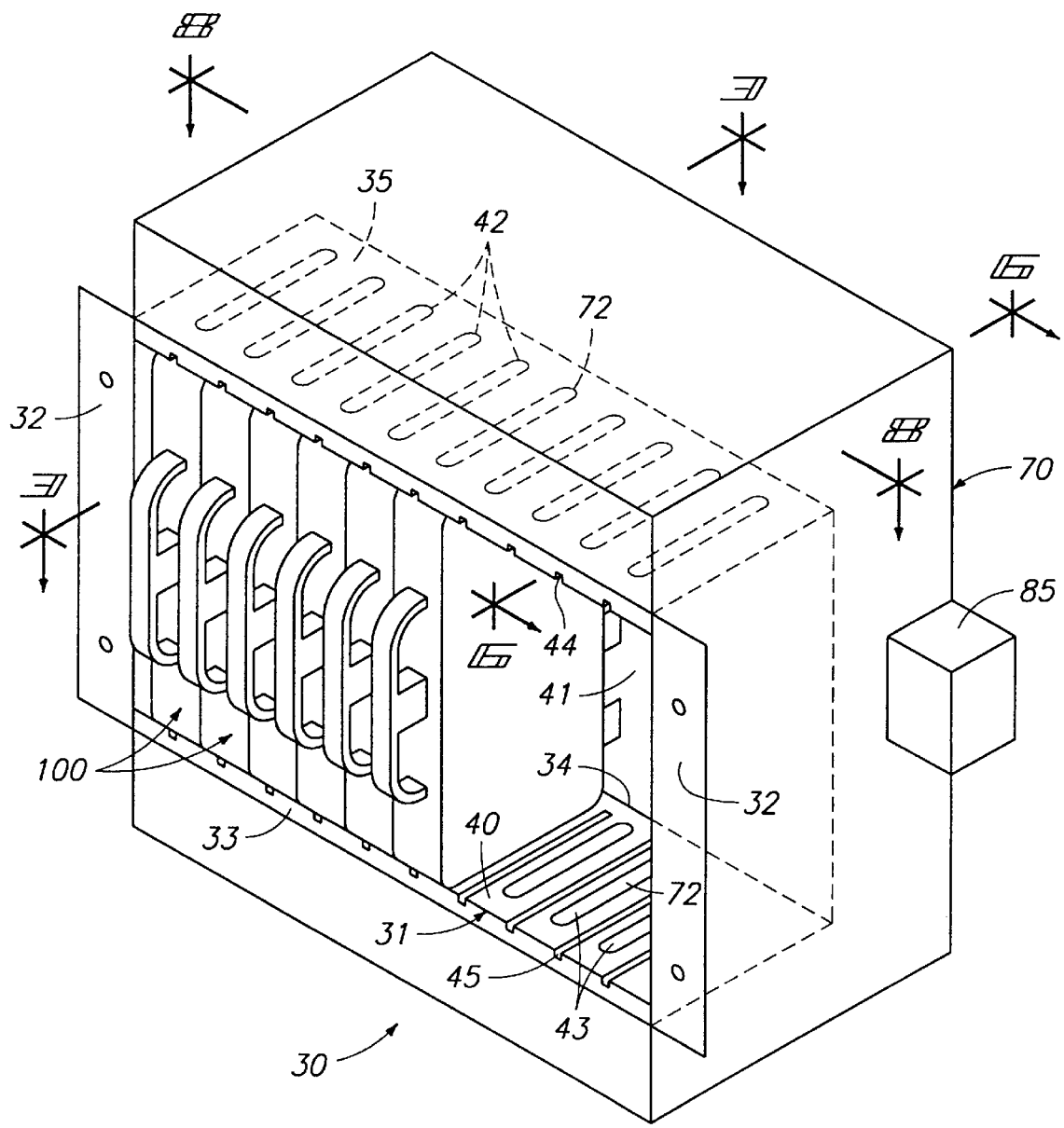
FIG. 2 is a perspective view of a subrack employed with the present invention.
Figure 3:
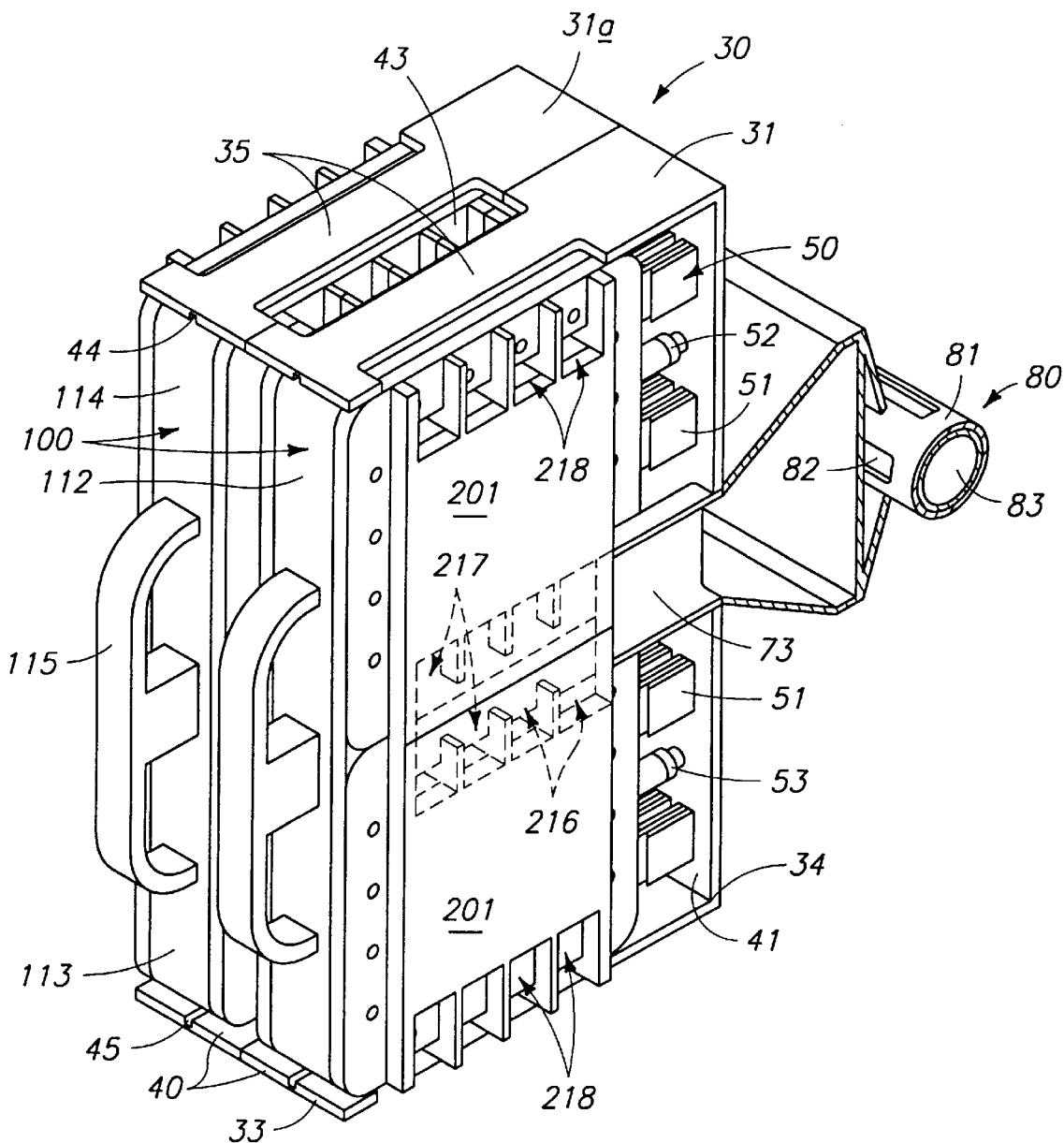
FIG. 3 is a fragmentary, transverse, vertical sectional view taken from a position along line 3—3 of FIG. 2.
Figure 4:
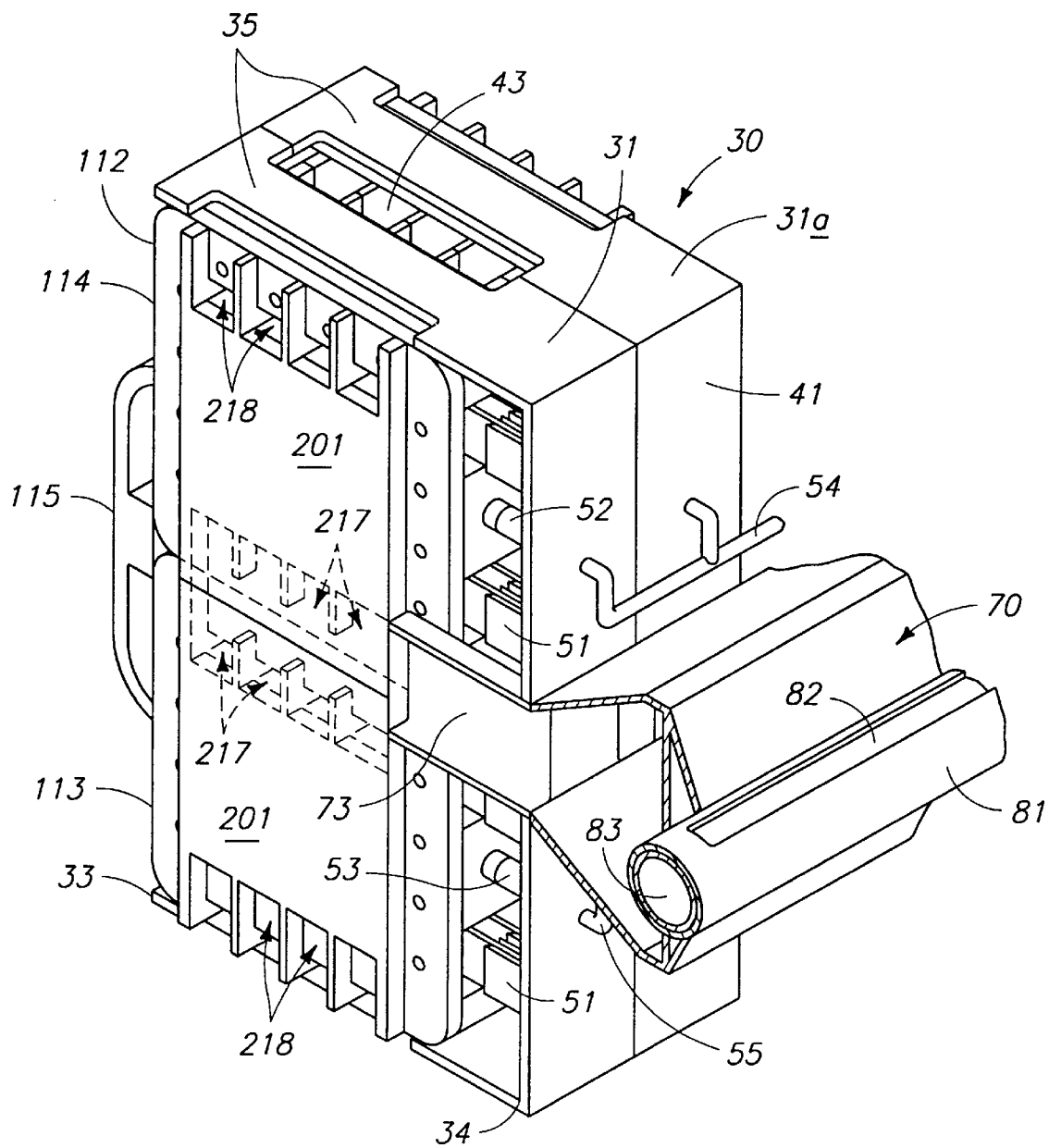
FIG. 4 is a second, fragmentary, transverse, vertical sectional view taken from a position along line 3—3 of FIG. 2.
Figure 5:
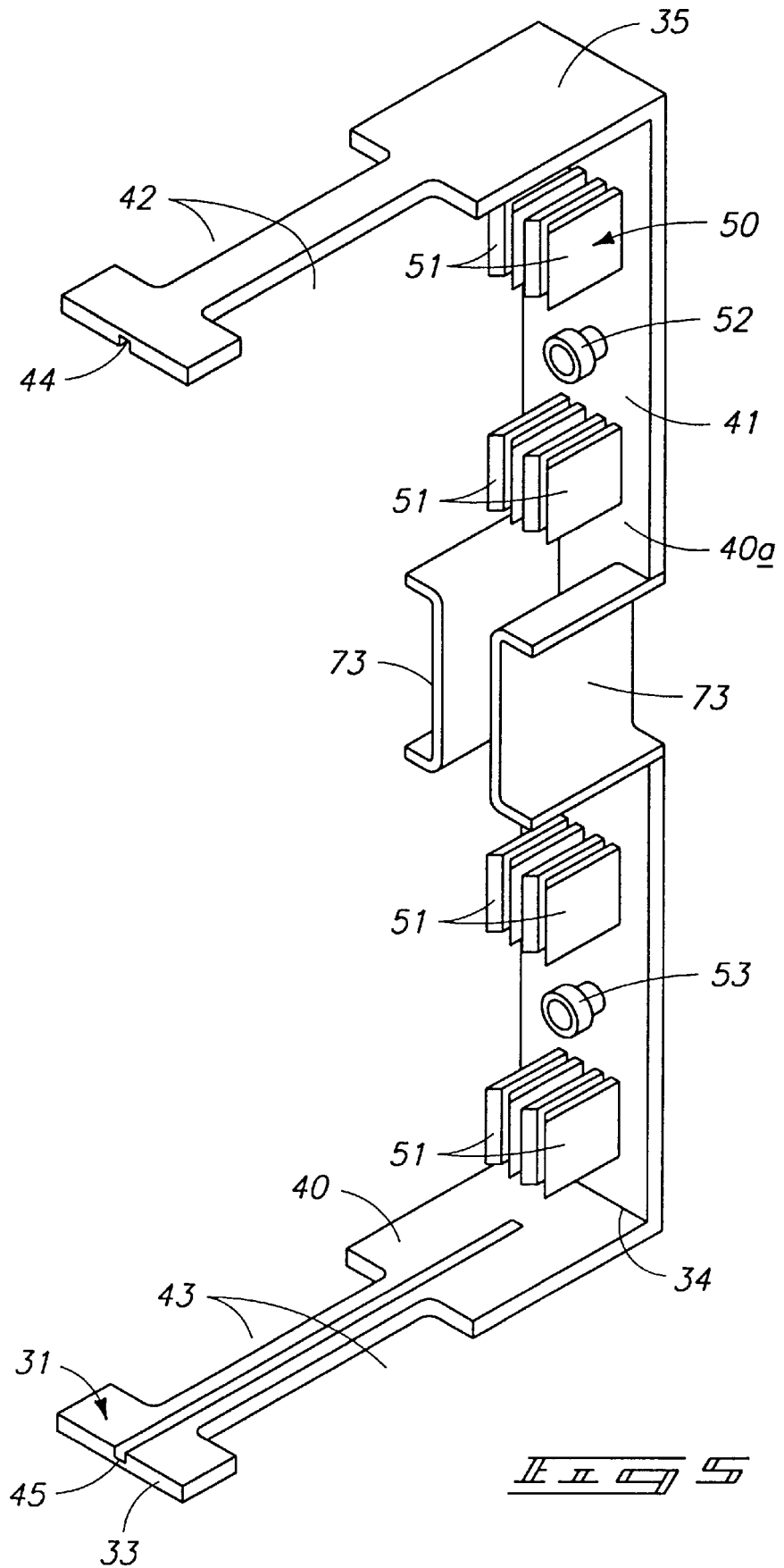
FIG. 5 is a perspective view of a portion of the subrack.
Figure 6:
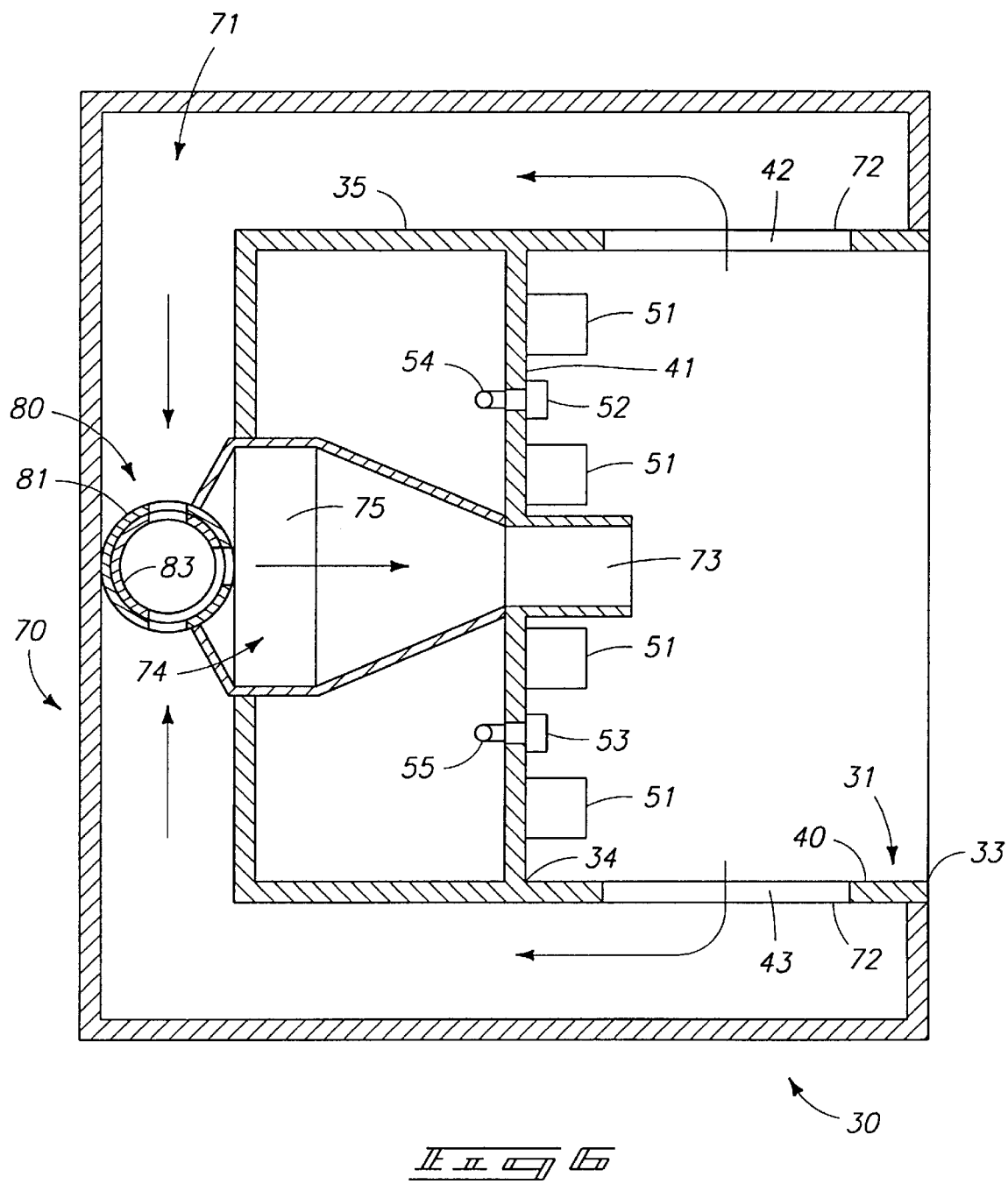
FIG. 6 is transverse, vertical, sectional view taken from a position along line 6—6 of FIG. 2.

Occluding the aperture 23 are a plurality of subracks which are generally indicated by the numeral 30. The subracks are individually mounted in the cavity 25, and are operable to support a plurality of discrete PEM fuel cell modules in a given orientation in the cavity 25. The PEM fuel cell modules will be discussed in greater detail hereinafter. Referring now to FIG. 2, each subrack 30 has a main body 31 for supporting the PEM fuel cell modules. The main body includes supporting flanges 32, which are attached by suitable fasteners to the enclosure 11. The subrack 30 has a forward edge 33 and a rearward edge 34. Further, the main body has top and bottom portions 35 and 40, respectively. A rear wall 41 (FIGS. 5 and 6) joins the top and bottom portions together at the rearward edge 34. As best seen in FIG. 2, a plurality of apertures 42 and 43 are formed in the top and bottom portions 35 and 40, respectively. Further, elongated channels 44 and 45 are formed in the respective top and bottom portions 35 and 40, respectively. As best understood by reference to FIGS. 3, 4, and 5, the main body 31 is made up of a number of discrete mirror image portions 31A, which when joined together, form the main body. This is further seen in FIG. 8. These mirror image portions are fabricated from a moldable, dielectric substrate. As best seen by reference to FIGS. 5 and 6, a D.C. (direct current) bus 50 is affixed on the rear wall 41 of the subrack 30. A repeating pattern of 8 pairs of conductive contacts 51 are attached on the rear wall 41. Further, first and second valves 52 and 53 are appropriately positioned relative to the 8 pairs of conductive contacts 51. As best seen in FIG. 6, the respective first and second valves 52 and 53 extend through the rear wall 41 and are coupled in fluid flowing relation relative to first and second conduits 54 and 55, respectively. Referring now to FIG. 8, the first conduit 54 constitutes a hydrogen distribution assembly which is coupled in fluid flowing relation with a source of hydrogen 60 (FIG. 1). Further, a valve assembly 61 is coupled in fluid meter relation relative to the source of hydrogen 60 and the first conduit 54. The second conduit 55 exhausts to ambient, or may be coupled in fluid flowing relation with other systems such as a hydrogen recovery and recycling system or alternatively a chemical reformer which produces a supply of hydrogen for use by the power system 10. In this regard, the hydrogen recovery and recycling system would recover or recapture unreacted hydrogen which has previously passed through the individual PEM fuel cell modules. This system, in summary, would separate the unreacted hydrogen from other contaminants (water, nitrogen, etc.) and return it to the power system 10. In the alternative, a chemical reformer may be utilized for the purpose described above, and the unreacted hydrogen would be returned to the chemical reformer where it would again be delivered to the individual PEM fuel cell modules, as will be described in further detail below.

Referring now to FIG. 6, the PEM fuel cell power system 10 of the present invention further includes an air distribution assembly 70 which is received in the enclosure 11 and which is coupled in fluid flowing relation relative to the subrack 30. The air distribution assembly 70 includes an air plenum which is generally indicated by the numeral 71. The air plenum 71 has a first intake end 72, and a second exhaust end 73. The exhaust end 73 is positioned intermediate the top and bottom portions 35 and 40 and delivers air to each of the PEM fuel cell modules supported on the subrack 30. Further, the intake end 72 is positioned in fluid flowing relation relative to the top and bottom portions 35 and 40 of the subrack 30.

Figure 7A:
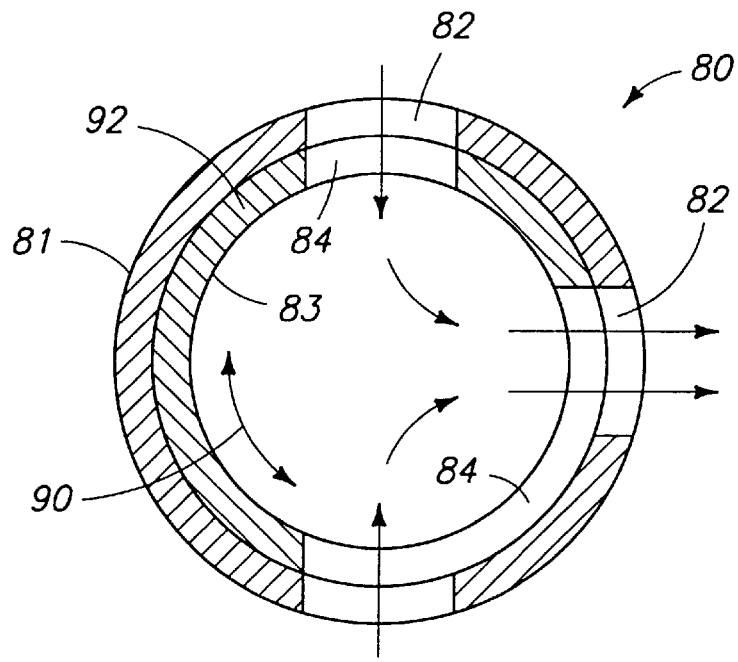
FIG. 7A is a transverse, vertical, sectional view taken through an air mixing valve of the present invention.
Figure 7B:
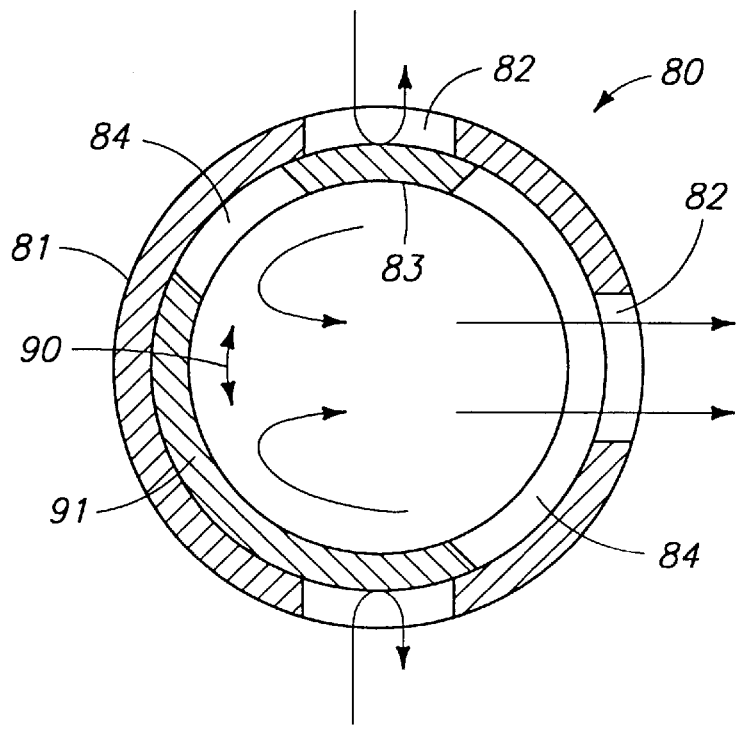
FIG. 7B is a transverse, vertical, sectional view taken through an air mixing valve of the present invention, and showing the valve in a second position.

An air movement ventilation assembly 74 comprising a direct current fan 75 or equivalent substitute is operably coupled to the plenum 71. The variably adjustable speed fan 75 moves air from the intake end 72 to the exhaust end 73 of the plenum 71. Referring now to FIGS. 6, 7A and 7B, an air mixing valve 80 is operably coupled with the air movement assembly 74, and the intake end 72 of the plenum 71. The air mixing valve 80 includes an outer tube 81 which has formed therein a pair of apertures 82 which communicate in fluid flowing relation with the air plenum 71. Still further, the air mixing valve 80 includes an inner tube 83 which is telescopingly received internally of, and substantially concentrically disposed relative to, the outer tube 81. The inner tube 83 is selectively rotatable relative to the outer tube 81. A pair of apertures 84 are formed in the inner tube and provides a convenient means by which the exhaust end 73 may be selectively coupled with the intake end 72 of the air plenum 71. Still further, it should be understood that the inner tube is connected in fluid flowing relation with ambient air which comes from outside of the plenum 71. As illustrated most clearly by references to FIG. 2, an actuator, or motor 85, is disposed in force transmitting relation relative to the air mixing valve 80 and more specifically, to the inner tube 83 thereof. The actuator 85, when energized, moves the air mixing valve 80 and more specifically, the second tube along a given course of travel 90 between a first position 91, as seen in FIG. 7B, to a second open position 92, which is seen in FIG. 7A. The movement of the air mixing valve 80 along this course of travel 90 facilitates the selective mixing of outside air with the air which has previously passed through the respective PEM fuel cell modules and which has become heated and humidified by way of the chemical reaction taking place within each of the proton exchange membrane fuel cell modules.

As best appreciated by a study of FIG. 30, temperature sensors 93 are positioned near the exhaust end 73 of the air plenum 71 for sensing the temperature of the air entering the discrete PEM fuel cell modules and near the plenum intake end 72. The temperature sensors 93 sense the temperature of the air mixture which comprises outside ambient air, and the air which has just passed through each of the discrete proton exchange membrane fuel cell modules. Still further, and as best seen in FIG. 30, a control assembly 250 is electrically coupled with the temperature sensors 93, and the actuator 85. The control assembly selectively energizes the actuator 85 to move the air mixing valve 80 along the course of travel 90 to control the temperature of the air delivered at the exhaust end 73 of the air plenum 71. As should be understood, the air movement assembly 74 has a speed of operation which is variably adjustable. In this regard, the control assembly is electrically coupled in controlling relation relative to the air movement assembly 74, temperature sensors 93, and the air mixing valve 80 to vary or otherwise optimize the performance characteristics of the Proton Exchange Membrane (PEM) fuel cell modules under assorted operational conditions. This relationship is illustrated most accurately by a study of FIG. 30.

Referring now to FIG. 9, a plurality of discrete PEM fuel cell modules are generally indicated by the numeral 100, and are releasably supported on the subrack 30. The description which follows relates to a single PEM fuel cell module 100, it being understood that each of the PEM fuel cell modules are substantially identical in construction, and are light in weight and can be readily manipulated or moved about by hand.

Figure 10:
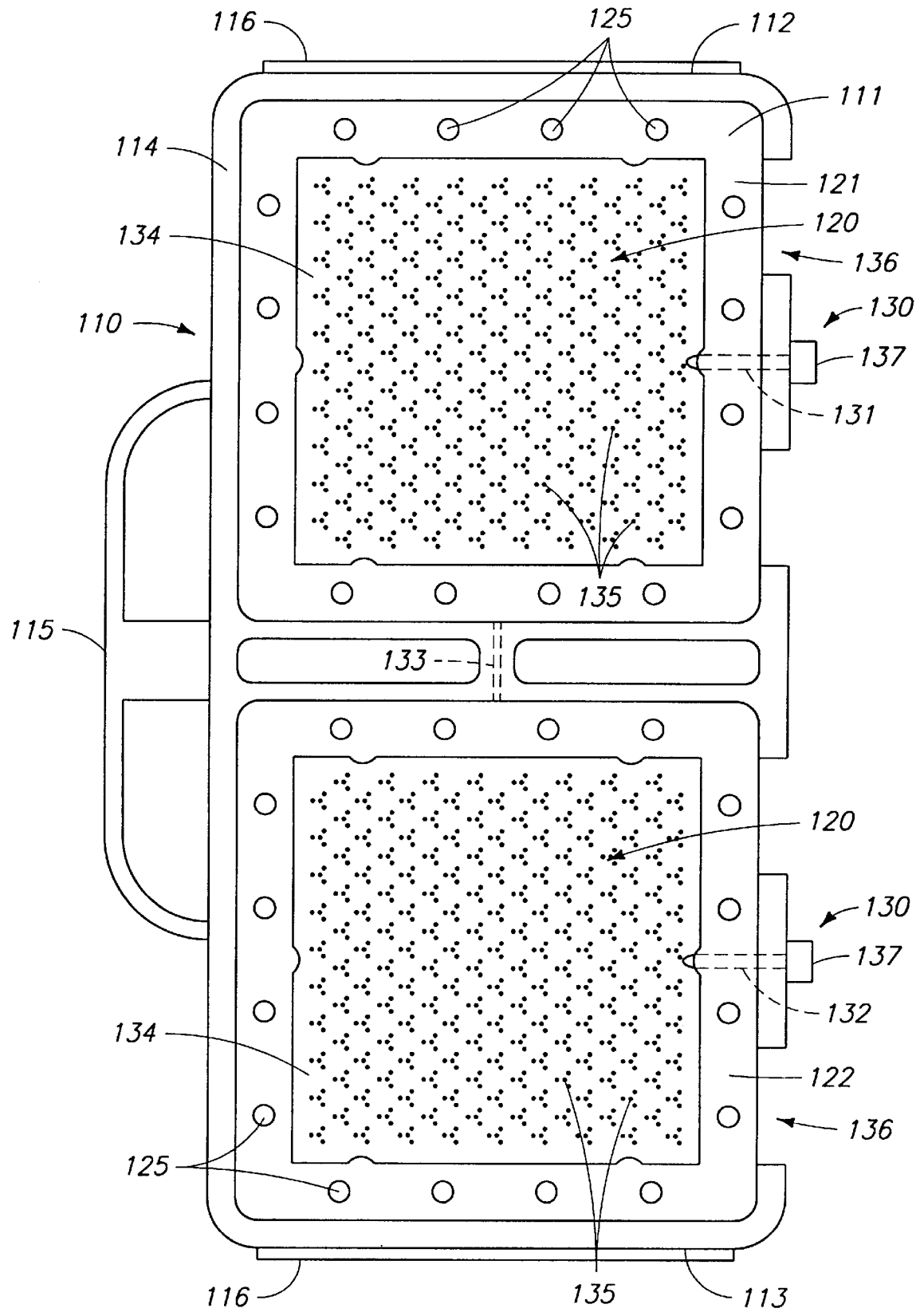
FIG. 10 is a side elevation view of a hydrogen distribution frame utilized with the proton exchange membrane fuel cell module of the present invention.

A discrete PEM fuel cell module 100 is best illustrated by reference to FIGS. 9 and 11 respectively. Referring now to FIG. 10, each PEM fuel cell module 100 includes a hydrogen distribution frame which is generally indicated by the numeral 110. The hydrogen distribution frame 110 is fabricated from a substrate which has a flexural modulus of less than about 500,000 pounds per square inch, and a compressive strength of less than about 20,000 pounds per square inch. As such, any number of suitable or equivalent thermoplastic materials can be utilized. The hydrogen distribution frame 110 includes a main body 111 as seen in FIG. 10. The main body has a first end 112, and an opposite second end 113. Further, the main body is defined by a peripheral edge 114. Positioned in a given location along the peripheral edge is a handle 115 which facilitates the convenient manual manipulation of the PEM fuel cell module 100. An elongated guide member or spine 116 is located on the first and second ends 112 and 113 respectively. Each spine 116 is operable to be matingly received in, or cooperate with, the respective elongated channels 44 and 45 which are formed in the top and bottom portions 35 and 40 of the subrack 30 (FIG. 9). As should be understood, the alignment and mating receipt of the individual spines 116 in the respective channels allows the individual PEM fuel cell modules 100 to be slidably received and positioned in predetermined spaced relation, one to the other, on the subrack 30. Such is seen most clearly by reference to FIG. 2. When received on the subrack 30, the exhaust end 73 of the air plenum 71 is received between two adjacent PEM fuel cell modules 100.

As seen in FIG. 10, the main body 111 defines a plurality of substantially opposed cavities 120. These cavities are designated as first, second, third, and fourth cavities 121, 122, 123, and 124 respectively. Still further, and referring again to FIG. 10, a plurality of apertures 125 are formed in given locations in the main body 111 and are operable to receive fasteners which will be discussed in further detail hereinafter. The main body 111 further defines a pair of passageways designated generally by the numeral 130. The pair of passageways include a first passage 131 which permits the delivery of hydrogen gas from the source of same 60, to each of the cavities 121–124; and a second passageway 132 which facilitates the removal of impurities, water and unreacted hydrogen gas from each of the cavities 121–124. A linking passageway 133 operably couples each of the first and second cavities 121, and 122, and the third and fourth cavities 123 and 124 in fluid flowing relation one to the other, such that hydrogen gas delivered by means of the first passageway 131 may find its way into each of the cavities 121–124. Each of the cavities 121 through 124 are substantially identical in their overall dimensions and shape. Still further, each cavity has a recessed area 134 having a given surface area and depth. Positioned in the recessed area 134 and extending substantially normally outwardly therefrom are a plurality of small projections 135. The function of these individual projections will be discussed in greater detail below. As best seen in FIG. 10, the first and second passageways 131 and 132 are connected in fluid flowing relation relative to each of the recessed areas 134. Referring still to FIG. 10, the peripheral edge 114 of the main body 111 is discontinuous. In particular, the peripheral edge 114 defines a number of gaps or openings 136. Referring now to FIG. 11, each passageway 131 and 132 has a terminal end 137 which has a given outside diametral dimension. The terminal end 137 of each passageway 130 is operable to matingly interfit in fluid flowing relation relative to the first and second valves 52 and 53 respectively.

Figure 26:
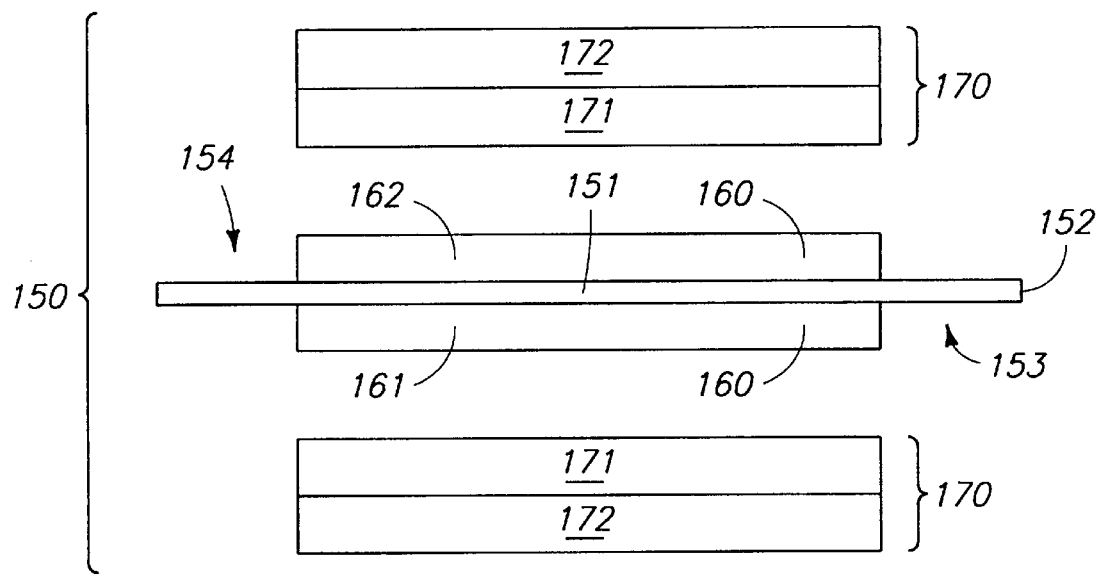
FIG. 26 is a greatly simplified, exploded view of a membrane electrode diffusion assembly of the present invention.
Figure 27:
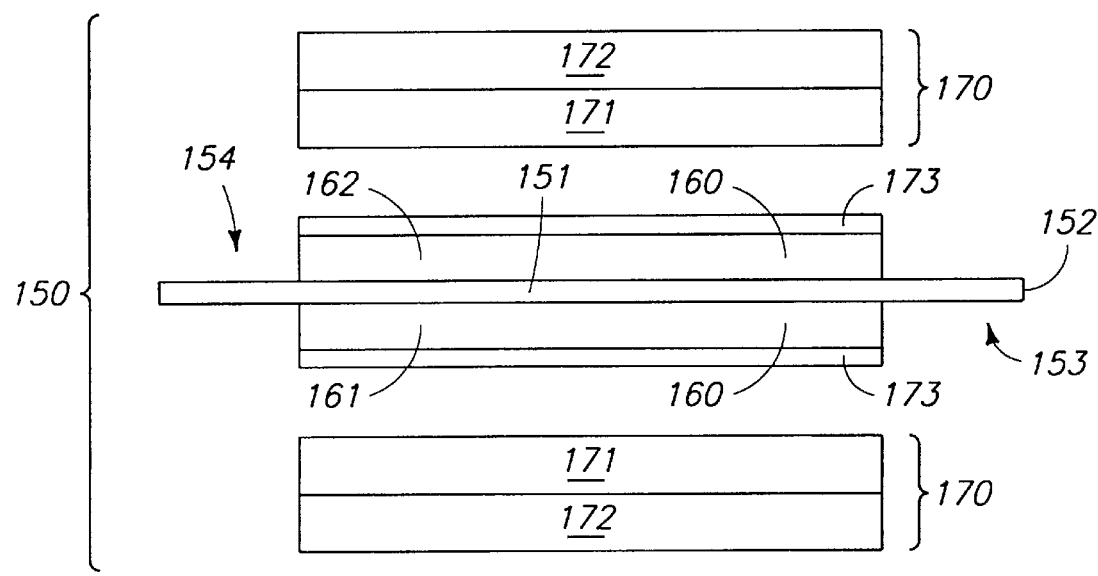
FIG. 27 is a greatly simplified, exploded view of an alternate form of the membrane electrode diffusion assembly of the present invention.

Referring now to FIGS. 12, 13, 26, and 27, sealably mounted within the respective cavities 121 through 124 respectively is a membrane electrode diffusion assembly 150 which is generally indicated by the numeral 150. The membrane electrode diffusion assembly 150 has a main body or solid electrolyte membrane 151 which has a peripheral edge 152 which is sealably mounted to the hydrogen distribution frame 110. The membrane electrode diffusion assembly 150 has an anode side 153, and an opposite cathode side 154. The anode side 153 is held in spaced relation relative to hydrogen distribution frame 110 which forms the respective cavities 121–124 by the plurality of projections 135 (FIG. 10). This special relationship ensures that hydrogen delivered to the respective cavities 121–124 reaches all parts of the anode side of the membrane electrode diffusion assembly 150. Electrodes 160, comprising catalytic anode and cathode electrodes 161 and 162 are formed on the main body 151. These individual anode and cathode electrodes 161 and 162 are disposed in ionic contact therewith. Still further, a noncatalytic electrically conductive diffusion layer 170 is affixed on the anode and cathode electrodes 160 and has a given porosity. As best illustrated in FIG. 26, the noncatalytic electrically conductive diffusion layer 170 has a first diffusion layer 171 which is positioned in ohmic electrical contact with each of the electrodes 161 and 162 respectively, and a second diffusion layer 172 which is positioned in ohmic electrical contact with the underlying first diffusion layer. As best seen in FIG. 27, a second form of the membrane electrode diffusion assembly 150 is shown and wherein a third diffusion layer 173 is provided. In this form, the third layer is affixed to the main body 151 prior to affixing the first and second diffusion layers thereto. In this regard, a number of commercially available membrane electrode assemblies are fabricated which have a preexisting proprietary diffusion layer attached to same, the composition of which is unknown to the inventors.

Referring now to FIG. 26, the membrane electrode diffusion assembly 150 and more specifically, the first diffusion layer 171 which is affixed thereto comprises a coating of particulate carbon suspended in a binding resin. Further, the second diffusion layer 172 comprises preferably a porous hydrophobic carbon backing layer. With respect to the binding resin, it is substantially hydrophobic and is selected from the group consisting essentially of perfluorinated hydrocarbons or a substitute equivalent. Further, the first diffusion layer 171 has about 20% to about 90% by weight of particulate carbon. With respect to the second diffusion layer 172, it is selected from the group consisting essentially of carbon cloth, carbon paper, or carbon sponge or a substitute equivalent which has been rendered hydrophobic. In the preferred form of the invention, the first diffusion layer 171 is a composite coating formed of successive layers of the first diffusion layer, each of the successive layers having a given hydrophobicity. Additionally, the first diffusion layer 171 has a hydrophobic gradient. This gradient can be altered by adjusting the hydrophobicity of the successive layers that form the composite coating. Depending upon the desired performance parameters of the membrane electrode diffusion assembly 150 that is employed, the successive layers closest to the second diffusion layer 172 may be the least hydrophobic of all the successive layers, or the most hydrophobic. To affix the first and second diffusion layers 171 and 172 to the underlying anode and cathode electrodes 161 and 162, a thermoplastic binding agent can be utilized and which is selected from the group consisting essentially of polyethylene or wax, or a substitute equivalent. Still further, these same layers may be attached by pressure and heat. In the preferred form of the invention, the individual anode and cathode electrodes 161 and 162 comprise particulate carbon; a catalyst such as platinum or the like; and a crosslinked copolymer incorporating sulfonic acid groups.

The method of forming the first and second diffusion layers 171 and 172, as described above, is discussed in the paragraphs which follow. The method of forming a diffusion layer 170 for use with a membrane electrode diffusion assembly 150 comprises as a first step, providing a carbon backing layer constituting a second diffusion layer 172. The carbon backing layer is selected from the group consisting essentially of carbon cloth, carbon paper, or carbon sponge. The subsequent steps in the method comprises applying a hydrophobic polymer to the carbon backing layer constituting the second diffusion layer 172; and sintering the carbon backing layer constituting the second diffusion layer at a temperature greater than the melting point of the hydrophobic polymer. As discussed above, the hydrophobic polymer is selected from the group consisting essentially of perfluorinated hydrocarbons or a substitute equivalent. Still further, in the method as described, the sintering step takes place at a temperature of about 275 degrees to about 365 degrees C. The preferred method of forming the diffusion layer 170 for use with the membrane electrode diffusion assembly 150 comprises providing a porous carbon backing layer constituting the second diffusion layer 172; and applying a porous coating comprising a slurry of particulate carbon, a binding resin and a delivery fluid which is applied on the porous carbon backing layer. The porous carbon backing layer constituting the second diffusion layer 172 is the same as was described above. Further, the binding resin is hydrophobic and may include perfluorinated hydrocarbons. The porous coating comprises at least about 20% to about 90% by weight of the is particulate carbon. The delivery fluid utilized to form the slurry of particulate carbon and the binding resin comprises water, and a compatible surfactant. In this regard, the delivery fluid consists essentially of about 95% to about 99% by weight of water; and about 1% to about 5% by weight of the compatible surfactant. The surfactant is selected from the group consisting essentially of ammonium hydroxide and/or alcohol. In the examples which follow, the delivery fluid utilized consists of a solution of 2-butoxyethanol and ammonium hydroxide as the surfactants. A solution such as this may be commercially secured. In the present instance, the inventors used a commercially available cleaner with properties such as "Windex". Windex is the registered trademark of S. C. Johnson and Sons. After the delivery of the slurry which includes the binding resin and particulate carbon, the method further comprises removing the delivery fluid thereby leaving behind or depositing the particulate carbon and the binding resin on the porous carbon backing layer constituting the first diffusion layer 171. The delivery fluid is removed by applying heat energy to same which facilitates the evaporation of the delivery fluid.

In another alternative form of the invention, the binding resin and porous carbon coating slurry as described above, may be applied in successive coats thereby creating a hydrophobic gradient. This hydrophobic gradient, as earlier discussed, may be adjusted by altering the hydrophobicity of each of the successive coats. To achieve this adjustable hydrophobic gradient, binding resins are selected from the group consisting essentially of hydrophobic and hydrophilic binding resins or a substitute equivalent. As should be appreciated, the given hydrophobicity of each coat forming the composite first diffusion layer 171 may be adjusted by providing a predetermined mixture of the hydrophobic and hydrophilic binding resins in the resulting slurry or by altering the proportional relationship of the components. As was discussed above, each of the coatings of the composite first diffusion layer 171 which are applied closest to the porous carbon backing layer may be the most hydrophilic or the least hydrophilic depending upon the performance characteristics desired for the membrane electrode diffusion assembly 150. Still further, the method may include a sintering step whereby the resulting diffusion layer 170 is sintered at a temperature effective to melt the binding resin and create a substantially homogeneous surface. In addition to the foregoing, the method further comprises, after the sintering step, applying a predetermined pattern of pressure of a given value to the diffusion layer 171, and which is effective to vary the porosity of the resulting diffusion layer 170. As was discussed above, the diffusion layer 170 may be attached to the underlying catalytic anode and cathode electrodes 162 and 163 respectively by utilizing a thermoplastic binding emulsion which is selected from the group consisting essentially of polyethylene or wax or alternatively by utilizing heat and pressure.

The diffusion layer 170, described above, is useful in managing the water which is generated as a result of the chemical reaction taking place in each of the PEM fuel cell modules 100. In this regard, the inventors have discovered that the diffusion layer 170 allows sufficient water to escape from the cathode side of the membrane electrode diffusion assembly 150 such that the PEM fuel cell module 100 does not "flood out" with water thereby inactivating same. On the other hand, the hydrophobic gradient, as described above, facilitates the retention of sufficient moisture such that the PEM fuel cell module 100 becomes self-humidifying, that is, sufficient water is retained in the membrane electrode diffusion assembly 150 such that it achieves substantially the maximum current density possible without the addition of extra moisture or humidification from outside of the PEM fuel cell module 100. Still further, the air distribution assembly 70 and air mixing valve 80 provides a convenient means by which outside ambient air may be added to air which has previously passed through each of s the PEM fuel cell modules 100 thereby maintaining the PEM fuel cell modules 100 in a properly humidified state. As should be understood, this mixing of air effectively removes water from the cathode side of membrane electrode diffusion assembly 150. Additionally, the same mixing of air effectively removes heat energy which is a by-product of the chemical reaction taking place in each of the PEM fuel cell modules 100 and thus maintains the PEM fuel cell modules at a stable temperature. In this regard, the air delivered at the exhaust end 73 of the air plenum 71 constitutes the cathode air flow, and in the present invention 10 a novel feature of the power system 10 is that a preponderance of the heat energy produced by each of the PEM cell modules 100 is removed from same by this cathode air flow.

Examples of forming the diffusion layer 170 on an underlying main body 151 of the membrane electrode diffusion assembly 150 is set forth below.

The examples set forth hereinafter relate to the fabrication of the diffusion layer 170 as seen in FIGS. 26 and 27, respectively.

GENERAL TEST PROCEDURES

A hydrogen/air fuel cell test fixture was fabricated from a two-part stainless steel fixture which encloses a 4 cm×4 cm proton conductivity membrane electrode diffusion assembly (MEDA) for testing. The hydrogen side of the block (anode) defines a cavity which contains a flat, perforated ceramic plate. Pressure conditions effective to affix top of this plate is a matching perforated platinum coated nickel current collector. Hydrogen gas passes into the anode half of the stainless steel fixture, through the holes in the ceramic plate and the associated current collector. The hydrogen is thus able to reach the anode of the MEDA, which is placed on top of the anode current collector.

The proton-conducting MEDA, which is purchased from the W.L. Gore Company under the trade designation Primea 6000 Series is larger than the electrodes which are affixed to same, the MEDA, having dimensions of about 5 cm×5 cm. This allows for the placement of a sealing gasket around the periphery of the electrodes when the stainless steel test fixture is bolted together.

The cathode side of the test fixture also defines a cavity which matingly receives a perforated ceramic plate and current collector. However, the stainless steel fixture does not press the current collector against the MEDA directly. Instead, five screws are mounted on the test fixture cathode side. These screws press against a perforated metal pressure plate. The plate has apertures which are substantially coaxially aligned with the holes formed in the ceramic plate. These screws further press against the ceramic plate and the current collector. By threadably advancing the screws, the current collector contact pressure relative to the MEDA can be selectively adjusted after the stainless steel test fixture has been bolted together.

A supply of air is provided at the cathode, by means of several holes which have been machined into the stainless steel fixture between the aforementioned pressure screws. This allows air to travel past the screws and the perforated steel pressure plate, ceramic plate, and current collector to the cathode side of the MEDA.

The test MEDAs were placed over the cathode of the test fixture along with a sealing gasket. The test fixture is then bolted together. The pressure screws are then threadably advanced until sufficient force has been generated at the current collector cathode/anode interfaces for good electrical contact. Once this has been accomplished, the hydrogen gas is supplied at a pressure of about 5 PSI. The anode side of the MEDA is then purged of any air. A supply of fresh air is then supplied to the cathode side of the MDEA by means of a fan or the like. The supply of air had a dewpoint of 15 degrees Celsius.

Electrical performance is tested by loading the fuel cell with a variety of resistors. Since the resistor values are known, the current can be computed by examining the voltage across the resistors. MEDAs are initially short-circuited to condition them, and then are allowed to stabilize at a given load of usually about 0.6 volts. When a steady-state power output has been obtained, the data is gathered.

For comparative testing, the diffusion layers 170 which are affixed on the cathode and anode sides of MEDA are often dissimilar. A PEM fuel cell's electrical performance is largely unaffected when the configuration of the anode diffusion layer is changed. However, the diffusion layer placed on the cathode side of the MEA, on the other hand, has a significant impact on the electrical performance of the PEM fuel cell because water production, and evaporation of same, must occur on the cathode side of the MEDA. As earlier noted, the fabrication method described above includes subjecting the diffusion layer 170 to given temperature and pressure conditions effective to affix the diffusion layer 170 to the underlying MEA thus forming the MEDA. In this regard, the same pressure is applied to the cathode and anode sides of the MEDA. The most accurate comparison between two different diffusion layers made by the foregoing methods is done by using a single MEDA. In this regard, comparative testing between dissimilar layers is done by simply flipping the MEDA over in the test fixture, thus reversing the anode and cathode sides of the MEDA. Therefore, the same MEDA is tested with different diffusion layers acting as the cathode.

EXAMPLE 1

A sheet of carbon paper (Toray TGP-H-060) was dipped into a solution of 2:3 Teflon-120 (Dupont) and deionized water for several minutes. Teflon-120 is a hydrophobic polymer comprising polytetrafloroethylene. Teflon-120 is a trade designation of the E.I. Dupont Company. After removal from the solution the carbon paper was allowed to dry in a horizontal position on top of an open cell foam sponge. The carbon paper was then placed in an air-filled sintering oven (360° C.) for 3–5 minutes. This rendered the carbon paper hydrophobic.
Diffusion Layer Side "A".

A solution comprising water, and a compatible surfactant was then prepared. In this regard, 200 ml of a commercially available cleaner "Windex" was mixed with 4.2 g Vulcan XC-72R (Cabot) particulate carbon powder. The mixture was sonicated for 90 seconds at a power of about 200 watts, using a stir-bar to agitate the mixture during sonication and create a slurry. After sonication, 1 ml of a hydrophobic polymer, Teflon-30 (Dupont), was added. The slurry was then sprayed onto the carbon paper with an air brush using multiple passes. Once the carbon paper was wetted with the solution, it was placed on a hot plate to evaporate the solution comprising the water and surfactant. The spraying/drying process was then repeated. As will be appreciated, the process of evaporation deposited the particulate carbon and associated binding resin until a final (dried) added weight of 6.4 mg/cm$^2$ had been achieved. Finally, the coated carbon paper was loaded into the air-filled sintering oven at 360° C. for 3–5 minutes. This sintering melted the binding resin and created a substantially homogeneous surface.
Diffusion Layer Side "B".

Side "B" was fabricated in approximately the same manner as side "A" described above. However, side "B" was placed into a press for 10 seconds and was subjected to three tons of force. An irregular surface was placed on top of the diffusion layer side "B" prior to subjecting it to pressure. In the present test a 150-grit sandpaper with an aluminum foil spacer sheet was utilized. The spray-on side faced the sandpaper/foil during the pressing stress.
MEA Fabrication:

The diffusion layers were affixed to a commercially available membrane electrode diffusion assembly such as that which may be secured from the W.L. Gore Company under the trade designation Primea Series 6000. This was done by placing the assembly in a hot press. The MEDA was hot pressed several times using successively higher pressures. Data was taken between successive presses.
Results:

Each sample was loaded into the test fixture described above. Temperatures were measured at the diffusion layer surface and were within a range of +/−2° C. These temperatures were controlled by varying the cathode air flow. Values are current density as expressed in mA/cm$^2$ at 0.6 volts. Sides "A" and "B" as noted below refer to that side acting as the cathode.

| Press Method | 36° C. A | 36° C. B | 45° C. A | 45° C. B | 53° C. A | 53° C. B |
|---|---|---|---|---|---|---|
| 3.5 tons, 190° C., 20 sec | — | — | — | — | — | — |
| 4 tons, 190° C., 20 sec | 318 | 319 | 293 | 325 | 277 | 316 |
| 4.5 tons, 180° C., 30 sec | 372 | 363 | 350 | 353 | 322 | 322 |
| 5 tons, 180° C., 30 sec | 399 | 371 | 363 | 374 | 319 | 361 |
| 5.5 tons, 180° C., 30 sec | 338 | 363 | 375 | 394 | — | — |
| 6 tons, 170° C., 40 sec | 269 | 250 | 356 | 380 | 363 | 354 |

Conclusions: The patterned-press (side "B") yields slightly better or equal performance at 45° C. and 53° C. at 8 of the 9 comparative data points. Good performance is also obtained with side "A".

EXAMPLE 2

A sheet of carbon paper (Toray TGP-H-060) was dipped into a solution of 2:3 Teflon-120 (Dupont) and deionized water solution for several minutes. As earlier noted, Teflon-120 is a trade designation of E.I. Dupont Company. After removal from the solution the carbon paper was allowed to dry in a horizontal position on top of an open cell foam sponge. The carbon paper was then placed in an air-filled sintering oven (360° C.) for 3–5minutes. The heat energy melted the polytetrafluoroethylene (Teflon-120) thus making a substantially homogeneous surface. This sintering rendered the carbon paper hydrophobic.
Diffusion layer side "A":

A slurry was then prepared utilizing water and a compatible surfactant such as ammonia or the like. In the present example the slurry was prepared by mixing 200 ml of a commercially available cleaner "Windex" with 4.2 g Vulcan XC-72R (Cabot) particulate carbon powder. The slurry was then sonicated for 90 seconds at a power of about 200 watts, using a stir-bar to agitate the slurry during sonication. After sonication, 1 ml of hydrophobic polymer solution Teflon-30 (Dupont) was added. The slurry was then sprayed onto the carbon paper with an air brush using multiple passes as was described earlier. Once the carbon paper had been wetted with the slurry, it was placed on a hot plate to evaporate the solution of water and surfactant. The spraying/drying process was then repeated until a final (dried) added weight of 6.4 mg/cm$^2$ had been achieved. Side "B" was subsequently placed into a press for 10 seconds and subjected to three tons of force. As with the first example, an irregular surface was utilized between the press and the sprayed on layers. In this example, a 150-grit sandpaper with an aluminum foil spacer sheet was employed. The spray-on side faced the sandpaper/foil combination during pressing.
Diffusion layer side "B":

A similar slurry was prepared by mixing 200 ml of "Windex" with 4.2 g Vulcan XC-72R (Cabot) carbon powder. The mixture was sonicated for 90 seconds at a power of about 200 watts, using a stir-bar to agitate the mixture during sonication. After sonication, a 1.2 ml solution of Teflon-30 (Dupont) was added to the slurry. The mixture was then sprayed onto the carbon paper with an air brush using multiple passes. Once the carbon paper had been wetted with the solution, it was placed on a hot plate to evaporate the water and surfactant solution (Windex). The spraying/drying process was then repeated until a final (dried) added weight of 4.91 mg/cm$^2$ had been achieved.

A second slurry was then prepared by mixing 200 ml of "Windex" with 4.2 g Vulcan XC-72R (Cabot) carbon powder. The slurry was sonicated for 90 seconds at a power of about 200 watts, using a stir-bar to agitate the mixture during sonication. After sonication, 0.5 ml of Teflon-30 (Dupont) was added. The slurry was then sprayed onto the previously coated carbon paper with an air brush using multiple passes. Once the carbon paper had been wetted with the slurry, it was placed on a hot plate to evaporate the water and surfactant and thus deposit the hydrophobic polymer and the particulate carbon. The spraying/drying process was then repeated until a final (dried) added weight of 1.58 mg/cm$^2$ had been achieved. The total weight of the spray-on layers was 6.5 mg/cm$^2$. Side "B" was placed into the press for 10 seconds at 3 tons of force underneath an irregular surface (150-grit sandpaper with an aluminum foil spacer sheet). The spray-on side faced the sandpaper/foil combination during pressing.

MEA Fabrication:

The diffusion layers were affixed to a commercially available MEDA such as what was described in Example 1, above. This was done by placing the assembly in the hot press. The MEDA was hot pressed several times using successively higher pressures. Data was taken between successive presses.

Results:

Each sample was loaded into the test fixture as described earlier. Temperatures as noted below were measured at the diffusion layer surface and are within a tolerance of +/−2° C. The values which are set forth are expressed in mA/cm$^2$ at 0.6 volts. Sides "A" and "B" refer to that side acting as the cathode. For this sample, as identified, hot pressing involved two identical steps at the same pressure and rotating the MEDA 180 degrees between each pressing.

| | 36° C. | | 45° C. | | 53° C. | |
|---|---|---|---|---|---|---|
| Press Method | A | B | A | B | A | B |
| 2 × 3.5 tons, 170° C., 40 s | 238 | 219 | 318 | 219 | 277 | 244 |
| 2 × 4 tons, 170° C., 40 s | 263 | 263 | 331 | 356 | 331 | 325 |
| 2 × 4.5 tons, 170° C., 40 s | 206 | 206 | 338 | 344 | 325 | 356 |
| 2 × 5 tons, 170° C., 40 s | 219 | 219 | 325 | 338 | 325 | 356 |
| 2 × 5.5 tons, 170° C., 40 s | 188 | 213 | 263 | 269 | 244 | 256 |

The results demonstrate that the reverse gradient samples, when subjected to greater than 3.5 tons pressure, produces current densities which are equal to or better than the non-gradient samples in 11 of 12 comparative tests.

EXAMPLE 3

A sheet of carbon paper (Toray TGP-H-090) was dipped into a solution of 4:9 Teflon-120 (Dupont) and deionized water for several minutes. After removal from the solution the carbon paper was allowed to dry in a horizontal position on top of an open cell foam sponge. The carbon paper was then placed in an air-filled sintering oven (360° C.) for 3–5 minutes. This rendered the carbon paper hydrophobic.

Diffusion layer side "A":

A slurry was then prepared by mixing 200 ml of "Windex" with 4.2 grams of Vulcan XC-72R (Cabot) carbon powder. This is identical to the previous examples. The slurry was then sonicated for 90 seconds at a power of about 200 watts, using a stir-bar to agitate the mixture during sonication. After sonication, a 1.2 ml solution of Teflon-30 (Dupont) was added to the slurry. The slurry was then sprayed onto the carbon paper with an air brush using multiple passes. Once the carbon paper had been wetted with the solution, it was placed on a hot plate to evaporate the water and surfactant solution (Windex) and thus deposit the hydrophobic polymer and particular carbon. The spraying/drying process was then repeated until a final (dried) added weight of 1.0 mg/cm$^2$ had been achieved.

A second slurry was then prepared by mixing 200 ml of "Windex" with 4.2 grams of Vulcan XC-72R (Cabot) carbon powder. The slurry was then sonicated for 90 seconds at a power of about 200 watts, using a stir-bar to agitate the mixture during sonication. After sonication, 0.5 ml of a solution of Teflon-30 (Dupont) was added. The slurry was then sprayed onto the previously coated carbon paper with an air brush using multiple passes. Once the carbon paper had been wetted with the slurry, it was placed on a hot plate to evaporate the water and surfactant solution (Windex), and thereby deposit the hydrophobic polymer and particulate carbon. The spraying/drying process was repeated until a final (dried) added weight of 0.5 mg/cm$^2$ had been achieved. The total weight of the spray-on layers is approximately 1.5 mg/cm$^2$.

Diffusion layer side "B":

Side "B" was prepared exactly the same as side "A". However, side "B" was placed into a press for 10 seconds and subjected to three tons of force underneath an irregular surface (150-grit sandpaper with an aluminum foil spacer sheet). The spray-on side faced the sandpaper/foil combination during pressing.

MEA Fabrication:

The diffusion layers were affixed to a commercially available MEDA as was discussed in Example 1, above. This was done by placing the MEDA in a hot press. The MEDA was hot pressed several times using successively higher pressures. Data was taken between successive presses.

Results:

Each sample was loaded into the aforementioned test fixture. The temperature as noted below was measured at the diffusion layer surface and is within a tolerance of +/−2° C. The values below are expressed in mA/cm$^2$ at 0.6 volts. Sides "A" and "B" refer to that side acting as the cathode. For this sample, hot pressing usually involved two identical steps at the same pressure. The MEDA was rotated about 180 degrees between each pressing.

| | 36° C. | | 45° C. | | 53° C. | |
|---|---|---|---|---|---|---|
| Press Method | A | B | A | B | A | B |
| 2 × 3.5 tons, 170° C., 40 s | — | — | — | — | — | — |
| 2 × 4 tons, 170° C., 40 s | 363 | 316 | 369 | 338 | 350 | 319 |
| 2 × 4.5 tons, 170° C., 40 s | 363 | — | 363 | — | 325 | — |
| 2 × 5 tons, 170° C., 40 s | 413 | — | 416 | — | 400 | — |
| 4 × 5.5 tons, 170° C., 30 s | 388 | — | 419 | — | 413 | — |

The data above further confirms the novelty of the diffusion layer 170 and associated membrane electrode diffusion assembly construction 150.

EXAMPLE 4

Diffusion Layer Side "A"

A sheet of carbon paper (Toray TGP-H-060) was dipped into a solution of 4:9 Teflon-120 (Dupont) and deionized water for several minutes. After removal from the solution the carbon paper was allowed to dry in a horizontal position on top of an open cell foam sponge. The carbon paper was then placed in an air-filled sintering oven (360° C.) for 3–5minutes. This sintering rendered the carbon paper hydrophobic.

A slurry was then prepared utilizing water and a compatible surfactant such as ammonia or the like. In the present example the slurry was prepared by mixing 200 ml of a commercially available cleaner "Windex" with 4.2 g Vulcan XC-72R (Cabot) carbon powder. The slurry was sonicated for 90 seconds at a power of about 200 watts, using a stir-bar to agitate the slurry during sonication. After sonication, 1.2 ml of hydrophobic polymer solution Teflon-30 (Dupont) was added. The mixture was then sprayed onto the carbon paper with an air brush using multiple passes as was described earlier. Once the carbon paper had been wetted with the slurry, it was placed on a hot plate to evaporate the solution of water and surfactant. The spraying/drying process was then repeated until a final (dried) added weight of 4.2 mg/cm$^2$ had been achieved.

A second slurry was then prepared by mixing 200 ml Windex with 4.2 g Vulcan XC-72R (Cabot) carbon powder. The slurry was sonicated for 90 seconds at a power of about 200 watts, using a stir-bar to agitate the slurry during sonication. After sonication, 0.5 ml of Teflon-30 (Dupont) was added. The slurry was then sprayed onto the previously coated carbon paper with an air brush using multiple passes. Once the carbon paper had been wetted with the slurry, it was placed on a hot plate to evaporate the water and surfactant. The spraying/drying process was then repeated until a final (dried) added weight of 1.6 mg/cm$^2$ had been achieved. The total weight of the spray-on layers was 5.8 mg/cm$^2$.

Diffusion Layer Side "B"

A sheet of carbon paper (Toray TGP-H-090) was dipped into a solution of 4:9 Teflon-120 (Dupont):DI water for several minutes. After removal from the solution the carbon paper was allowed to dry in a horizontal position on top of an open cell foam sponge. The carbon paper was then placed in an air-filled sintering oven (360° C.) for 3–5 minutes. This rendered the carbon paper hydrophobic.

A slurry was then prepared utilizing water and a compatible surfactant such as ammonia or the like. The slurry was prepared by mixing 200 ml of a commercially available cleaner "Windex" with 4.2 g Vulcan XC-72R (Cabot) carbon powder. The slurry was sonicated for 90 seconds at a power of about 200 watts, using a stir-bar to agitate the slurry during sonication. After sonication, 1.2 ml of hydrophobic polymer solution Teflon-30 (Dupont) was added. The mixture was then sprayed onto the carbon paper with an air brush using multiple passes. Once the carbon paper had been wetted with the slurry, it was placed on a hot plate to evaporate the solution of water and surfactant. The spraying/drying process was then repeated until a final (dried) added weight of 1.0 mg/cm$^2$ had been achieved.

A second slurry was then prepared by mixing 200 ml Windex with 4.2 g Vulcan XC-72R (Cabot) carbon powder. The slurry was sonicated for 90 seconds at a power of about 200 watts, using a stir-bar to agitate the slurry during sonication. After sonication, 0.5 ml of Teflon-30 (Dupont) was added. The slurry was then sprayed onto the previously coated carbon paper with an air brush using multiple passes. Once the carbon paper had been wetted with the slurry, it was placed on a hot plate to evaporate the water and surfactant. The spraying/drying process was then repeated until a final (dried) added weight of 0.5 mg/cm$^2$ had been achieved. The total weight of the spray-on layers was 1.5 mg/cm$^2$.

MEDA Fabrication and Testing

The respective diffusion layers were affixed to a commercially available membrane electrode assembly, such as that which may be secured from the W.L. Gore Company under the trade designation Primea Series 6000. This was done by placing the assembly in a hot press. The 60 cm$^2$ MEDA was hot pressed once for 4 minutes at 150° C. at a pressure of 32 tons, and then re-pressed for an additional minute at 150° C. at a pressure of 37 tons. The process was repeated to fabricate four MEDAs.

Results

Figure 14:
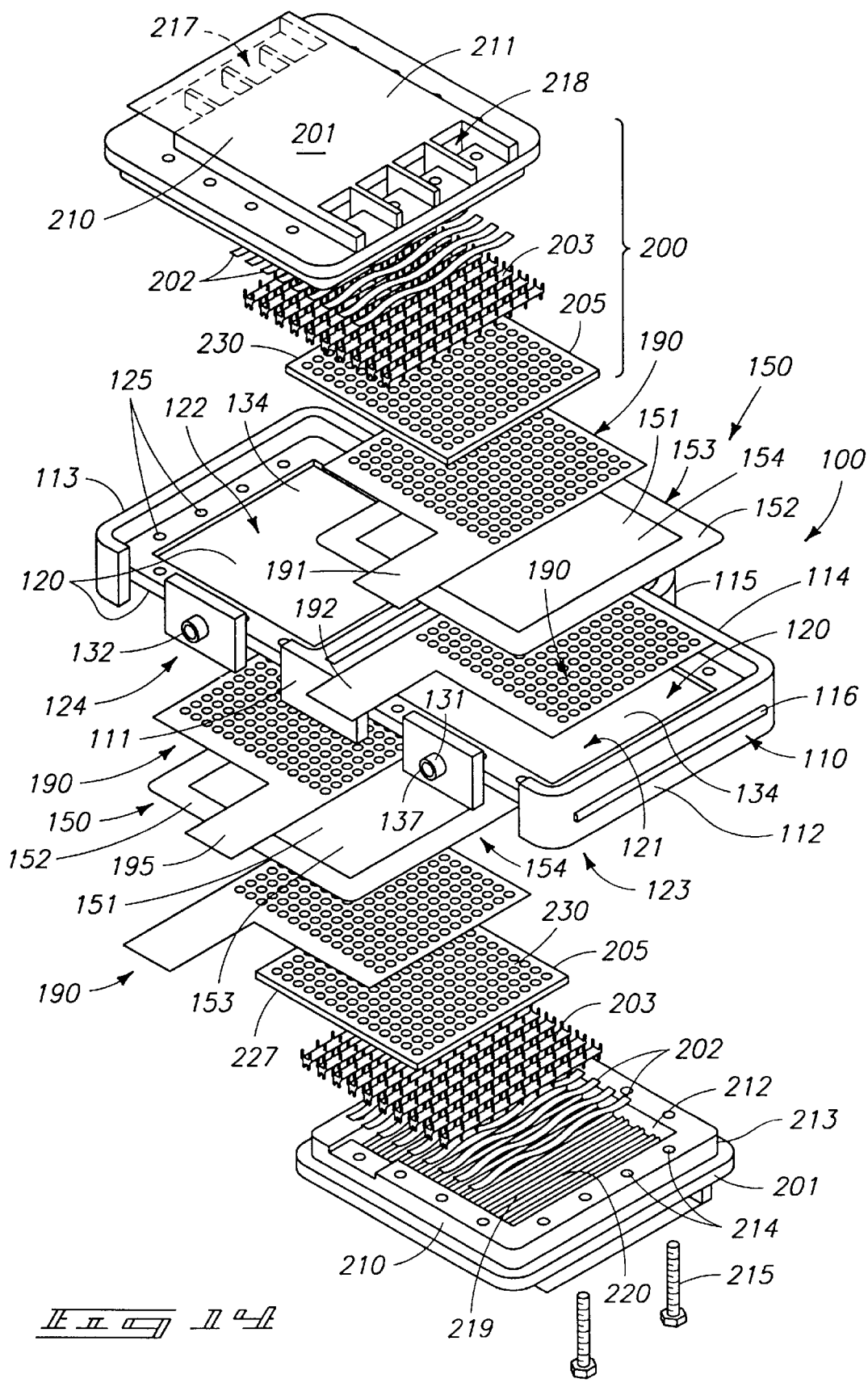
FIG. 14 is a partial, exploded, perspective view of one form of the PEM fuel cell module of the present invention.

A PEM fuel cell module 100 was fabricated using the four MEDAs. The fuel cell module 100 was configured as shown in FIGS. 10, 11, and 14, except that the ceramic plate 205 was deleted, and the pressure transfer assembly 203 directly contacted the cathode current collector 192. The fuel cell module 100 was tested by inserting it into a test stand similar to that illustrated in FIG. 5, and using a small fan to pass approximately 12 cubic feet per minute of air through the fuel cell module. The hydrogen feed pressure was set to about 8 psi. At 2.004 volts (approximately 0.5 volts per MEDA), a current of 24.0 amperes was measured using a calibrated DC current transducer, which yielded a current density of 400 mA/cm$^2$ and a PEM fuel cell module power of 48.096 watts.

The main body 151 of the membrane electrode diffusion assembly 150, as earlier discussed, comprises an electrolyte membrane having substantially linear crosslinked polymeric chains incorporating sulfonic acid groups. In particular, the crosslinked polymeric chains are formed from monomeric units which are selected from the group consisting essentially of poly (ethylene glycol) methacrylate, poly (propylene glycol) methacrylate, poly (ethylene glycol) ethyl ether methacrylate, and poly (propylene glycol) methyl ether methacrylate, hydroxpropyl methacrylate, 2-hydroxyethyl methacrylate, the acrylate analogs, and 4-hydroxybutyl acrylate. Linear copolymers composed of similar monomeric units, but synthesized without crosslinking agents will be described below.

Still further, the sulfonic acid groups are selected from the group consisting essentially of 3-alkoxy-2-hydroxy-1-propanesulfonic acid, 4-styrenesulfonic acid, vinylsulfonic acid, 3-sulfopropyl methacrylate, 3-sulfopropylacrylate and fluorinated derivatives thereof. Additionally, the crosslinking agent utilized to crosslink the copolymers is selected from the group consisting essentially of ethylene glycol divinyl ether, diethylene glycol divinyl ether, triethylene glycol divinyl ether, ethylene glycol dimethacrylate, diethylene glycol dimethacrylate, triethylene glycol dimethacrylate, glycerol dimethacrylate, diallyloxyacetic acid, and allylmethacrylate.

In the preferred form of this invention, the membrane electrode diffusion assembly 150 comprises:

about 35% to about 50% by molar concentration of a methacrylate monomer;

about 30% to about 50% by molar concentration of an acrylate monomer;

about 25% to about 45% by molar concentration of a sulfonic acid; and about 5% to about 20% by molar concentration of a compatible crosslinking agent.

In the preferred form of the invention as described above, the electrolyte membrane, or main body 151, which is incorporated into the membrane electrode diffusion assembly 150, has a glass transition temperature of at least about 110 degrees C., and has a preferred thickness of about 0.2 millimeter. Additionally, this electrolyte membrane 151 must be substantially stable in the presence of water, and operational at temperatures of less than about 80 degrees C. The electrolyte membrane 151, as noted above, may further comprise a compatible plasticizer which is selected from the group consisting essentially of phthalate esters. In still another form of the invention, the electrolyte membrane 151 includes a porous supporting matrix which is made integral with the electrolyte membrane 151, and which provides mechanical strength to same. In this regard, the porous supporting matrix does not reactively produce hydrogen ions and is dielectric. Further, the porous supporting matrix is substantially inert and has a porosity of about 30% to about 80% and has a given proton conductivity which is proportional to the porosity of the supporting matrix. An acceptable porous supporting matrix may be selected from the group consisting essentially of grafted hydrophilic polyethylenes.

In its most preferred form, the electrolyte membrane 151 of the present invention comprises at least about 10% to about 50% by molar concentration of a copolymer which has monomeric units which are selected from the group consisting essentially of poly (ethylene glycol) methacrylate, poly (propylene glycol) methacrylate, poly (ethylene glycol) ethyl ether methacrylate, poly (propylene glycol) methyl ether methacrylate, hydroxypropyl methacrylate, 2-hydroxyethyl methacrylate, acrylate analogs and 4-hydroxybutyl acrylate;

at least about 25% to about 45% by molar concentration of an acid selected from the group consisting essentially of 3-alkoxy-2-hydroxy-1-propanesulfonic acid, 4-styrenesulfonic acid, vinylsulfonic acid, 3-sulfopropyl methacrylate, 3-sulfopropylacrylate and fluorinated derivatives thereof;

at least about 5% to about 20% by molar concentration of a crosslinking agent selected from the group consisting essentially of ethylene glycol divinyl ether, diethylene glycol divinyl ether, triethylene glycol divinyl ether, ethylene glycol dimethacrylate, diethylene glycol dimethacrylate, triethylene glycol dimethacrylate, glycerol dimethacrylate, diallyloxyacetic acid, and allylmethacrylate;

a compatible plasticizer; and a support matrix having a given minimum porosity, and which is dielectric.

As discussed above, one example of a suitable electrolyte membrane 151 may be secured from the W.L. Gore Company under the trade designation Primea Series 6000 MEA.

Representative examples which concern the synthesis of the electrolyte membrane 151 are set forth below.

EXAMPLE 1

10.56 mL of a 15.78% w/v aqueous solution (8 mmol) of 3-sulfopropyl methacrylate was first concentrated so as to yield a final reaction mixture with a water content of 16.3% v/v. Poly(propylene glycol) methacrylate (2.9600 g, 8 mmol), hydroxypropyl methacrylate (0.14422 g, 1 mmol), and glycerol dimethacrylate (0.4565 g, 2 mmol) were added to, and well mixed with the concentrated acid solution. The mixture was cooled to 4 degrees C., and then cold ethylene glycol divinyl ether (0.2283 g, 2 mmol), and ammonium persulfate (0.5052 g, 2.2 mmol) dissolved in 0.72 mL of water were added. After thorough mixing, the reaction mixture was de-aerated and applied onto grafted polyethylene (E15012) that was previously rendered hydrophilic. Photochemical polymerization was achieved under UV light for 10 minutes.

EXAMPLE 2

A 15.78% w/v aqueous solution of 3-sulfopropyl methacrylate (7.92 mL, 6 mmol) was concentrated so as to obtain a final reaction mixture with 17.7% v/v water, and poly (propylene glycol) meth-acrylate (5.1800 g, 14 mmol) was then added and well mixed. Benzoyl peroxide (0.4844 g, 2 mmol) and 1,1-azobis(1-cyclohexanecarbonitrile) (0.4884 g, 2 mmol) were dissolved in acetone (4 mL) and added. The reaction mixture was then de-aerated under vacuum and substantially all of the acetone was removed. Thermal polymerization was effected at 71–74 degrees C. for 90 minutes. After cooling to room temperature overnight, the product crystallized into bundles of needle-shaped crystals. Similar linear polymers were also synthesized by using hydroxypropyl methacrylate (14 mmol) and poly(ethylene glycol) methacrylate (14 mmol), in place of the poly (propylene glycol) methacrylate.

EXAMPLE 3

A 35% aqueous solution of 3-allyloxy-2-hydroxy-1-propanesulfonic acid (21.60 mL, 40 mmol) was concentrated so as to yield a final reaction mixture containing 120.9% v/v water. Poly(propylene glycol) methacrylate (11.1000 g, 30 mmol), hydroxpropyl methacrylate (2.8834 g, 20 mmol), and diethylene glycol dimethacrylate (2.4227 g, 10 mmol) were added, and well mixed with the acid. The initiator ammonium persulfate (1.1410 g, 5 mmol) was dissolved in the proper amount of water and added. After thorough mixing, the reaction mixture was de-aerated, and either thermally polymerized in a mold at 75 degrees C. for 90 minutes or photochemically polymerized under UV light for 10 minutes using grafted and hydrophilized polyethylene as a support material. Poly(ethylene glycol) methacrylate was also used as a substitute for poly(propylene glycol) methacrylate, and the crosslinked mixture consisting of glycerol dimethacrylate (or diallyloxyacetic acid) and ethylene glycol divinyl ether was also used as a substitute for diethylene glycol dimethacrylate.

Each electrolyte membrane synthesized from the examples, above, were tested and were found to yield the performance characteristics as earlier discussed.

As seen in FIGS. 12–19 and 28, the proton exchange membrane fuel cell power system 10 of the present invention further includes a pair of current collectors 190 which are received in each of the respective cavities 121 through 124, respectively. The current collectors for identification have been given the numerals 191 and 192, respectively. The current collectors 190 are individually disposed in juxtaposed ohmic electrical contact with the opposite anode and cathode sides 153 and 154 of each membrane electrode diffusion assembly 150. As best seen in FIG. 28, each current collector 190 has a main body 193 which has a plurality of apertures or open areas formed therein 194. In this regard, the main body has a given surface area of which, at least about 70% is open area. A conductive member 195 extends outwardly from the main body and is operable to extend through one of the openings or gaps 136 which are formed in the hydrogen distribution frame 110. Such is seen in FIG. 11. Each conductive member 195 is received between and thus electrically coupled within one of the 8 pairs of conductive contacts 51 which are mounted on the rear wall 41 of the subrack 30. This is illustrated most clearly by reference to FIGS. 3 and 4.

As a general matter, the current collectors 190 comprise a base substrate forming a main body 193, and wherein a coating(s) or layer(s) is applied to same and which is effective in maintaining electrical contact with the adjacent membrane electrode diffusion assembly 150. The main body 193 includes four discrete components. The first component is an electrically conductive substrate which may be capable of surface passivation if exposed to oxygen. Suitable materials which may be used in this discrete component of the main body 193 include current carrying substrates consisting essentially of 3XX Series chromium containing stainless steel or equivalent substitutes. These substrates have a bulk conductivity of about 2.4 IACS, and an overall thickness of about 0.7 to about 3 mm. Additionally, copper or nickel substrates having a bulk conductivity of greater than about 24% IACS, and a thickness of about 0.20 to about 1.3 mm. may be used with equal success.

The second component, which may be utilized in forming the main body 193 comprises a protection layer formed in covering relation over the conductive substrate, and which will passivate if inadvertently exposed to oxygen. Suitable materials for this second component include a foil cladding of 3XX Series chromium-containing stainless steel which has a bulk conductivity of about 2.4% IACS, and a thickness of about 0.02 to about 0.15 mm; or a coating or alloy combination consisting essentially of column IVB metal(s) such as tantalum and niobium which form a highly passivated pentoxide if exposed inadvertently to air. This coating or alloy combination has a thickness of about 0.2 to about 2 microns.

The third component forming the main body 193 comprises an electrically conductive contact layer which is galvanically cathodic, and oxygen stable. Suitable materials which may be utilized in the contact layer include coatings formed from elements classified in column IVB and which are capable of forming nitrides. Examples of these materials include titanium or zirconium nitride, or an electrically conductive metal oxide such as indium-tin oxide (ITO). An equivalent substitute material includes platinum group metals such as palladium, platinum, rhodium, ruthenium, iridium and osmium. This third component has a thickness of about 0.2 to about 2 microns.

The fourth component forming the main body 193 comprises an electrolyte/oxygen exclusion layer. A suitable material for this function includes a graphite-filled electrically conductive adhesive. Such may be synthesized from a two-part epoxy or a silicone rubber.

Many combinations of the four components may be fabricated to produce a suitable main body 193. Each main body 193 will have an electrically conductive substrate. The assorted combinations of the other three components which are used therewith are not specifically set forth below, it being understood that not less than one of the remaining three components, and not more than all three remaining components must be brought together to form a suitable main body 193. In the preferred embodiment, the inventors have discovered that a main body 193 which is formed from an electrically conductive substrate, such as nickel or copper; a foil cladding comprising 3XX series chromium-containing stainless steel; and a coating formed from column IVB electrically conductive materials which can form nitrides operates with good results.

Figure 12:
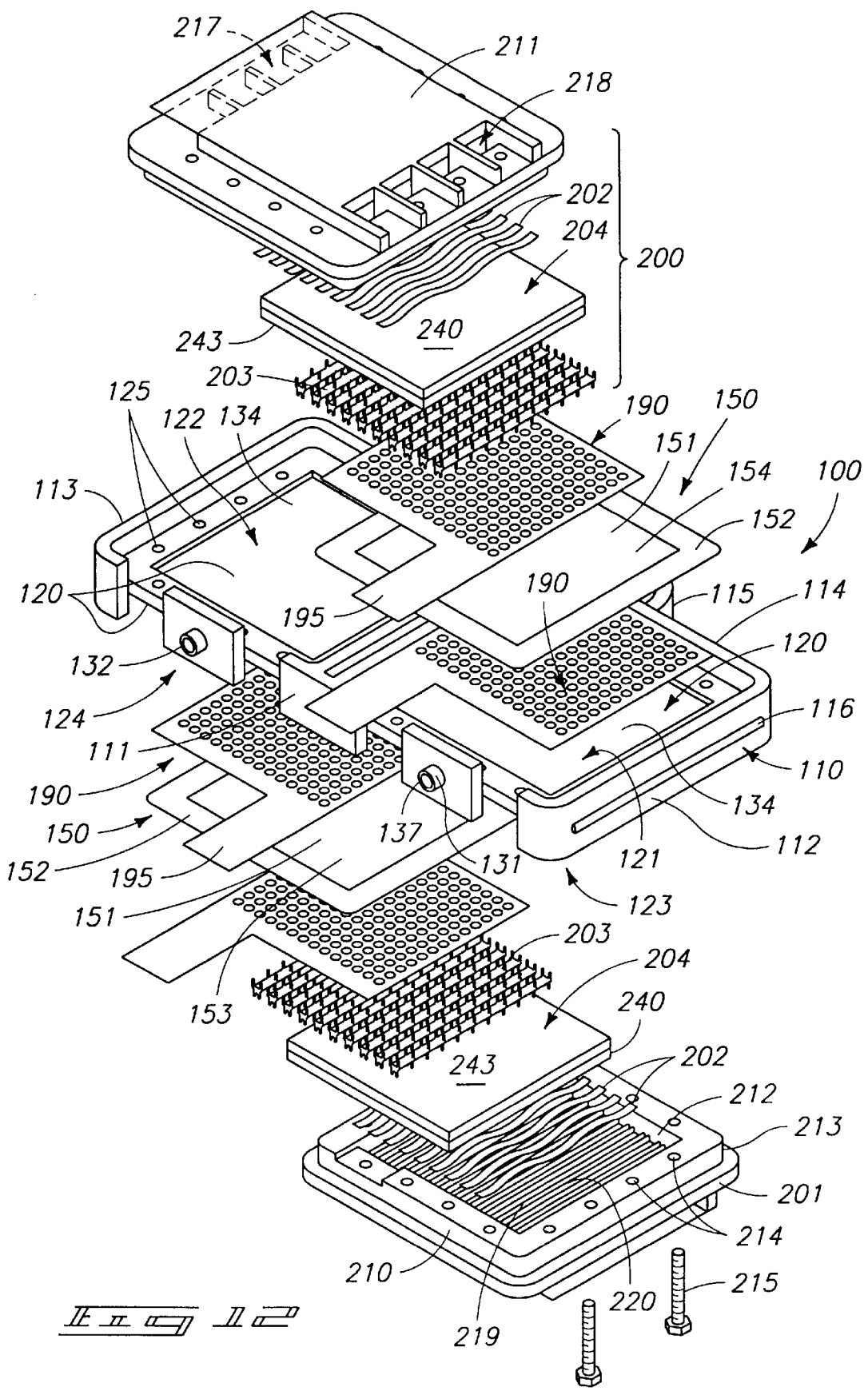
FIG. 12 is a partial, exploded, perspective view of one form of the PEM fuel cell module of the present invention.
Figure 15:
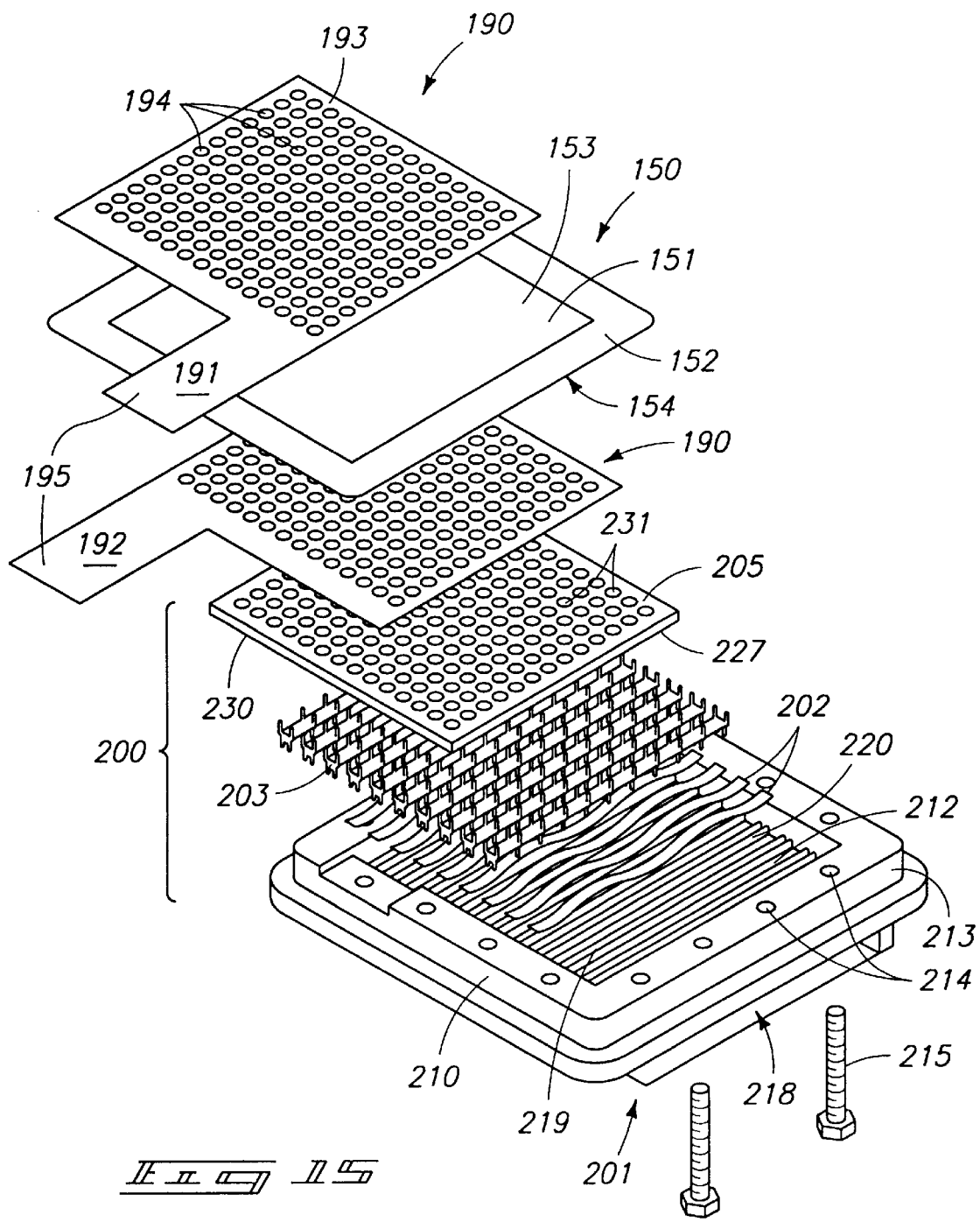
FIG. 15 is a partial, greatly enlarged, perspective, exploded view of a portion of the PEM fuel module shown in FIG. 14.

Referring now to FIGS. 12–19 and 22–25, respectively, the proton exchange membrane fuel cell power system 10 of the present invention further includes individual force application assemblies 200 for applying a given force to each of the pair of current collectors 190, and the membrane electrode diffusion assembly 150 which is sandwiched therebetween. In this regard, the individual force application assemblies are best illustrated by reference to FIGS. 13, 15, 17 and 19, respectively. In the first form of the force application assembly, which is shown in FIG. 12 and 22, the force application assembly comprises a cathode cover 201 which partially occludes the respective cavities of the hydrogen distribution frame 110. As seen in the drawings, the respective cathode covers 201 individually releasably cooperate with each other and with the hydrogen distribution frame 110. A biasing assembly which is designated by the numeral 202, and shown herein as a plurality of metal wave springs cooperates with the cathode cover and is operable to impart force to an adjacent pressure transfer assembly 203 by means of a pressure distribution assembly 204. Referring now to FIGS. 14, 15, and 23, and in a second form of the invention, the pressure transfer assembly 203 transfers the force imparted to it by the cathode covers 201 to an adjoining pressure plate 205. In this form of the invention, the pressure distribution assembly is eliminated.

Figure 16:
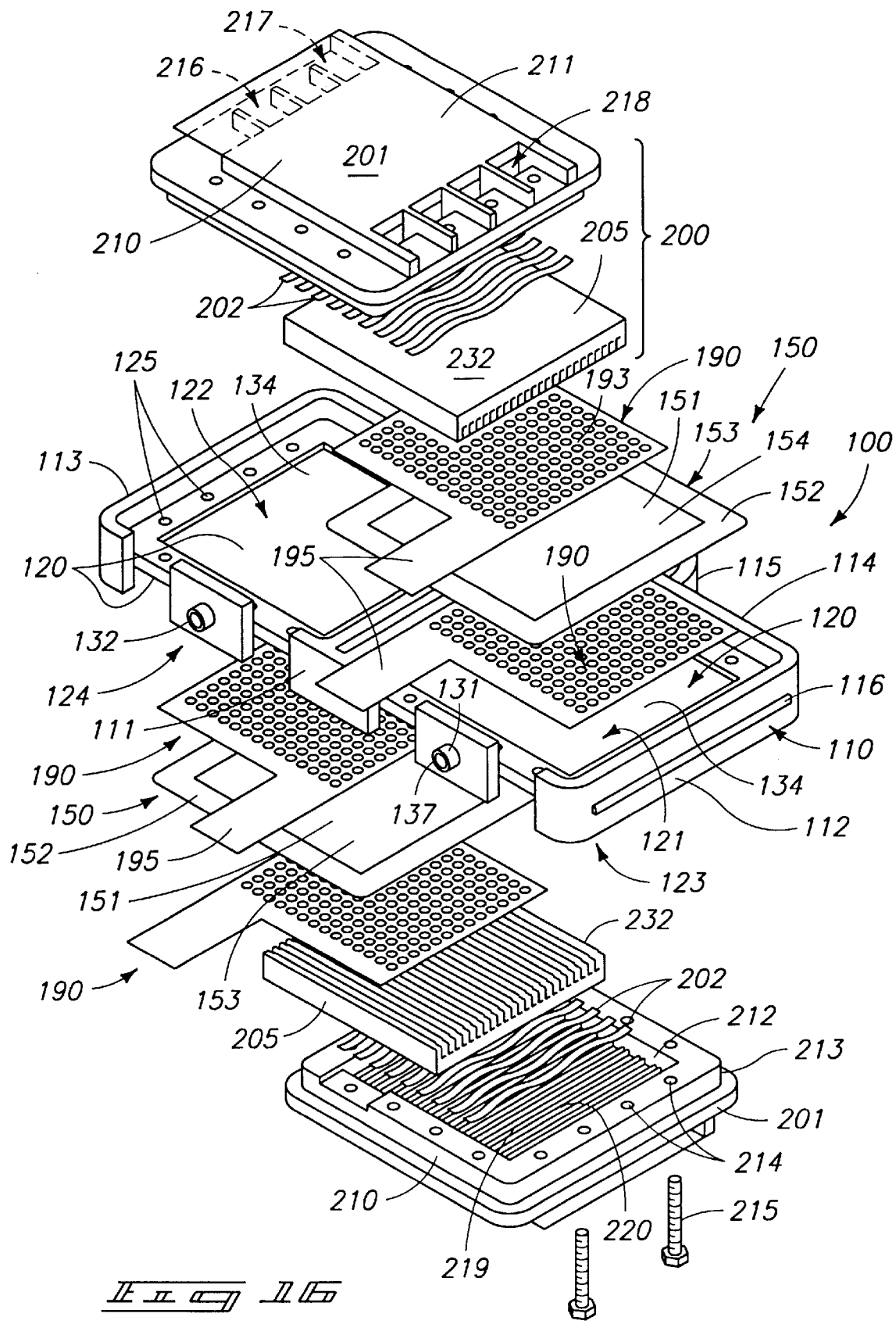
FIG. 16 is a partial, exploded, perspective view of one form of the PEM fuel module of the present invention.
Figure 17:
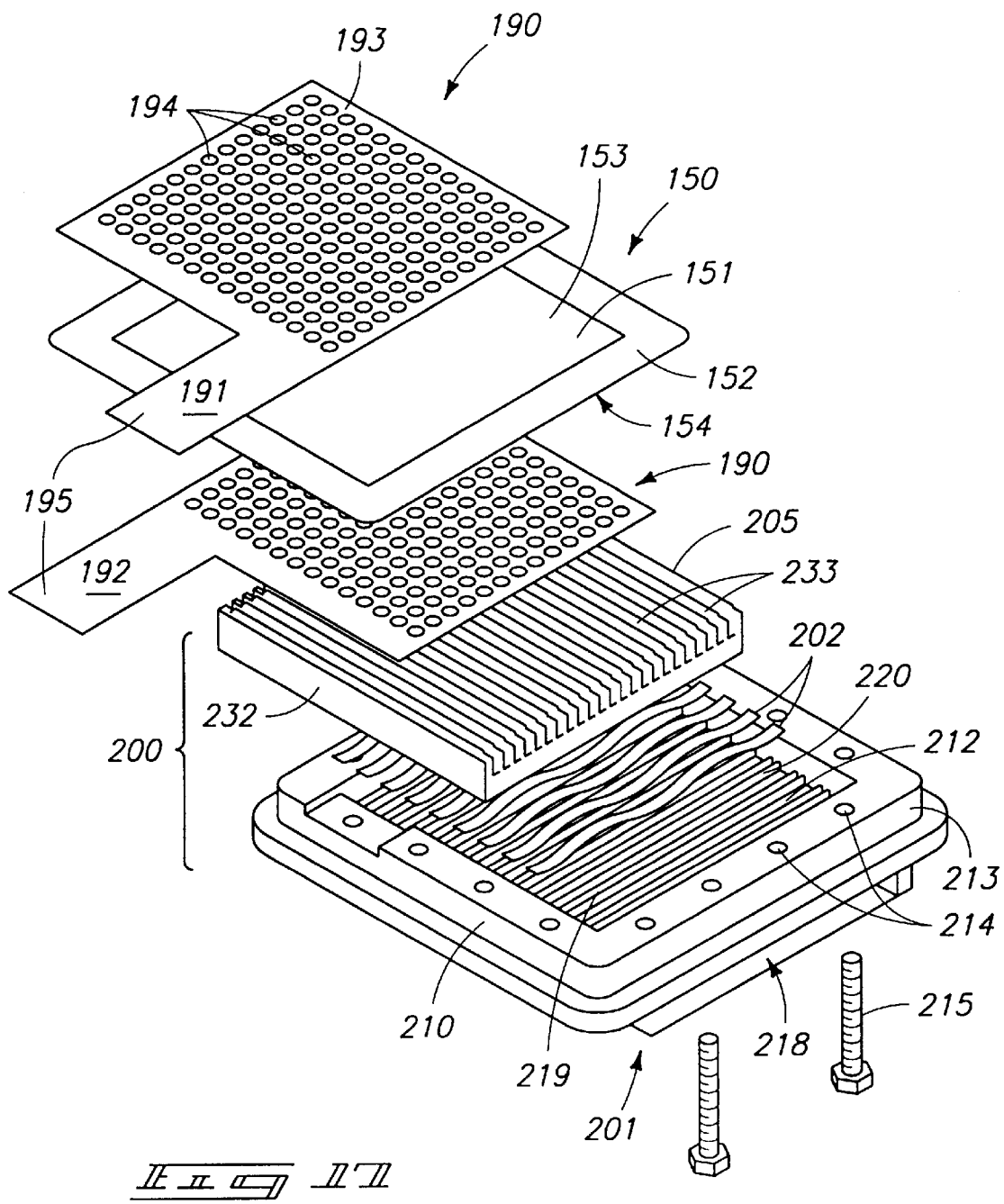
FIG. 17 is a partial, greatly enlarged, perspective, exploded view of a portion of the PEM fuel cell module shown in FIG. 16.
Figure 18:
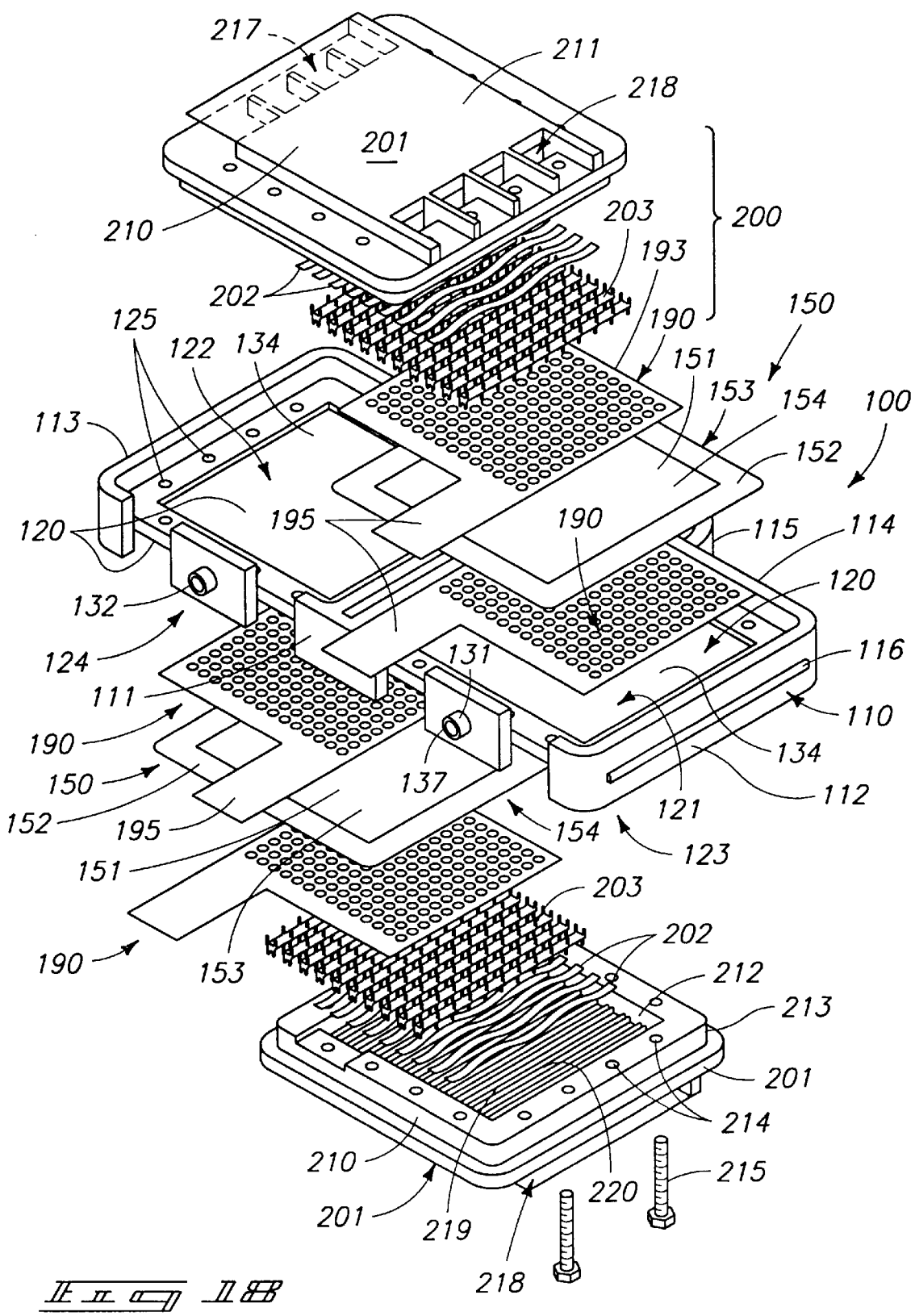
FIG. 18 is a partial, exploded, perspective view of one form of the PEM fuel cell module of the present invention.
Figure 19:
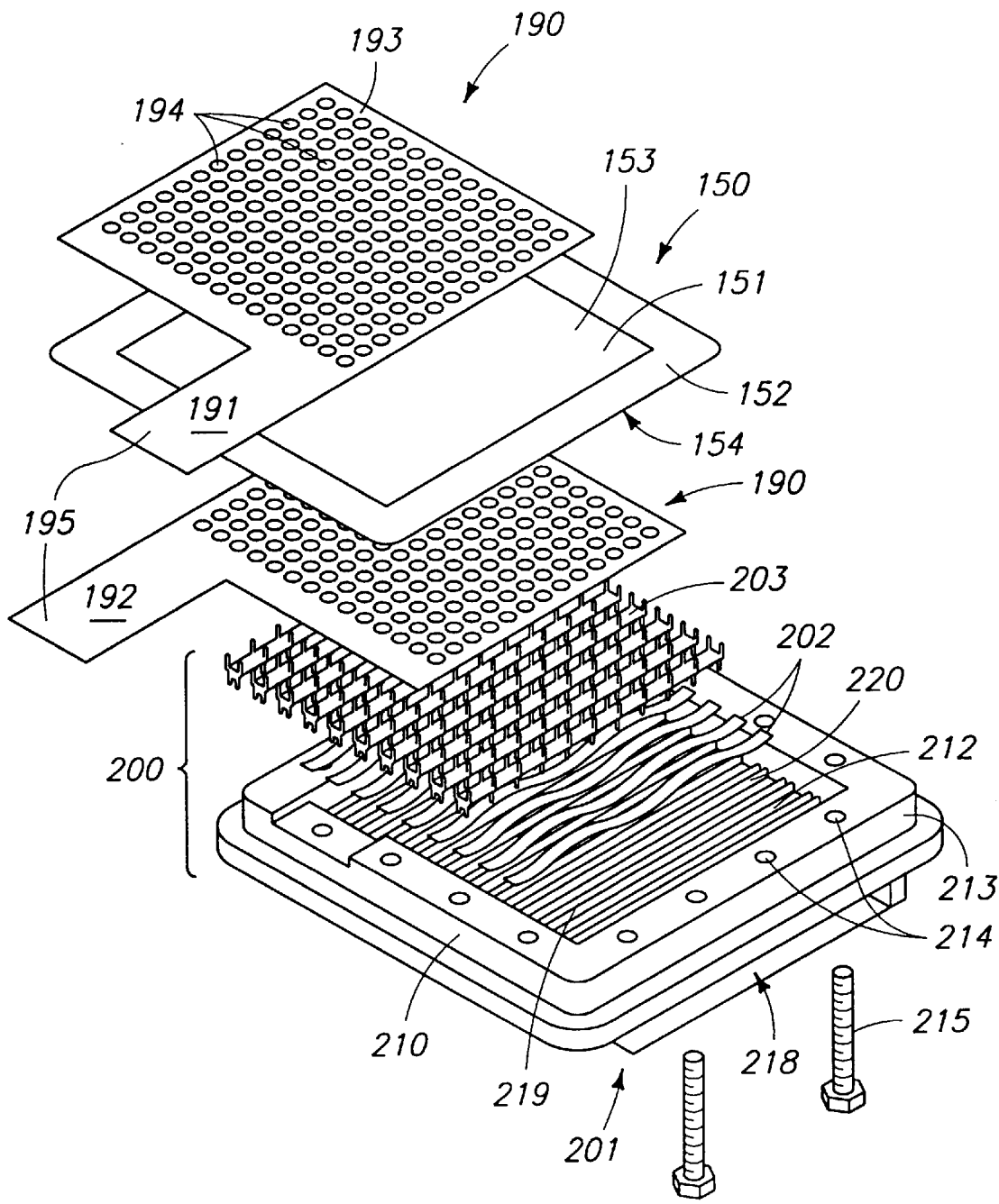
FIG. 19 is a partial, greatly enlarged, perspective exploded view of a portion of the PEM fuel cell module shown in FIG. 18.

In a third form of the invention as seen in FIGS. 16 17, and 24, the force application assembly 202 comprises a cathode cover 201, a plurality of wave springs 202; and a corrugated pressure plate 232. In this form of the invention, the pressure transfer assembly 203 is eliminated from the assembly 200. In yet still another fourth form of the invention as seen in FIG. 18, 19, and 25, the force application assembly 200 comprises a cathode cover 201; wave springs 202, and a pressure transfer assembly 203. In this form of the invention, the pressure plate 205 (of either design) and pressure distribution assembly 204 are absent from the combination. In all the forms of the invention described above, a force of at least about 175 pounds per square inch is realized between the membrane electrode diffusion assembly 150 and the associated pair of current collectors 190.

Figure 11:
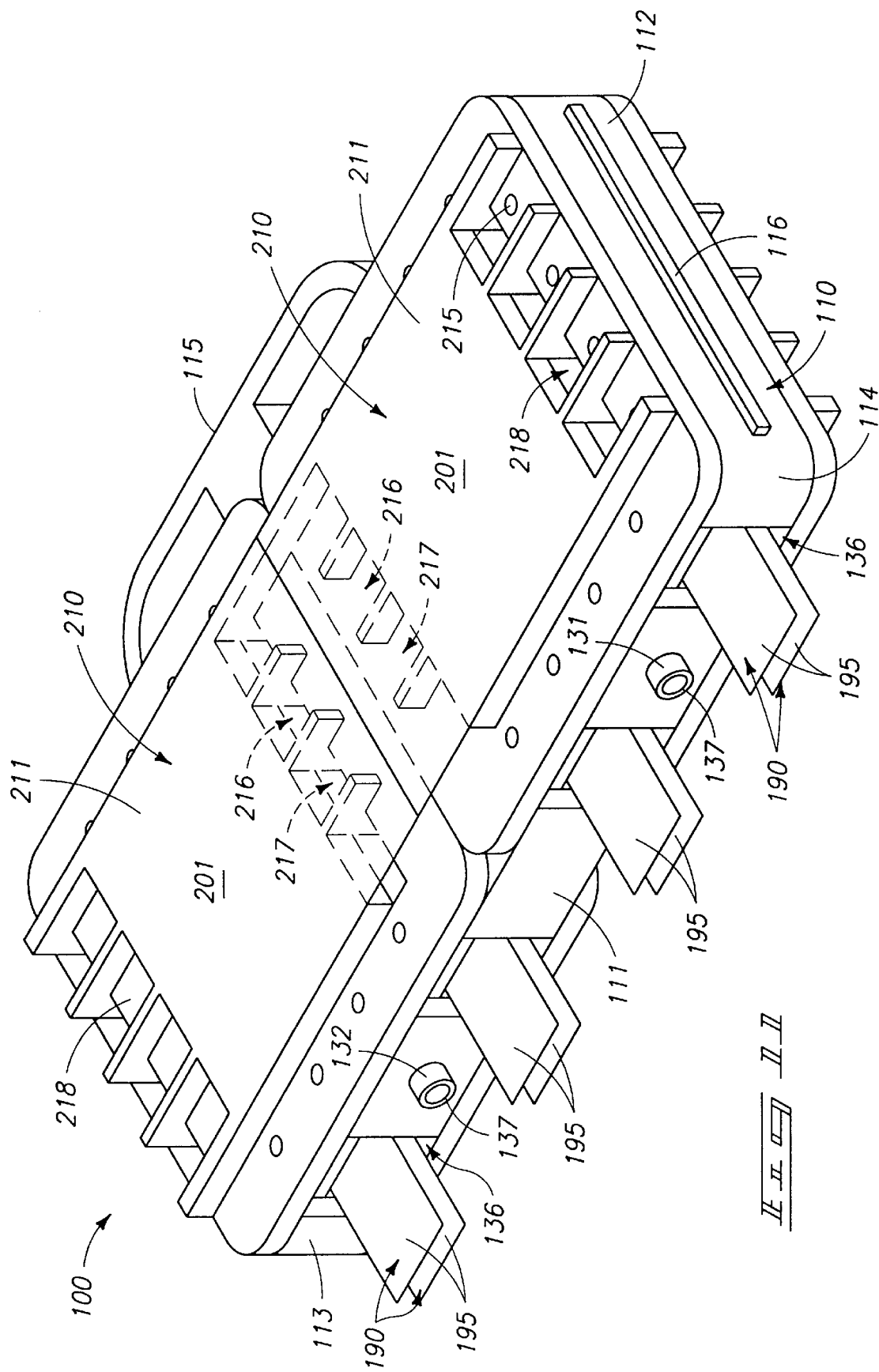
FIG. 11 is a perspective, side elevation view of a proton exchange membrane fuel cell module utilized with the present invention.
Figure 13:
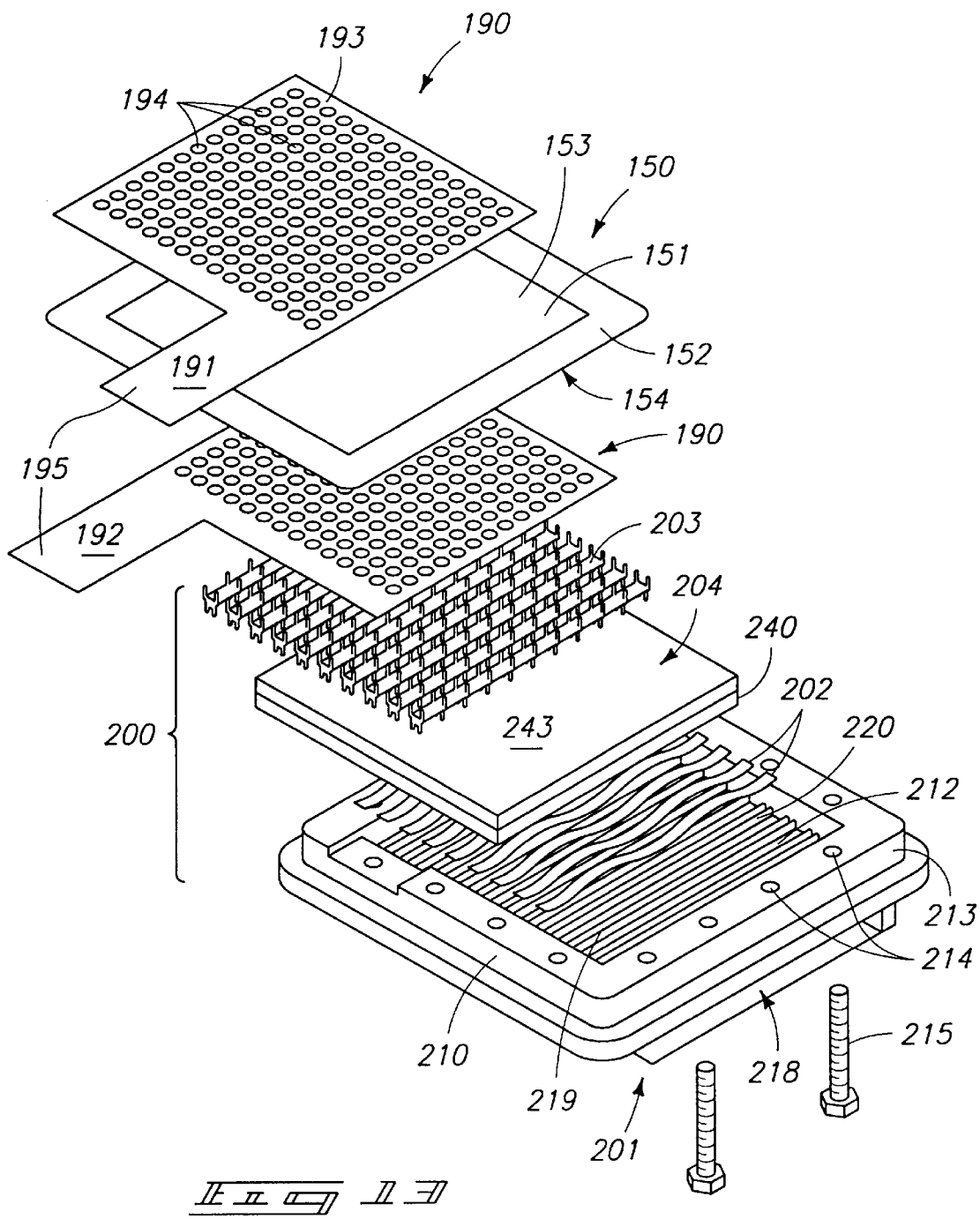
FIG. 13 is a partial, greatly enlarged, perspective, exploded view of a portion of the PEM fuel cell module shown in FIG. 12.

Referring now to FIG. 11, each cathode cover 201 has a main body 210 which is fabricated from a substrate which has a flexural modulus of at least about 1 million pounds per square inch. This is in contrast to the hydrogen distribution frame 110 which is fabricated from a substrate having a flexural modulus of less than about 500,00 pounds per square inch, and a compressive strength of less than 20,000 pounds per square inch. The main body 210 has an exterior facing surface 211, and an opposite interior facing surface 212 (FIG. 13). Further, the main body has a peripheral edge 213 which has a plurality of apertures 214 formed therein. Each cathode cover nests, or otherwise matingly interfits with one of the respective cavities 121 through 124, respectively, which are defined by the hydrogen distribution frame 110. When appropriately nested, the individual apertures 214 are substantially coaxially aligned with the apertures 125 which are formed in the main body 111 of the hydrogen distribution frame 110. This coaxial alignment permits fasteners 215 to be received therethrough. When tightened, the opposing cathode covers exert a force, by means of the intermediate assemblies, described above, on the membrane electrode diffusion assembly 150 which is effective to establish good electrical contact between the respective current collectors 190 and the adjacent membrane electrode diffusion assembly 150. Still further, the main body 210 defines in part a third passageway 216. The third passageway 216 as seen in FIGS. 9 and 11, provides a convenient means by which the cathode air flow which is delivered by the exhaust end 73 of the air plenum 71, can be delivered to the cathode side 154 of the membrane electrode diffusion assembly 150. In this regard, the air passageway has a first, or intake end 217 and a second, or exhaust end 218. As seen in FIG. 9, the exhaust end of each third passageway 216 is located near one of the opposite ends 112 and 113 of the hydrogen distribution frame 110. As illustrated in FIG. 6, the air which has exited through the exhaust end 218 passes through the apertures 42 and 43 formed in the top and bottom portions 35 and 40 of the subrack 30. As such, the air passes into the air plenum 71 and may be recycled by means of the air mixing valve 80 as was earlier described. As best illustrated by reference to FIGS. 13 and 22, the interior surface 212 of the cathode cover defines a cavity 219 of given dimensions. The interior surface further defines a plurality of channels 220. The channels 220 are operable to matingly receive the individual wave springs which constitute the biasing assembly 202.

Referring now to FIG. 29, the pressure transfer assembly 203 has an elongated main body 221 which comprises a central backbone 222. Additionally, a plurality of legs or members 223 extend or depend from the central backbone 222 and are operable to forcibly engage the pressure plate 205 in one form of the invention (FIGS. 14 and 23). Still further, the main body 220 has a first surface 224 and an opposite second surface 225. A channel 226 is formed in the first surface and matingly interfits or receives one of the metal wave springs constituting the biasing assembly 202 (FIG. 25). In an alternative form of the invention, the pressure plate 205 is eliminated, and a pressure distribution member 204 is positioned between the biasing assembly 203 and the first surface 224 of the pressure transfer assembly (FIGS. 12 and 22). In this form of the invention, the pressure transfer assembly 204 is fabricated from a resilient substrate such that the individual legs or members will deform under pressure to an amount equal to about 0.001 to 0.004 inches.

Figure 20:
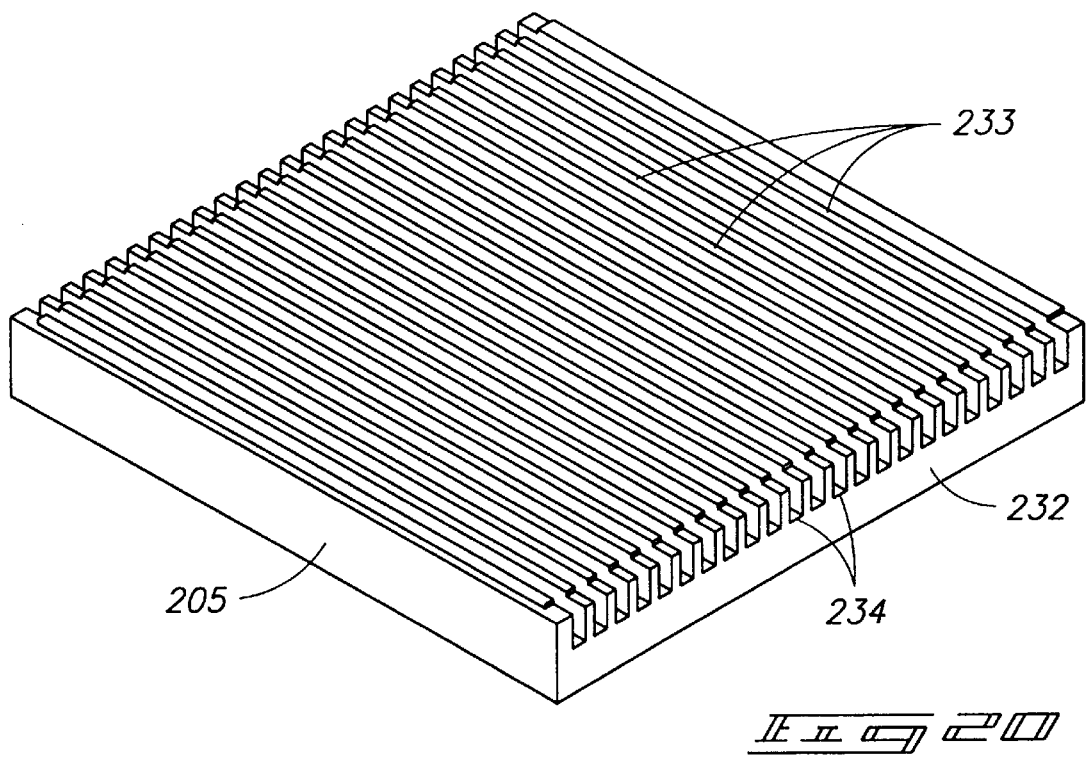
FIG. 20 is a perspective view of a pressure plate which is utilized in one form of PEM fuel cell module of the present invention.
Figure 21:
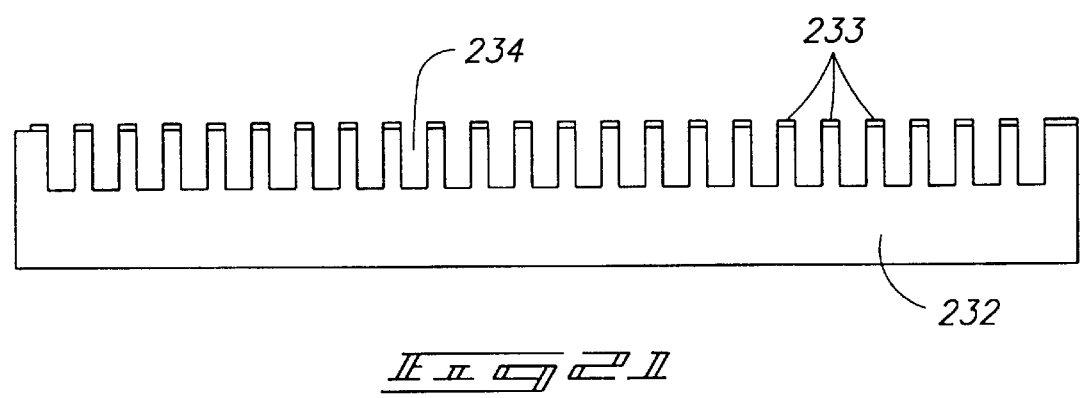
FIG. 21 is an end view of the pressure plate shown in FIG. 20.

As noted above, one form of the invention 10 may include a pressure plate 205 (FIGS. 14 and 15). In this regard the pressure plate 205, as illustrated, is a ceramic plate or an equivalent substitute having a main body 230. The ceramic plate, as shown in FIG. 15, has a plurality of apertures 231 formed therein which allows air to pass therethrough and which has traveled through the third passageway 216 which is formed, in part, in the main body 210 of the cathode cover 201. The main body 230 of the pressure plate 205 is substantially planar to less than about 0.002 inches. An alternative form of the pressure plate is shown in FIGS. 16 and 17 and is designated by the numeral 232. This second form of the pressure plate is thicker than the pressure plate 205 which is shown in FIG. 15. Referring now to FIGS. 20 and 21, the pressure plate 232 defines a given open area therebetween a plurality substantially equally spaced corrugations or undulations 233 which are formed in its surface. These corrugations or undulations define specific channels 234 therebetween through which air can move. When the second form 232 of the pressure plate 205 is employed, the pressure transfer assembly 203 may be eliminated from the assembly as was earlier discussed. The channels, or open area 234 defined by the pressure plate 205, whether it be in the first form of the pressure plate as shown in FIG. 15, or that shown in FIG. 20, defines, in part, the third passageway 216 which allows air to pass through the cathode cover 201 to the cathode side 154 of the membrane electrode diffusion assembly 150. Such is best illustrated by reference to FIG. 11. As earlier discussed, and as seen in FIGS. 12 and 13, one form of the invention 10 utilizes a pressure distribution assembly 204. When employed, the pressure plate 205 is eliminated and the pressure distribution assembly 204 is positioned between the wave springs which constitute the biasing assembly 202, and the pressure transfer assembly 203 which were described earlier. In this regard, the if pressure distribution assembly comprises a first substantially noncompressible and flexible substrate 240 (FIG. 22). The first non-compressible substrate has a first surface 241 and an opposite second surface 242. The first surface 241 is in contact with the biasing assembly 202. Mounted upon the opposite, second surface 242 is a compressible substrate 243. The compressible substrate has an outwardly facing surface 244 which is in contact with the first surface 224 of the pressure transfer assembly 203. In operation, as the respective cathode covers and associated biasing assemblies 202 exert force, a certain amount of deflection or bending in the cathode covers may occur. This is shown in the drawings at FIG. 22. When this event happens, the first surface of the pressure transfer assembly presses against the compressible surface 243 thereby maintaining a substantially constant pressure across the entire surface of the adjacent current collector 190.

The proton exchange membrane fuel cell power system 10 further includes a digital programmable control assembly 250, as seen in the schematic view of FIG. 30. The digital programmable control assembly 250 is electrically coupled with each of the discrete PEM fuel cell modules 100 such that they can be monitored with respect to the electrical performance of same. This digital programmable control assembly 250 is further electrically coupled with the air distribution assembly 70. Still further, the digital programmable control assembly 250 is electrically coupled with the fuel distribution assembly which comprises the source of hydrogen 60, accompanying valve assembly 61 and associated first conduit 54 which delivers the hydrogen by means of one of the valves 52 to each of the discrete PEM fuel cell modules 100.

Still further, and referring to FIG. 31, the PEM fuel cell power system 10 of the present invention includes a heat exchanger 260 which is operably coupled with the air distribution assembly 70 which delivers air to the individual discrete PEM fuel cell modules 100. The heat exchanger 260 captures useful thermal energy emitted by the discrete PEM fuel cell modules 100. Additionally, the power system 10 includes a power conditioning assembly 270 (FIG. 1) comprising an inverter which is electrically coupled with the direct current bus 50 and which receives the direct current electrical energy produced by the individual discrete PEM fuel cell modules 100 and which converts same into suitable alternating current.

OPERATION

The operation of the described embodiments of the present invention are believed to be readily apparent and are briefly summarized at this point.

In its broadest aspect, the present invention comprises a proton exchange membrane fuel cell power system 10 having a plurality of discrete proton exchange membrane fuel cell modules 100 which are self-humidifying and which individually produce a given amount of heat energy. Further, each of the discrete proton exchange membrane fuel cell modules 100 have a cathode air flow, and a preponderance of the heat energy produced by each of PEM fuel cell modules 100 is removed from same by the cathode air flow.

Another aspect of the present invention relates to a proton exchange membrane fuel cell power system 10 for producing electrical power and which comprises a plurality of discrete fuel cell modules 100, each having at least two membrane electrode diffusion assemblies 150. Each of the membrane electrode diffusion assemblies 150 have opposite anode 153, and cathode sides 154. Additionally, this PEM fuel cell power system 10 includes a pair of current collectors 190 each disposed in juxtaposed ohmic electrical contact with the opposite anode 153 and cathode sides 154 of each of the membrane electrode diffusion assemblies 150. Further, individual force application assemblies 200 for applying a given force to each of the current collectors and the individual membrane electrode diffusion assemblies are provided. The individual force application assemblies, as earlier noted, may be in several forms. Commonly each form of the force application assemblies has a cathode cover 201, and a biasing assembly 202. However, in one form of the invention, a pressure plate 205 may be utilized, and comprises a ceramic plate having a plurality of apertures formed therein. As seen in FIG. 14, a pressure transfer assembly 205 is provided and is effective to transmit force, by way of the pressure plate, to the underlying membrane electrode diffusion assembly 150. In an alternative form (FIG. 16), a second pressure plate 232 may be employed. When used, the pressure transfer assembly 203 may be eliminated from the construction of the PEM fuel cell module 100. In still another form of the force application assembly 200 (FIG. 12), the pressure plate 205 is eliminated and the pressure distribution assembly 204 is utilized to ensure that substantially equal force is applied across the surface area of the adjacent current collector 190.

As presently disclosed, the PEM fuel cell power system 10 and more particularly, the discrete PEM fuel cell modules 100 have an electrical efficiency of at least 40% and are self-humidifying, that is, no additional external humidification must be provided to the hydrogen fuel 60, or air which is supplied to same. Still further, the membrane electrode diffusion assemblies 150 which are utilized in the present invention have an active area which has a given surface area. It has been determined that the discrete PEM fuel cell modules 100 produce a current density of at least about 350 m.A. per square centimeter of active area at a nominal cell voltage of at least about 0.5 volts D.C. Additionally, the discrete fuel cell modules 100 each have an electrical output of at least about 10.5 watts.

The individual proton exchange membrane fuel cell modules 100 are mounted within an enclosure 11 which includes a subrack 30 for supporting same. The enclosure 11 which is utilized with the present proton exchange membrane fuel cell modules 100 further comprises a fuel distribution assembly 52, 54 and 60, for delivering hydrogen to the individual discrete PEM fuel cell modules 100. An air distribution assembly 70 for delivering air to the individual discrete PEM fuel cell modules 100 is provided, and a direct current output bus 50, and a power conditioning assembly 270 for receiving and inverting the electrical power produced by each of the discrete PEM fuel cell modules 100 are also received in the enclosure 11. As earlier discussed, each of the subracks 30 are mounted in the cavity 25 which is defined by the enclosure 11. The subracks 30 have forward and rearward edges 33, and 34 and top and bottom portions 35 and 40, respectively. Each of the discrete PEM fuel cell modules 100 are. operably coupled with the fuel distribution assembly, direct current output bus 50 and power conditioning assembly 270 in the vicinity of the rearward edge 34 of each of the subracks 30 as seen most clearly in FIGS. 3, 4 and 6. Further, the discrete PEM fuel cell modules 100 are coupled in fluid flowing relation with the air distribution assembly 70 at the top and bottom portions 35 and 40 of each of the subracks 30 and with the air plenum 70 at the exhaust end 73 thereof.

Referring to FIG. 6, the air distribution assembly 70 which is utilized in the present device includes a plenum 71 which is made integral with each of the subracks 30. The plenum has an exhaust end 73 which delivers air to each of the PEM fuel cell modules 100 supported on the subrack 30, and an intake end 72 which receives both air which has passed through each of the PEM fuel cell modules 100 and air which comes from outside the respective PEM fuel cell modules 100. Further, the air distribution assembly 70 includes an air movement assembly 74 in the form of a fan 75 which is operably coupled to the plenum 71 and which moves the air in a given direction along the plenum 71 to the individual PEM fuel cell modules 100. An air mixing valve 80 is borne by the plenum 71, and controls the mixture of air which is recirculated back to the respective PEM fuel cell modules 100.

As described earlier in greater detail, the individual discrete PEM fuel cell modules 100 include a hydrogen distribution frame 110 defining discrete cavities 120, and wherein the respective membrane electrode diffusion assemblies 150 are individually sealably mounted in each of the cavities 120. In the preferred form of the invention, the hydrogen distribution frame 110 is oriented between the individual membrane electrode diffusion assemblies 150. As best seen in FIG. 10, the hydrogen distribution frame 110 comprises multiple pairs of discretely opposed cavities 121–124.

The hydrogen distribution frame 110 permits the delivery of hydrogen gas to each of the cavities 121–124. In this regard, the hydrogen distribution frame 110 defines a first passageway 131 which permits the delivery of hydrogen gas to each of the cavities 121–124 which are defined by the hydrogen distribution frame 110 and to the anode side 153 of the membrane electrode diffusion assembly 150. Still further, the hydrogen distribution frame 110 includes a second passageway 132 which facilitates the removal of impurities, water, and unreacted hydrogen from each of the cavities 121–124. As noted earlier, each of the cathode covers 201 and the respective force application assemblies 200 define a third passageway 216 which permits delivery of air to each of the cavities 121–124, and to the cathode side 154 of each of the respective membrane electrode diffusion assemblies 150. Hydrogen gas is supplied by means of the first passageway 131 to each of the cavities 121–124 of the hydrogen distribution frame 110 at a pressure of about 1 PSIG to about 10 PSIG; and air is supplied at above ambient pressure by the air distribution assembly 70.

Also as discussed above, the source of hydrogen 60 is illustrated herein as a pressurized container of same which is received in the enclosure 11 (FIG. 1). However, it is anticipated that other means will be employed for supplying a suitable quantity of hydrogen to the hydrogen distribution assembly 110. In this regard, a chemical or fuel reformer could be utilized and enclosed within or outside of the enclosure 11 and which would, by chemical reaction, produce a suitable quantity of hydrogen. The chemical reformer would be coupled with a supply of hydrogen rich fluid such as natural gas, ammonia, or similar fluids. The chemical reformer would then, by means of a chemical reaction, strip away the hydrogen component of the hydrogen rich fluid for delivery to the hydrogen distribution assembly. The remaining reformer by-products would then be exhausted to ambient (assuming these by-products did not produce a heath, environmental or other hazard), or would be captured for appropriate disposal, or recycling.

The membrane electrode diffusion assembly 150 which is employed with the power system 10 of the present invention includes, as a general matter, a solid proton conducting electrolyte membrane 151 which has opposite anode and cathode sides 153 and 154; individual catalytic anode and cathode electrodes 161 and 162 which are disposed in ionic contact with the respective anode and cathode sides 153 and 154 of the electrolyte membrane 151; and a diffusion layer 170 borne on each of the anode and cathode electrodes 161 and 162 and which is electrically conductive and has a given porosity. With respect to the diffusion layer 170, in the preferred embodiment of the present invention 10, the diffusion layer 170 comprises a first diffusion layer 171 borne on the individual anode and cathode electrodes 161 and 162 and which is positioned in ohmic electrical contact therewith. The first diffusion layer 171 is electrically conductive and has a given pore size. Additionally, a second diffusion layer 172 is borne on the first layer 171 and is positioned in ohmic electrical contact with the underlying first diffusion layer 171. The second diffusion layer 172 is electrically conductive and has a given pore size which is greater than the given pore size of the first diffusion layer 171.

In its broadest aspect the present invention 10 includes an electrolyte membrane 151 which comprises crosslinked polymeric chains incorporating sulfonic acid groups. More specifically, the electrolyte membrane 151 has at least a 20% molar concentration of sulfonic acid. The diffusion layer 170 which is employed with the membrane electrode diffusion assembly 150 of the present invention is deposited by means of a given method which was described earlier, and is not repeated herein.

In the present invention 10, the individual anode and cathode electrodes 161 and 162 in their broadest aspect, include particulate carbon; a catalyst; a binding resin; and a crosslinked copolymer incorporating sulfonic acid groups. In addition to the foregoing, the power system 10 further includes a pair of current collectors 190 which, in their broadest aspect, include a base substrate which is electrically conductive and is capable of surface passivation if exposed to oxygen; and a contact layer which is electrically conductive, galvanically cathodic and oxygen stable. Still further, the pair of current collectors 190 have a thickness of about 0.1 millimeters to about 1.3 millimeters and the contact layer has a thickness of about 0.2 microns to about 2 microns. In addition to the foregoing, the base substrate 190 has a given surface area of which at least 70% is open area.

The power system 10 includes a digital programmable control assembly 250 for monitoring the performance of the individual proton exchange membrane fuel cell modules 100, and other parameters of operation such as the flow rate of hydrogen 60 to the individual discrete PEM fuel cell modules 100, the heat output of each of the proton exchange membrane fuel cell modules 100, and the operation of the air distribution assembly 70 which mixes both outside air and air which has previously passed through the individual proton exchange membrane fuel cell modules 100. The air mixing valve 80 is effective in controlling the temperature of the air which is delivered to each of the proton exchange membrane fuel cell modules 100, as well as the relative humidity. In this fashion, the preponderance of heat energy generated by each of the PEM fuel cell modules 100 is effectively removed from same and either exhausted to ambient, or captured for other uses. The control assembly 250 is operable therefore to effectively optimize the operational conditions of the individually discrete PEM fuel cell modules 100 such that maximum current densities and efficiencies can be realized.

Some of the most significant advantages of the present invention 10 is that it is modularized, simple, efficient in operation and easy to maintain. For example, in the event that a particular PEM fuel cell module 100 becomes inoperable, the disabled PEM fuel cell module 100 can be quickly removed, by hand, from the subrack 30 and replaced with an operational module without interrupting the operation of the power system 10. This is a significant advancement in the art when considering the prior art teachings which show that a defective PEM fuel cell (manufactured as a stack) would require total disassembly of same while repairs were undertaken.

The present power system 10 has numerous other advantages over the prior art techniques and teachings, including the elimination of many of the balance-of-plant subassemblies typically utilized with such devices. Yet further, in view of the self-humidifying nature of the present proton exchange membrane fuel cell modules 100, other control measures have been simplified or otherwise eliminated thereby increasing the performance capabilities of same while simultaneously reducing the costs to generate a given amount of electrical power.

In compliance with the statute, the invention has been described in language more or less specific as to structural or methodical features. It is to be understood, however, that the invention is not limited to specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A membrane electrode diffusion assembly comprising:

an electrolyte membrane having opposing first and second surfaces;

a catalytic anode having opposing first and second surfaces, and wherein the first surface of said catalytic anode is placed in ionic contact with said first surface of said electrolyte membrane;

a catalytic cathode having opposing first and second surfaces, and wherein the first surface of said catalytic cathode is placed in ionic contact with said second surface of said electrolyte membrane;

a first electrically conductive diffusion layer having first and second surfaces, and wherein the first surface of said diffusion layer is placed in ohmic electrical contact with the second surface of said catalytic anode;

a second electrically conductive diffusion layer having first and second surfaces, and wherein the first surface of said second diffusion layer is placed in ohmic electrical contact with the second surface of said catalytic cathode;

a third electrically conductive diffusion layer having first and second surfaces, and wherein the first surface of said third diffusion layer is placed in ohmic electrical contact with said second surface of said first diffusion layer;

a fourth electrically conductive diffusion layer having first and second surfaces, and wherein the first surface of said fourth diffusion layer is placed in ohmic electrical contact with said second surface of said second diffusion layer; and wherein additional diffusion layers are placed in ohmic electrical contact on the second surface of the third and fourth diffusion layers.

2. A membrane electrode diffusion assembly comprising:

an electrolyte membrane having opposing first and second surfaces;

a catalytic anode having opposing first and second surfaces, and wherein the first surface of said catalytic anode is placed in ionic contact with said first surface of said electrolyte membrane;

a catalytic cathode having opposing first and second surfaces, and wherein the first surface of said catalytic cathode is placed in ionic contact with said second surface of said electrolyte membrane;

a first electrically conductive diffusion layer having first and second surfaces, and wherein the first surface of said diffusion layer is placed in ohmic electrical contact with the second surface of said catalytic anode;

a second electrically conductive diffusion layer having first and second surfaces, and wherein the first surface of said second diffusion layer is placed in ohmic electrical contact with the second surface of said catalytic cathode;

a third electrically conductive diffusion layer having first and second surfaces, and wherein the first surface of said third diffusion layer is placed in ohmic electrical contact with said second surface of said first diffusion layer;

a fourth electrically conductive diffusion layer having first and second surfaces, and wherein the first surface of said fourth diffusion layer is placed in ohmic electrical contact with said second surface of said second diffusion layer; and a binding agent positioned between the first and second diffusion layers, and the third and fourth diffusion layers.

3. A membrane electrode diffusion assembly comprising:

an electrolyte membrane having opposing first and second surfaces;

a catalytic anode having opposing first and second surfaces, and wherein the first surface of said catalytic anode is placed in ionic contact with said first surface of said electrolyte membrane;

a catalytic cathode having opposing first and second surfaces, and wherein the first surface of said catalytic cathode is placed in ionic contact with said second surface of said electrolyte membrane;

a first electrically conductive diffusion layer having first and second surfaces, and wherein the first surface of said diffusion layer is placed in ohmic electrical contact with the second surface of said catalytic anode;

a second electrically conductive diffusion layer having first and second surfaces, and wherein the first surface of said second diffusion layer is placed in ohmic electrical contact with the second surface of said catalytic cathode;

a third electrically conductive diffusion layer having first and second surfaces, and wherein the first surface of said third diffusion laver is placed in ohmic electrical contact with said second surface of said first diffusion layer;

a fourth electrically conductive diffusion layer having first and second surfaces, and wherein the first surface of said fourth diffusion layer is placed in ohmic electrical contact with said second surface of said second diffusion layer, and wherein the third and fourth diffusion layers comprise a porous hydrophobic lamina, and wherein the porous hydrophobic lamina is coated with a liquid suspension comprising about 95% to about 99% by weight of water; about 1% to about 5% by weight of alcohol; and about 1% to about 5% by weight of a compatible surfactant.

4. A membrane electrode diffusion assembly comprising:

an electrolyte membrane having opposing first and second surfaces;

a catalytic anode having opposing first and second surfaces, and wherein the first surface of said catalytic anode is placed in ionic contact with said first surface of said electrolyte membrane;

a catalytic cathode having opposing first and second surfaces, and wherein the first surface of said catalytic cathode is placed in ionic contact with said second surface of said electrolyte membrane;

a first electrically conductive diffusion layer having first and second surfaces, and wherein the first surface of said diffusion layer is placed in ohmic electrical contact with the second surface of said catalytic anode;

a second electrically conductive diffusion layer having first and second surfaces, and wherein the first surface of said second diffusion layer is placed in ohmic electrical contact with the second surface of said catalytic cathode;

a third electrically conductive diffusion layer having first and second surfaces, and wherein the first surface of said third diffusion layer is placed in ohmic electrical contact with said second surface of said first diffusion layer;

a fourth electrically conductive diffusion layer having first and second surfaces, and wherein the first surface of said fourth diffusion layer is placed in ohmic electrical contact with said second surface of said second diffusion layer, and wherein the first and second diffusion layers comprise a composite of successive coatings, and wherein each of the successive coatings has a specific degree of hydrophobicity, and wherein the first and second diffusion layers have a hydrophobic gradient, and wherein the hydrophobic gradient is established by adjusting the hydrophobicity of the successive coatings forming the composite.

5. A membrane electrode diffusion assembly as claimed in 4, wherein the successive coatings closest to the third and fourth diffusion layers are the least hydrophobic of all the successive coatings.

6. A membrane electrode diffusion assembly as claimed in 4, wherein the successive coatings closest to the third and fourth diffusion layers are the most hydrophobic of all the successive coatings.

7. A membrane electrode diffusion assembly comprising:

an electrolyte membrane having opposing first and second surfaces;

a catalytic anode having opposing first and second surfaces, and wherein the first surface of said catalytic anode is placed in ionic contact with said first surface of said electrolyte membrane;

a catalytic cathode having opposing first and second surfaces, and wherein the first surface of said catalytic cathode is placed in ionic contact with said second surface of said electrolyte membrane;

a first electrically conductive diffusion layer having first and second surfaces, and wherein the first surface of said diffusion layer is placed in ohmic electrical contact with the second surface of said catalytic anode;

a second electrically conductive diffusion layer having first and second surfaces, and wherein the first surface of said second diffusion layer is placed in ohmic electrical contact with the second surface of said catalytic cathode;

a third electrically conductive diffusion layer having first and second surfaces, and wherein the first surface of said third diffusion layer is placed in ohmic electrical contact with said second surface of said first diffusion layer;

a fourth electrically conductive diffusion layer having first and second surfaces, and wherein the first surface of said fourth diffusion layer is placed in ohmic electrical contact with said second surface of said second diffusion layer; and wherein the third and fourth diffusion layers comprise a porous hydrophobic lamina which are coated with a liquid suspension comprising about 95% to about 99% by weight of water; and about 1% to about 5% by weight of a surfactant.

8. A membrane electrode diffusion assembly comprising:

an electrolyte membrane having opposing first and second surfaces;

a catalytic anode having opposing first and second surfaces, and wherein the first surface of said catalytic anode is placed in ionic contact with said first surface of said electrolyte membrane;

a catalytic cathode having opposing first and second surfaces, and wherein the first surface of said catalytic cathode is placed in ionic contact with said second surface of said electrolyte membrane;

a first electrically conductive diffusion layer having first and second surfaces, and wherein the first surface of said diffusion layer is placed in ohmic electrical contact with the second surface of said catalytic anode;

a second electrically conductive diffusion laver having first and second surfaces, and wherein the first surface of said second diffusion layer is placed in ohmic electrical contact with the second surface of said catalytic cathode;

a third electrically conductive diffusion layer having first and second surfaces, and wherein the first surface of said third diffusion layer is placed in ohmic electrical contact with said second surface of said first diffusion layer;

a fourth electrically conductive diffusion layer having first and second surfaces, and wherein the first surface of said fourth diffusion layer is placed in ohmic electrical contact with said second surface of said second diffusion layer, and wherein the first and second diffusion layers comprise a composite of successive coatings, and wherein each of the successive coatings has a specific degree of hydrophobicity, and wherein the first and second diffusion layers have a hydrophobic gradient, and wherein the hydrophobic gradient is established by adjusting the hydrophobicity of the successive coatings forming the composite, and wherein the successive coatings closest to the third and fourth diffusion layers are the least hydrophobic of all the successive coatings.

9. A membrane electrode diffusion assembly comprising:

an electrolyte membrane having opposing first and second surfaces;

a catalytic anode having opposing first and second surfaces, and wherein the first surface of said catalytic anode is placed in ionic contact with said first surface of said electrolyte membrane;

a catalytic cathode having opposing first and second surfaces, and wherein the first surface of said catalytic cathode is placed in ionic contact with said second surface of said electrolyte membrane;

a first electrically conductive diffusion layer having first and second surfaces, and wherein the first surface of said diffusion layer is placed in ohmic electrical contact with the second surface of said catalytic anode;

a second electrically conductive diffusion layer having first and second surfaces, and wherein the first surface of said second diffusion layer is placed in ohmic electrical contact with the second surface of said catalytic cathode;

a third electrically conductive diffusion layer having first and second surfaces, and wherein the first surface of said third diffusion layer is placed in ohmic electrical contact with said second surface of said first diffusion layer;

a fourth electrically conductive diffusion layer having first and second surfaces, and wherein the first surface of said fourth diffusion layer is placed in ohmic electrical contact with said second surface of said second diffusion layer, and wherein the first and second diffusion layers comprise a composite of successive coatings, and wherein each of the successive coatings has a specific degree of hydrophobicity, and wherein the first and second diffusion layers have a hydrophobic gradient, and wherein the hydrophobic gradient is established by adjusting the hydrophobicity of the successive coatings forming the composite, and wherein the successive coatings closest to the third and fourth diffusion layers are the most hydrophobic of all the successive coatings.

10. A membrane electrode diffusion assembly comprising:

an electrolyte membrane having opposing first and second surfaces;

a catalytic anode having opposing first and second surfaces, and wherein the first surface of said catalytic anode is placed in ionic contact with said first surface of said electrolyte membrane;

a catalytic cathode having opposing first and second surfaces, and wherein the first surface of said catalytic cathode is placed in ionic contact with said second surface of said electrolyte membrane;

a first electrically conductive diffusion layer having first and second surfaces, and wherein the first surface of said diffusion layer is placed in ohmic electrical contact with the second surface of said catalytic anode;

a second electrically conductive diffusion layer having first and second surfaces, and wherein the first surface of said second diffusion layer is placed in ohmic electrical contact with the second surface of said catalytic cathode;

a third electrically conductive diffusion layer having first and second surfaces, and wherein the first surface of said third diffusion layer is placed in ohmic electrical contact with said second surface of said first diffusion layer;

a fourth electrically conductive diffusion layer having first and second surfaces, and wherein the first surface of said fourth diffusion layer is placed in ohmic electrical contact with said second surface of said second diffusion layer, and wherein the diffusion layers disposed on the catalytic cathode side of the membrane electrode diffusion assembly have different diffusion characteristics from the diffusion layers disposed on the catalytic anode side.

11. A membrane electrode diffusion assembly comprising:

an electrolyte membrane having opposing first and second substantially planar surfaces;

a catalytic anode having opposing first and second substantially planar surfaces;

said first planar surface of said catalytic anode placed into ionic contact with said first planar surface of said electrolyte membrane;

a catalytic cathode having opposing first and second substantially planar surfaces;

said first planar surface of said catalytic cathode placed into ionic contact with said second planar surface of said electrolyte membrane;

a first electrically conductive diffusion layer placed in ohmic electrical contact with the second planar surface of said catalytic anode; and a second electrically conductive diffusion layer placed in ohmic electrical contact with the second planar surface of said catalytic cathode, and wherein at least one of the first or second diffusion layers has a hydrophobic gradient.

12. A membrane electrode diffusion assembly as claimed in 11, wherein said first diffusion layer has the hydrophobic gradient.

13. A membrane electrode diffusion assembly as claimed in 11, wherein said second diffusion layer has the hydrophobic gradient.

14. A membrane electrode diffusion assembly as claimed in 11, wherein both the first and second diffusion layers have the hydrophobic gradient.

15. A membrane electrode diffusion assembly as claimed in 11, wherein said first and second diffusion layers are hydrophobic; and wherein the first and second diffusion layers are a composite formed of successive coatings which each have a variable degree of hydrophobicity; and wherein the overall hydrophobicity of the first and second layers is established by adjusting the hydrophobicity of the respective successive coatings.

16. A membrane electrode diffusion assembly as claimed in 15, wherein the last of said hydrophobic coatings is the least hydrophobic.

17. A membrane electrode diffusion assembly as claimed in 15, wherein the last of said hydrophobic coatings is the most hydrophobic.

18. A membrane electrode diffusion assembly as claimed in 11, wherein the individual catalytic anode and catalytic cathode electrodes comprise:

particulate carbon;

a catalyst; and a cross-linked copolymer incorporating sulfonic acid groups.

19. A membrane electrode diffusion assembly as claimed in 11, wherein the electrolyte membrane has a surface area, and the catalytic anode and the catalytic cathode have respective surface areas which are less than the surface area of the electrolyte membrane.

20. A membrane electrode diffusion assembly, comprising:

an electrolyte membrane having opposing first and second surfaces;

a catalytic anode having opposing first and second surfaces;

said first surface of said catalytic anode placed into ionic contact with said first surface of said electrolyte membrane;

a catalytic cathode having opposing first and second planar surfaces placed into ionic contact with said second planar surface of said electrolyte membrane;

a first electrically conductive diffusion layer placed into ohmic electrical contact with the second planar surface of said catalytic anode; and a second electrically conductive diffusion layer placed into ohmic electrical contact with the second planar surface of said catalytic cathode, and wherein a binding agent is placed between at least one of the diffusion layers and the underlying catalytic anode or catalytic cathode.

21. A membrane electrode diffusion assembly as claimed in 20, wherein the binding agent is positioned between said catalytic anode and said first diffusion layer.

22. A membrane electrode diffusion assembly as claimed in 20, wherein the binding agent is positioned between said catalytic cathode and said second diffusion layer.

23. A membrane electrode diffusion assembly as claimed in 20, wherein the binding agent is positioned between said catalytic anode and said first diffusion layer, and between said catalytic cathode and said second diffusion layer.

24. A membrane electrode diffusion assembly as claimed in 20, wherein the binding agent is a synthetic.

25. A membrane electrode diffusion assembly as claimed in 24, wherein the binding agent is a thermoplastic.

26. A membrane electrode diffusion assembly as claimed in 20, wherein the binding agent is selected from the group consisting essentially of polyethylene and wax.

27. A membrane electrode diffusion assembly as claimed in 20, wherein the binding agent is substantially hydrophobic and is selected from the group consisting essentially of perflourinated hydrocarbons; and wherein the first and second diffusion layers have about 20% to about 90%, by weight, of particulate carbon.

28. A membrane electrode diffusion assembly as claimed in 20, wherein the individual catalytic anode and catalytic cathode comprise:

particulate carbon;

a catalyst; and a cross-linked copolymer incorporating sulfonic acid groups.

29. A membrane electrode diffusion assembly as claimed in 20, wherein the electrolyte membrane has a surface area, and the catalytic anode and the catalytic cathode have individual surface areas which are less than the surface area of the electrolyte membrane.

* * * * *

UNITED STATES PATENT AND TRADEMARK OFFICE
CERTIFICATE OF CORRECTION

PATENT NO. : 6,218,035 B1
DATED : April 17, 2001
INVENTOR(S) : William A. Fuglevand, et al.

It is certified that error appears in the above-identified patent and that said Letters Patent is hereby corrected as shown below:

Column 12,
Line 49, change "MDEA" to -- MEDA --.

Column 22,
Line 35, change "500,00" to -- 500,000 --.

Column 10,
Line 41, delete "is".

Column 11,
Line 47, replace "of s the" with -- of the --.

Column 23,
Line 61, delete "if".

Column 28,
Line 28, replace "laver" with -- layer --.

Column 29,
Line 49, replace "laver" with -- layer --.

Column 31,
Line 25, replace "laver" with -- layer --.

Signed and Sealed this

Twenty-seventh Day of November, 2001

*Attest:*

NICHOLAS P. GODICI
*Attesting Officer*     Acting Director of the United States Patent and Trademark Office